United States Patent
Hafner et al.

(10) Patent No.: US 9,926,008 B2
(45) Date of Patent: Mar. 27, 2018

(54) TRAILER BACKUP ASSIST SYSTEM WITH WAYPOINT SELECTION

(71) Applicant: Ford Global Technologies, LLC, Dearborn, MI (US)

(72) Inventors: Michael Hafner, Ann Arbor, MI (US); Thomas Edward Pilutti, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/627,758

(22) Filed: Feb. 20, 2015

(65) Prior Publication Data

US 2015/0158527 A1     Jun. 11, 2015

Related U.S. Application Data

(63) Continuation-in-part of application No. 14/257,384, filed on Apr. 21, 2014, now Pat. No. 9,238,483.
(Continued)

(51) Int. Cl.
*B62D 13/06* (2006.01)
*G08G 1/14* (2006.01)
(Continued)

(52) U.S. Cl.
CPC ............ *B62D 13/06* (2013.01); *B60D 1/245* (2013.01); *B60D 1/62* (2013.01); *B60W 30/00* (2013.01);
(Continued)

(58) Field of Classification Search
CPC .......... G08G 1/168; G08G 1/14; G08G 1/141; G08G 1/143; B60R 1/00; B60R 11/04;
(Continued)

(56) References Cited

U.S. PATENT DOCUMENTS 3,605,088 A    9/1971   Savelli
3,833,928 A    9/1974   Gavit et al.
(Continued)

FOREIGN PATENT DOCUMENTS

CN    101610420 A    12/2009
CN    101833869 A     9/2010
(Continued)

OTHER PUBLICATIONS

SH.Azadi et al., Automatic Parking of an Articulated Vehicle Using ANFIS, Global Journal of Science, Engineering and Technology, GJSET Publishing, 2013, Issue 14, 2013, pp. 93-104.
(Continued)

*Primary Examiner* — Thomas G Black
*Assistant Examiner* — Sze-Hon Kong
(74) *Attorney, Agent, or Firm* — Raymond Coppiellie; Price Heneveld LLP

(57) ABSTRACT

A method of backing a trailer attached to a vehicle is provided herein. The method includes the steps of generating a plurality of waypoints on a display of the vehicle and selecting one of the plurality waypoints. The method also includes setting a trailer orientation for the selected waypoint and determining a backing path based on the selected waypoint and the set trailer orientation. The method further includes backing the trailer along the backing path.

20 Claims, 23 Drawing Sheets

Related U.S. Application Data which is a continuation-in-part of application No. 14/256,427, filed on Apr. 18, 2014, now Pat. No. 9,493,187, which is a continuation-in-part of application No. 14/249,781, filed on Apr. 10, 2014, now Pat. No. 9,374,562, which is a continuation-in-part of application No. 14/188,213, filed on Feb. 24, 2014, now abandoned, which is a continuation-in-part of application No. 13/847,508, filed on Mar. 20, 2013, now abandoned, and a continuation-in-part of application No. 14/068,387, filed on Oct. 31, 2013, now Pat. No. 9,102,271, which is a continuation-in-part of application No. 14/059,835, filed on Oct. 22, 2013, now Pat. No. 9,248,858, which is a continuation-in-part of application No. 13/443,743, filed on Apr. 10, 2012, now Pat. No. 8,825,328, which is a continuation-in-part of application No. 13/336,060, filed on Dec. 23, 2011, now Pat. No. 8,909,426, said application No. 14/249,781 is a continuation-in-part of application No. 14/161,832, filed on Jan. 23, 2014, now Pat. No. 9,346,396, which is a continuation-in-part of application No. 14/059,835, filed on Oct. 22, 2013, now Pat. No. 9,248,858, said application No. 14/249,781 is a continuation-in-part of application No. 14/201,130, filed on Mar. 7, 2014, now Pat. No. 9,290,202, which is a continuation-in-part of application No. 14/068,387, filed on Oct. 31, 2013, now Pat. No. 9,102,271.

(60) Provisional application No. 61/477,132, filed on Apr. 19, 2011.

(51) Int. Cl.
    *B60D 1/24* (2006.01)
    *B60D 1/62* (2006.01)
    *B62D 15/02* (2006.01)
    *B60W 30/00* (2006.01)
    *H04N 7/18* (2006.01)

(52) U.S. Cl.
    CPC ............ *B62D 15/027* (2013.01); *G08G 1/14* (2013.01); *G08G 1/143* (2013.01); *H04N 7/183* (2013.01)

(58) Field of Classification Search
    CPC ........ B60R 2300/105; B60R 2300/102; B60R 2300/202; B60R 2300/301; B60R 2300/302; B60R 2300/303; B60R 2300/304; B60R 2300/60; B60R 2300/607; B60R 2300/802; B60R 2300/806; B60R 2300/8086; B60D 1/245; B60D 1/62; B62D 1/00; B62D 6/002; B62D 9/00; B62D 12/00; B62D 12/02; B62D 13/00; B62D 13/06; B62D 15/02; B62D 15/027; B62D 15/0275; B62D 15/0285; B62D 15/028; B62D 53/06; B62D 53/045; E02F 9/0841; G03B 29/00; G06K 9/00791; B60W 30/00; H04N 7/183

See application file for complete search history.

(56) References Cited

U.S. PATENT DOCUMENTS

| | | |
|---|---|---|
| 3,924,257 A | 12/1975 | Roberts |
| 4,044,706 A | 8/1977 | Gill |
| 4,277,804 A | 7/1981 | Robison |
| 4,430,637 A | 2/1984 | Koch-Ducker et al. |
| 4,846,094 A | 7/1989 | Woods |
| 4,848,499 A | 7/1989 | Martinet et al. |
| 4,897,642 A | 1/1990 | DiLullo et al. |
| 4,947,097 A | 8/1990 | Tao |
| 5,097,250 A | 3/1992 | Hernandez |
| 5,132,851 A | 7/1992 | Bomar et al. |
| 5,155,683 A | 10/1992 | Rahim |
| 5,191,328 A | 3/1993 | Nelson |
| 5,235,316 A | 8/1993 | Qualizza |
| 5,247,442 A | 9/1993 | Kendall |
| 5,455,557 A | 10/1995 | Noll et al. |
| 5,461,357 A | 10/1995 | Yoshioka et al. |
| 5,521,633 A | 5/1996 | Nakajima et al. |
| 5,650,764 A | 7/1997 | McCullough |
| 5,690,347 A | 11/1997 | Juergens et al. |
| 5,734,336 A | 3/1998 | Smithline |
| 5,781,662 A | 7/1998 | Mori et al. |
| 5,905,433 A | 5/1999 | Wortham |
| 5,947,588 A | 9/1999 | Huang |
| 5,951,035 A | 9/1999 | Phillips, Jr. et al. |
| 5,957,232 A | 9/1999 | Shimizu et al. |
| 5,999,091 A | 12/1999 | Wortham |
| 6,041,582 A | 3/2000 | Tiede et al. |
| 6,100,795 A | 8/2000 | Otterbacher et al. |
| 6,142,372 A | 11/2000 | Wright |
| 6,178,650 B1 | 1/2001 | Thibodeaux |
| 6,182,010 B1 | 1/2001 | Berstis |
| 6,198,992 B1 | 3/2001 | Winslow |
| 6,226,226 B1 | 5/2001 | Lill et al. |
| 6,318,747 B1 | 11/2001 | Ratican |
| 6,351,698 B1 | 2/2002 | Kubota et al. |
| 6,366,202 B1 | 4/2002 | Rosenthal |
| 6,411,898 B2 | 6/2002 | Ishida et al. |
| 6,434,486 B1 | 8/2002 | Studt et al. |
| 6,480,104 B1 | 11/2002 | Wall et al. |
| 6,483,429 B1 | 11/2002 | Yasui et al. |
| 6,526,335 B1 | 2/2003 | Treyz et al. |
| 6,539,288 B2 | 3/2003 | Ishida et al. |
| 6,573,833 B1 | 6/2003 | Rosenthal |
| 6,577,952 B2 | 6/2003 | Geier et al. |
| 6,580,984 B2 | 6/2003 | Fecher et al. |
| 6,587,760 B2 | 7/2003 | Okamoto |
| 6,593,960 B1 | 7/2003 | Sugimoto et al. |
| 6,604,592 B2 | 8/2003 | Pietsch et al. |
| 6,643,576 B1 | 11/2003 | O Connor et al. |
| 6,683,539 B2 | 1/2004 | Trajkovic et al. |
| 6,704,653 B2 | 3/2004 | Kuriya et al. |
| 6,801,125 B1 | 10/2004 | McGregor et al. |
| 6,816,765 B2 | 11/2004 | Yamamoto et al. |
| 6,837,432 B2 | 1/2005 | Tsikos et al. |
| 6,838,979 B2 | 1/2005 | Deng et al. |
| 6,847,916 B1 | 1/2005 | Ying |
| 6,854,557 B1 | 2/2005 | Deng et al. |
| 6,857,494 B2 | 2/2005 | Kobayashi et al. |
| 6,933,837 B2 | 8/2005 | Gunderson et al. |
| 6,959,970 B2 | 11/2005 | Tseng |
| 6,970,184 B2 | 11/2005 | Hirama et al. |
| 6,989,739 B2 | 1/2006 | Li |
| 7,005,974 B2 | 2/2006 | McMahon et al. |
| 7,006,127 B2 | 2/2006 | Mizusawa et al. |
| 7,026,957 B2 | 4/2006 | Rubenstein |
| 7,039,504 B2 | 5/2006 | Tanaka et al. |
| 7,047,117 B2 | 5/2006 | Akiyama et al. |
| 7,085,634 B2 | 8/2006 | Endo et al. |
| 7,089,101 B2 | 8/2006 | Fischer et al. |
| 7,136,754 B2 | 11/2006 | Hahn et al. |
| 7,142,098 B2 | 11/2006 | Lang et al. |
| 7,154,385 B2 | 12/2006 | Lee et al. |
| 7,161,616 B1 | 1/2007 | Okamoto et al. |
| 7,175,194 B2 | 2/2007 | Ball |
| 7,195,267 B1 | 3/2007 | Thompson |
| 7,204,504 B2 | 4/2007 | Gehring et al. |
| 7,207,041 B2 | 4/2007 | Elson et al. |
| 7,220,217 B2 | 5/2007 | Tamai et al. |
| 7,225,891 B2 | 6/2007 | Gehring et al. |
| 7,229,139 B2 | 6/2007 | Lu et al. |
| 7,237,790 B2 | 7/2007 | Gehring et al. |
| 7,239,958 B2 | 7/2007 | Grougan et al. |

(56) References Cited

U.S. PATENT DOCUMENTS

| | | |
|---|---|---|
| 7,266,435 B2 | 9/2007 | Wang et al. |
| 7,309,075 B2 | 12/2007 | Ramsey et al. |
| 7,310,084 B2 | 12/2007 | Shitanaka et al. |
| 7,315,299 B2 | 1/2008 | Sunda et al. |
| 7,319,927 B1 | 1/2008 | Sun et al. |
| 7,352,388 B2 | 4/2008 | Miwa et al. |
| 7,353,110 B2 | 4/2008 | Kim |
| 7,366,892 B2 | 4/2008 | Spaur et al. |
| 7,401,871 B2 | 7/2008 | Lu et al. |
| 7,425,889 B2 | 9/2008 | Widmann et al. |
| 7,451,020 B2 | 11/2008 | Goetting et al. |
| 7,463,137 B2 | 12/2008 | Wishart et al. |
| 7,505,784 B2 | 3/2009 | Barbera |
| 7,532,109 B2 | 5/2009 | Takahama et al. |
| 7,537,256 B2 | 5/2009 | Gates et al. |
| 7,552,009 B2 | 6/2009 | Nelson |
| 7,568,716 B2 | 8/2009 | Dietz |
| 7,602,782 B2 | 10/2009 | Doviak et al. |
| 7,619,680 B1 | 11/2009 | Bingle et al. |
| 7,623,952 B2 | 11/2009 | Unruh et al. |
| 7,640,108 B2 | 12/2009 | Shimizu et al. |
| 7,640,180 B1 | 12/2009 | Shimizu et al. |
| 7,658,524 B2 | 2/2010 | Johnson et al. |
| 7,688,221 B2 | 3/2010 | Watanabe et al. |
| 7,689,253 B2 | 3/2010 | Basir |
| 7,690,737 B2 | 4/2010 | Lu |
| 7,692,557 B2 | 4/2010 | Medina et al. |
| 7,693,661 B2 | 4/2010 | Iwasaka |
| 7,706,944 B2 | 4/2010 | Tanaka et al. |
| 7,715,953 B2 | 5/2010 | Shepard |
| 7,777,615 B2 | 8/2010 | Okuda et al. |
| 7,783,699 B2 | 8/2010 | Rasin et al. |
| 7,786,849 B2 | 8/2010 | Buckley |
| 7,801,941 B2 | 9/2010 | Conneely et al. |
| 7,825,782 B2 | 11/2010 | Hermann |
| 7,827,047 B2 | 11/2010 | Anderson et al. |
| 7,840,347 B2 | 11/2010 | Noguchi |
| 7,904,222 B2 | 3/2011 | Lee et al. |
| 7,907,975 B2 | 3/2011 | Sakamoto et al. |
| 7,917,081 B2 | 3/2011 | Voto et al. |
| 7,932,623 B2 | 4/2011 | Burlak et al. |
| 7,932,815 B2 | 4/2011 | Martinez et al. |
| 7,950,751 B2 | 5/2011 | Offerle et al. |
| 7,969,326 B2 | 6/2011 | Sakakibara |
| 7,974,444 B2 | 7/2011 | Hongo |
| 8,009,025 B2 | 8/2011 | Engstrom et al. |
| 8,010,252 B2 | 8/2011 | Getman et al. |
| 8,019,592 B2 | 9/2011 | Fukuoka et al. |
| 8,024,743 B2 | 9/2011 | Werner |
| 8,033,955 B2 | 10/2011 | FarNsworth |
| 8,036,792 B2 | 10/2011 | Dechamp |
| 8,037,500 B2 | 10/2011 | Margis et al. |
| 8,038,166 B1 | 10/2011 | Piesinger |
| 8,044,776 B2 | 10/2011 | Schofield et al. |
| 8,044,779 B2 | 10/2011 | Hahn et al. |
| 8,068,019 B2 | 11/2011 | Bennie et al. |
| 8,121,802 B2 | 2/2012 | Grider et al. |
| 8,131,458 B1 | 3/2012 | Zilka |
| 8,138,899 B2 | 3/2012 | Ghneim |
| 8,139,109 B2 | 3/2012 | Schmiedel et al. |
| 8,140,138 B2 | 3/2012 | Chrumka |
| 8,150,474 B2 | 4/2012 | Saito et al. |
| 8,165,770 B2 | 4/2012 | Getman et al. |
| 8,169,341 B2 | 5/2012 | Toledo et al. |
| 8,174,576 B2 | 5/2012 | Akatsuka et al. |
| 8,179,238 B2 | 5/2012 | Roberts, Sr. et al. |
| 8,192,064 B2 | 6/2012 | Johnson et al. |
| 8,195,145 B2 | 6/2012 | Angelhag |
| 8,205,704 B2 | 6/2012 | Kadowaki et al. |
| 8,223,204 B2 | 7/2012 | Hahn |
| 8,224,078 B2 | 7/2012 | Boncyk et al. |
| 8,244,442 B2 | 8/2012 | Craig et al. |
| 8,245,270 B2 | 8/2012 | Cooperstein et al. |
| 8,255,007 B2 | 8/2012 | Saito et al. |
| 8,267,485 B2 | 9/2012 | Barlsen et al. |
| 8,270,933 B2 | 9/2012 | Riemer et al. |
| 8,280,607 B2 | 10/2012 | Gatti et al. |
| 8,289,189 B2 | 10/2012 | Becker et al. |
| 8,308,182 B2 | 11/2012 | Ortmann et al. |
| 8,310,353 B2 | 11/2012 | Hinninger et al. |
| 8,315,617 B2 | 11/2012 | Tadayon et al. |
| 8,319,618 B2 | 11/2012 | Gomi et al. |
| 8,319,663 B2 | 11/2012 | Von Reyher et al. |
| 8,332,097 B2 | 12/2012 | Chiba et al. |
| 8,352,575 B2 | 1/2013 | Samaha |
| 8,362,888 B2 | 1/2013 | Roberts, Sr. et al. |
| 8,370,056 B2 | 2/2013 | Trombley et al. |
| 8,374,749 B2 | 2/2013 | Tanaka |
| 8,380,416 B2 | 2/2013 | Offerle et al. |
| 8,390,696 B2 | 3/2013 | Komoto et al. |
| 8,392,066 B2 | 3/2013 | Ehara et al. |
| 8,401,744 B2 | 3/2013 | Chiocco |
| 8,406,956 B2 | 3/2013 | Wey et al. |
| 8,414,171 B2 | 4/2013 | Kawamura |
| 8,417,263 B2 | 4/2013 | Jenkins et al. |
| 8,417,417 B2 | 4/2013 | Chen et al. |
| 8,417,444 B2 | 4/2013 | Smid et al. |
| 8,427,288 B2 | 4/2013 | Schofield et al. |
| 8,451,107 B2 | 5/2013 | Lu et al. |
| 8,469,125 B2 | 6/2013 | Yu et al. |
| 8,471,691 B2 | 6/2013 | Zhang et al. |
| 8,473,575 B2 | 6/2013 | Marchwicki et al. |
| 8,494,439 B2 | 7/2013 | Faenger |
| 8,498,757 B2 | 7/2013 | Bowden et al. |
| 8,498,770 B2 | 7/2013 | Takano |
| 8,538,785 B2 | 9/2013 | Coleman et al. |
| 8,548,680 B2 | 10/2013 | Ryerson et al. |
| 8,560,175 B2 | 10/2013 | Bammert et al. |
| 8,571,758 B2 | 10/2013 | Klier et al. |
| 8,605,153 B2 | 12/2013 | Sasaki et al. |
| 8,626,382 B2 | 1/2014 | Obradovich |
| 8,645,015 B2 | 2/2014 | Oetiker et al. |
| 8,755,984 B2 | 6/2014 | Rupp et al. |
| 8,786,417 B2 | 7/2014 | Holmen et al. |
| 8,788,204 B2 | 7/2014 | Shimizu |
| 8,797,190 B2 | 8/2014 | Kolbe et al. |
| 8,798,860 B2 | 8/2014 | Dechamp |
| 8,807,261 B2 | 8/2014 | Subrt et al. |
| 8,811,698 B2 | 8/2014 | Kono et al. |
| 8,823,796 B2 | 9/2014 | Shen et al. |
| 8,825,221 B2 | 9/2014 | Hueger et al. |
| 8,825,328 B2 | 9/2014 | Rupp et al. |
| 8,836,786 B2 | 9/2014 | Seger et al. |
| 8,868,329 B2 * | 10/2014 | Ikeda ................... G01C 21/00 701/33.4 |
| 8,888,120 B2 | 11/2014 | Trevino |
| 8,892,360 B2 | 11/2014 | Otani |
| 8,909,426 B2 | 12/2014 | Rhode et al. |
| 8,928,757 B2 | 1/2015 | Maekawa et al. |
| 8,930,140 B2 | 1/2015 | Trombley et al. |
| 8,957,786 B2 | 2/2015 | Stempnik et al. |
| 8,972,109 B2 | 3/2015 | Lavoie et al. |
| 9,008,913 B1 | 4/2015 | Sears et al. |
| 9,013,286 B2 | 4/2015 | Chen et al. |
| 9,042,603 B2 | 5/2015 | Elwart et al. |
| 9,082,315 B2 | 7/2015 | Lin et al. |
| 9,094,583 B2 | 7/2015 | Shih et al. |
| 9,102,271 B2 | 8/2015 | Trombley et al. |
| 9,108,598 B2 | 8/2015 | Headley |
| 9,114,832 B2 | 8/2015 | Wang et al. |
| 9,120,359 B2 | 9/2015 | Chiu et al. |
| 9,132,856 B2 | 9/2015 | Shepard |
| 9,156,496 B2 | 10/2015 | Greenwood et al. |
| 9,164,955 B2 | 10/2015 | Lavoie et al. |
| 9,208,686 B2 | 12/2015 | Takamatsu |
| 9,227,474 B2 | 1/2016 | Liu |
| 9,238,483 B2 | 1/2016 | Hafner et al. |
| 9,248,858 B2 | 2/2016 | Lavoie et al. |
| 9,264,672 B2 | 2/2016 | Lynam |
| 9,296,422 B2 | 3/2016 | Lavoie |
| 9,315,151 B2 | 4/2016 | Taylor et al. |
| 9,315,212 B1 | 4/2016 | Kyrtsos et al. |
| 9,321,483 B2 | 4/2016 | Headley |
| 9,335,162 B2 | 5/2016 | Kyrtsos et al. |

(56) References Cited

U.S. PATENT DOCUMENTS

| | | | |
|---|---|---|---|
| 9,340,228 B2 | 5/2016 | Xu et al. | |
| 9,352,777 B2 | 5/2016 | Lavoie et al. | |
| 9,400,897 B2 | 7/2016 | Bruening et al. | |
| 9,434,414 B2 | 9/2016 | Lavoie | |
| 9,464,913 B2 | 10/2016 | Brown et al. | |
| 9,499,018 B2 | 11/2016 | Gehrke et al. | |
| 9,500,497 B2 | 11/2016 | Lavoie et al. | |
| 9,508,189 B2 | 11/2016 | Han et al. | |
| 9,520,063 B2 | 12/2016 | Noh | |
| 9,558,409 B2* | 1/2017 | Pliefke | B60R 1/00 |
| 9,616,923 B2 | 4/2017 | Lavoie et al. | |
| 9,623,904 B2 | 4/2017 | Lavoie et al. | |
| 9,676,377 B2 | 6/2017 | Hafner et al. | |
| 2002/0005780 A1 | 1/2002 | Ehrlich et al. | |
| 2002/0098853 A1 | 7/2002 | Chrumka | |
| 2002/0111118 A1 | 8/2002 | Klitsner et al. | |
| 2003/0079123 A1 | 4/2003 | Mas Ribes | |
| 2003/0147534 A1 | 8/2003 | Ablay et al. | |
| 2003/0222982 A1 | 12/2003 | Hamdan et al. | |
| 2003/0234512 A1 | 12/2003 | Holub | |
| 2004/0119822 A1 | 6/2004 | Custer et al. | |
| 2004/0203660 A1 | 10/2004 | Tibrewal et al. | |
| 2004/0207525 A1 | 10/2004 | Wholey et al. | |
| 2004/0260438 A1 | 12/2004 | Chernetsky et al. | |
| 2005/0000738 A1 | 1/2005 | Gehring et al. | |
| 2005/0046696 A1 | 3/2005 | Lang et al. | |
| 2005/0073433 A1 | 4/2005 | Gunderson et al. | |
| 2005/0074143 A1 | 4/2005 | Kawai | |
| 2005/0091408 A1 | 4/2005 | Parupudi et al. | |
| 2005/0128059 A1 | 6/2005 | Vause | |
| 2005/0146607 A1 | 7/2005 | Linn et al. | |
| 2005/0168331 A1 | 8/2005 | Gunderson | |
| 2005/0177635 A1 | 8/2005 | Schmidt et al. | |
| 2005/0206225 A1 | 9/2005 | Offerle et al. | |
| 2005/0206231 A1 | 9/2005 | Lu et al. | |
| 2005/0206299 A1 | 9/2005 | Nakamura et al. | |
| 2005/0217906 A1* | 10/2005 | Spark | B60T 8/24 180/22 |
| 2005/0236201 A1 | 10/2005 | Spannheimer et al. | |
| 2005/0236896 A1 | 10/2005 | Offerle et al. | |
| 2006/0071447 A1 | 4/2006 | Gehring et al. | |
| 2006/0076828 A1 | 4/2006 | Lu et al. | |
| 2006/0092129 A1 | 5/2006 | Choquet et al. | |
| 2006/0103511 A1 | 5/2006 | Lee et al. | |
| 2006/0111820 A1* | 5/2006 | Goetting | B62D 13/06 701/1 |
| 2006/0142936 A1 | 6/2006 | Dix | |
| 2006/0155455 A1 | 7/2006 | Lucas et al. | |
| 2006/0156315 A1 | 7/2006 | Wood et al. | |
| 2006/0171704 A1 | 8/2006 | Bingle et al. | |
| 2006/0176370 A1 | 8/2006 | Chen et al. | |
| 2006/0190097 A1 | 8/2006 | Rubenstein | |
| 2006/0190147 A1 | 8/2006 | Lee et al. | |
| 2006/0238538 A1 | 10/2006 | Kapler et al. | |
| 2006/0244579 A1 | 11/2006 | Raab | |
| 2006/0250501 A1 | 11/2006 | Widmann et al. | |
| 2006/0276959 A1 | 12/2006 | Matsuoka et al. | |
| 2006/0287821 A1 | 12/2006 | Lin | |
| 2006/0293800 A1 | 12/2006 | Bauer et al. | |
| 2007/0019421 A1 | 1/2007 | Kregness et al. | |
| 2007/0027581 A1 | 2/2007 | Bauer et al. | |
| 2007/0057816 A1 | 3/2007 | Sakakibara et al. | |
| 2007/0058273 A1 | 3/2007 | Ito et al. | |
| 2007/0132560 A1 | 6/2007 | Nystrom et al. | |
| 2007/0132573 A1 | 6/2007 | Quach et al. | |
| 2007/0198190 A1 | 8/2007 | Bauer et al. | |
| 2007/0216136 A1 | 9/2007 | Dietz | |
| 2007/0260395 A1 | 11/2007 | Matsuoka et al. | |
| 2008/0027599 A1 | 1/2008 | Logan et al. | |
| 2008/0027635 A1 | 1/2008 | Tengler et al. | |
| 2008/0147277 A1 | 6/2008 | Lu et al. | |
| 2008/0148374 A1 | 6/2008 | Spaur et al. | |
| 2008/0177443 A1 | 7/2008 | Lee et al. | |
| 2008/0180526 A1 | 7/2008 | Trevino | |
| 2008/0186384 A1 | 8/2008 | Ishii et al. | |
| 2008/0231701 A1 | 9/2008 | Greenwood et al. | |
| 2008/0312792 A1* | 12/2008 | Dechamp | B62D 13/06 701/41 |
| 2008/0313050 A1 | 12/2008 | Basir | |
| 2009/0005932 A1 | 1/2009 | Lee et al. | |
| 2009/0045924 A1 | 2/2009 | Roberts, Sr. et al. | |
| 2009/0063053 A1 | 3/2009 | Basson et al. | |
| 2009/0075624 A1 | 3/2009 | Cox et al. | |
| 2009/0079828 A1 | 3/2009 | Lee et al. | |
| 2009/0082935 A1 | 3/2009 | Leschuk et al. | |
| 2009/0085775 A1 | 4/2009 | Otsuka et al. | |
| 2009/0093928 A1 | 4/2009 | Getman et al. | |
| 2009/0106036 A1 | 4/2009 | Tamura et al. | |
| 2009/0117890 A1 | 5/2009 | Jacobsen et al. | |
| 2009/0140064 A1 | 6/2009 | Schultz et al. | |
| 2009/0153663 A1 | 6/2009 | Ramos | |
| 2009/0219147 A1 | 9/2009 | Bradley et al. | |
| 2009/0231441 A1 | 9/2009 | Walker et al. | |
| 2009/0253466 A1 | 10/2009 | Saito et al. | |
| 2009/0271078 A1 | 10/2009 | Dickinson | |
| 2009/0300701 A1 | 12/2009 | Karaoguz et al. | |
| 2009/0306854 A1 | 12/2009 | Dechamp | |
| 2009/0318119 A1 | 12/2009 | Basir et al. | |
| 2010/0019934 A1* | 1/2010 | Takano | B60R 1/00 340/932.2 |
| 2010/0060739 A1 | 3/2010 | Salazar | |
| 2010/0063670 A1 | 3/2010 | Brzezinski et al. | |
| 2010/0098853 A1 | 4/2010 | Hoffmann et al. | |
| 2010/0114471 A1 | 5/2010 | Sugiyama et al. | |
| 2010/0152989 A1 | 6/2010 | Smith et al. | |
| 2010/0156667 A1 | 6/2010 | Bennie et al. | |
| 2010/0156671 A1 | 6/2010 | Lee et al. | |
| 2010/0157061 A1 | 6/2010 | Katsman et al. | |
| 2010/0171828 A1 | 7/2010 | Ishii | |
| 2010/0174422 A1 | 7/2010 | Jacobsen et al. | |
| 2010/0191421 A1 | 7/2010 | Nilsson | |
| 2010/0194888 A1 | 8/2010 | McElroy et al. | |
| 2010/0198491 A1 | 8/2010 | Mays | |
| 2010/0222964 A1 | 9/2010 | Dechamp | |
| 2010/0234071 A1 | 9/2010 | Shabtay et al. | |
| 2010/0305815 A1 | 12/2010 | Trueman et al. | |
| 2010/0306309 A1 | 12/2010 | Santori et al. | |
| 2010/0324770 A1 | 12/2010 | Ramsey et al. | |
| 2011/0001825 A1 | 1/2011 | Hahn | |
| 2011/0022282 A1 | 1/2011 | Wu et al. | |
| 2011/0025482 A1 | 2/2011 | Alguera et al. | |
| 2011/0050903 A1 | 3/2011 | Vorobiev | |
| 2011/0063425 A1 | 3/2011 | Tieman | |
| 2011/0088659 A1 | 4/2011 | Wang et al. | |
| 2011/0102583 A1 | 5/2011 | Kinzalow | |
| 2011/0110530 A1 | 5/2011 | Kimura | |
| 2011/0112721 A1 | 5/2011 | Wang et al. | |
| 2011/0112762 A1 | 5/2011 | Gruijters et al. | |
| 2011/0118927 A1* | 5/2011 | Cima | G05D 1/0088 701/26 |
| 2011/0125457 A1 | 5/2011 | Lee et al. | |
| 2011/0129093 A1 | 6/2011 | Karam et al. | |
| 2011/0140872 A1 | 6/2011 | McClure | |
| 2011/0149077 A1 | 6/2011 | Robert | |
| 2011/0153198 A1 | 6/2011 | Kokkas et al. | |
| 2011/0160956 A1 | 6/2011 | Chung et al. | |
| 2011/0181457 A1 | 7/2011 | Basten | |
| 2011/0185390 A1 | 7/2011 | Faenger et al. | |
| 2011/0195659 A1 | 8/2011 | Boll et al. | |
| 2011/0216199 A1 | 9/2011 | Trevino et al. | |
| 2011/0257860 A1 | 10/2011 | Getman et al. | |
| 2011/0281522 A1 | 11/2011 | Suda | |
| 2011/0296037 A1 | 12/2011 | Westra et al. | |
| 2012/0004805 A1 | 1/2012 | Gray et al. | |
| 2012/0039537 A1 | 2/2012 | Keys | |
| 2012/0062743 A1 | 3/2012 | Lynam et al. | |
| 2012/0062744 A1 | 3/2012 | Schofield et al. | |
| 2012/0065815 A1 | 3/2012 | Hess | |
| 2012/0079002 A1 | 3/2012 | Boll et al. | |
| 2012/0084292 A1 | 4/2012 | Liang et al. | |
| 2012/0086808 A1 | 4/2012 | Lynam | |
| 2012/0095649 A1 | 4/2012 | Klier et al. | |
| 2012/0170286 A1 | 7/2012 | Bodem et al. | |
| 2012/0185131 A1 | 7/2012 | Headley | |

(56) References Cited

U.S. PATENT DOCUMENTS

| | | |
|---|---|---|
| 2012/0191285 A1 | 7/2012 | Woolf et al. |
| 2012/0200706 A1 | 8/2012 | Greenwood et al. |
| 2012/0212616 A1 | 8/2012 | Usami et al. |
| 2012/0221168 A1 | 8/2012 | Zeng et al. |
| 2012/0224059 A1 | 9/2012 | Takamatsu |
| 2012/0229639 A1 | 9/2012 | Singleton |
| 2012/0265416 A1 | 10/2012 | Lu et al. |
| 2012/0271512 A1 | 10/2012 | Rupp et al. |
| 2012/0271514 A1 | 10/2012 | Lavoie et al. |
| 2012/0271515 A1 | 10/2012 | Rhode et al. |
| 2012/0271522 A1 | 10/2012 | Rupp et al. |
| 2012/0283909 A1 | 11/2012 | Dix |
| 2012/0283910 A1 | 11/2012 | Lee et al. |
| 2012/0288156 A1 | 11/2012 | Kido |
| 2012/0290150 A1 | 11/2012 | Doughty et al. |
| 2012/0314073 A1 | 12/2012 | Shimoda et al. |
| 2012/0316732 A1 | 12/2012 | Auer |
| 2013/0006472 A1 | 1/2013 | McClain et al. |
| 2013/0024064 A1 | 1/2013 | Shepard |
| 2013/0027195 A1 | 1/2013 | Van Wiemeersch et al. |
| 2013/0038436 A1 | 2/2013 | Brey et al. |
| 2013/0038731 A1 | 2/2013 | Brey et al. |
| 2013/0041524 A1 | 2/2013 | Brey |
| 2013/0057397 A1 | 3/2013 | Cutler |
| 2013/0060421 A1* | 3/2013 | Kadowaki ................. B60R 1/00 701/36 |
| 2013/0076007 A1 | 3/2013 | Goode |
| 2013/0120161 A1 | 5/2013 | Wakabayashi et al. |
| 2013/0120572 A1 | 5/2013 | Kwon |
| 2013/0128047 A1 | 5/2013 | Lee |
| 2013/0148748 A1 | 6/2013 | Suda |
| 2013/0158803 A1 | 6/2013 | Headley |
| 2013/0158863 A1 | 6/2013 | Skvarce et al. |
| 2013/0166190 A1* | 6/2013 | Ikeda ................. B62D 15/0285 701/400 |
| 2013/0179038 A1 | 7/2013 | Goswami et al. |
| 2013/0226390 A1 | 8/2013 | Luo et al. |
| 2013/0229524 A1 | 9/2013 | Vovkushevsky et al. |
| 2013/0250114 A1 | 9/2013 | Lu |
| 2013/0253814 A1 | 9/2013 | Wirthlin |
| 2013/0268160 A1 | 10/2013 | Trombley et al. |
| 2014/0005918 A1 | 1/2014 | Qiang |
| 2014/0012465 A1 | 1/2014 | Shank et al. |
| 2014/0025260 A1 | 1/2014 | McClure |
| 2014/0052337 A1 | 2/2014 | Lavoie et al. |
| 2014/0058614 A1 | 2/2014 | Trombley et al. |
| 2014/0058622 A1 | 2/2014 | Trombley et al. |
| 2014/0058655 A1 | 2/2014 | Trombley et al. |
| 2014/0058668 A1 | 2/2014 | Trombley et al. |
| 2014/0074743 A1 | 3/2014 | Rademaker |
| 2014/0085472 A1 | 3/2014 | Lu et al. |
| 2014/0088797 A1 | 3/2014 | McClain et al. |
| 2014/0088824 A1 | 3/2014 | Ishimoto |
| 2014/0121883 A1* | 5/2014 | Shen ................. B62D 15/0285 701/28 |
| 2014/0121930 A1 | 5/2014 | Allexi et al. |
| 2014/0125795 A1 | 5/2014 | Yerke |
| 2014/0129091 A1* | 5/2014 | Yamazaki ............ B62D 5/0496 701/42 |
| 2014/0156148 A1 | 6/2014 | Kikuchi |
| 2014/0160276 A1 | 6/2014 | Pliefke et al. |
| 2014/0168415 A1 | 6/2014 | Ihlenburg et al. |
| 2014/0172232 A1 | 6/2014 | Rupp et al. |
| 2014/0176348 A1* | 6/2014 | Acker, Jr. .............. G08G 1/144 340/932.2 |
| 2014/0188344 A1 | 7/2014 | Lavoie |
| 2014/0188346 A1 | 7/2014 | Lavoie |
| 2014/0210456 A1 | 7/2014 | Crossman |
| 2014/0218506 A1 | 8/2014 | Trombley et al. |
| 2014/0218522 A1 | 8/2014 | Lavoie et al. |
| 2014/0222288 A1 | 8/2014 | Lavoie et al. |
| 2014/0236532 A1 | 8/2014 | Trombley et al. |
| 2014/0244095 A1* | 8/2014 | Choi ................. B62D 15/0285 701/25 |
| 2014/0249691 A1 | 9/2014 | Hafner et al. |
| 2014/0267688 A1 | 9/2014 | Aich et al. |
| 2014/0267689 A1 | 9/2014 | Lavoie |
| 2014/0267727 A1 | 9/2014 | Alaniz |
| 2014/0277941 A1 | 9/2014 | Chiu et al. |
| 2014/0277942 A1 | 9/2014 | Kyrtsos et al. |
| 2014/0297128 A1 | 10/2014 | Lavoie et al. |
| 2014/0297129 A1 | 10/2014 | Lavoie et al. |
| 2014/0303847 A1 | 10/2014 | Lavoie |
| 2014/0307095 A1 | 10/2014 | Wierich |
| 2014/0309888 A1 | 10/2014 | Smit et al. |
| 2014/0324295 A1 | 10/2014 | Lavoie |
| 2014/0343795 A1 | 11/2014 | Lavoie |
| 2014/0354811 A1 | 12/2014 | Weber |
| 2014/0358429 A1 | 12/2014 | Shutko et al. |
| 2014/0361955 A1 | 12/2014 | Goncalves |
| 2014/0379217 A1 | 12/2014 | Rupp et al. |
| 2015/0002669 A1 | 1/2015 | Reed et al. |
| 2015/0002670 A1 | 1/2015 | Bajpai |
| 2015/0025732 A1* | 1/2015 | Min ................. B62D 15/0285 701/23 |
| 2015/0054661 A1* | 2/2015 | Noh ................. G08G 1/141 340/932.2 |
| 2015/0057903 A1 | 2/2015 | Rhode et al. |
| 2015/0066296 A1 | 3/2015 | Trombley et al. |
| 2015/0077557 A1 | 3/2015 | Han et al. |
| 2015/0088360 A1* | 3/2015 | Bonnet ................. B60W 30/06 701/23 |
| 2015/0094945 A1 | 4/2015 | Cheng et al. |
| 2015/0115571 A1 | 4/2015 | Zhang et al. |
| 2015/0120141 A1 | 4/2015 | Lavoie et al. |
| 2015/0120143 A1 | 4/2015 | Schlichting |
| 2015/0134183 A1 | 5/2015 | Lavoie et al. |
| 2015/0138340 A1 | 5/2015 | Lavoie |
| 2015/0142211 A1 | 5/2015 | Shehata et al. |
| 2015/0149040 A1 | 5/2015 | Hueger et al. |
| 2015/0158527 A1 | 6/2015 | Hafner et al. |
| 2015/0165850 A1 | 6/2015 | Chiu et al. |
| 2015/0172582 A1 | 6/2015 | Kiyohara et al. |
| 2015/0179075 A1 | 6/2015 | Lee |
| 2015/0191200 A1 | 7/2015 | Tsubaki et al. |
| 2015/0197278 A1 | 7/2015 | Boos et al. |
| 2015/0203156 A1 | 7/2015 | Hafner et al. |
| 2015/0210317 A1 | 7/2015 | Hafner et al. |
| 2015/0217692 A1 | 8/2015 | Yanagawa |
| 2015/0217693 A1* | 8/2015 | Pliefke ................. B60R 1/00 348/118 |
| 2015/0232031 A1 | 8/2015 | Kitaura et al. |
| 2015/0232092 A1 | 8/2015 | Fairgrieve et al. |
| 2015/0234386 A1 | 8/2015 | Zini et al. |
| 2015/0235484 A1 | 8/2015 | Kraeling et al. |
| 2015/0251602 A1 | 9/2015 | Baur et al. |
| 2015/0269444 A1 | 9/2015 | Lameyre et al. |
| 2015/0344028 A1 | 12/2015 | Gieseke et al. |
| 2015/0369613 A1* | 12/2015 | Stadler ................. G01C 21/32 701/537 |
| 2016/0001705 A1 | 1/2016 | Greenwood et al. |
| 2016/0006922 A1 | 1/2016 | Boudreau et al. |
| 2016/0023601 A1 | 1/2016 | Windeler |
| 2016/0023603 A1 | 1/2016 | Vico et al. |
| 2016/0039456 A1 | 2/2016 | Lavoie et al. |
| 2016/0042643 A1* | 2/2016 | Hohenacker .............. G08G 1/04 705/13 |
| 2016/0052548 A1 | 2/2016 | Singh et al. |
| 2016/0059780 A1 | 3/2016 | Lavoie |
| 2016/0059888 A1 | 3/2016 | Bradley et al. |
| 2016/0059889 A1 | 3/2016 | Herzog et al. |
| 2016/0096549 A1 | 4/2016 | Herzog et al. |
| 2016/0129939 A1 | 5/2016 | Singh et al. |
| 2016/0152263 A1* | 6/2016 | Singh ................. B60T 8/1708 701/41 |
| 2016/0153778 A1 | 6/2016 | Singh et al. |
| 2016/0207526 A1* | 7/2016 | Franz ................. G06K 9/00812 |
| 2016/0280267 A1 | 9/2016 | Lavoie et al. |
| 2016/0304088 A1 | 10/2016 | Barth |
| 2016/0304122 A1 | 10/2016 | Herzog et al. |
| 2016/0320477 A1 | 11/2016 | Heimberger |
| 2016/0358474 A1* | 12/2016 | Uppal ................. G08G 1/168 |
| 2017/0073005 A1 | 3/2017 | Ghneim et al. |

(56) References Cited

U.S. PATENT DOCUMENTS

| | | | | |
|---|---|---|---|---|
| 2017/0225679 A1* | 8/2017 | Bonnet | ............... | B60W 30/06 |
| 2017/0259850 A1 | 9/2017 | Yamashita et al. | | |
| 2017/0302107 A1* | 10/2017 | Saussele | ............... | G08G 1/142 |

FOREIGN PATENT DOCUMENTS

| | | |
|---|---|---|
| CN | 201923085 U | 8/2011 |
| CN | 202541524 U | 11/2012 |
| CN | 102582686 B | 9/2013 |
| CN | 203292137 U | 11/2013 |
| DE | 3931518 A1 | 4/1991 |
| DE | 9208595 U1 | 8/1992 |
| DE | 19526702 A1 | 2/1997 |
| DE | 10065230 A1 | 7/2002 |
| DE | 10154612 A1 | 5/2003 |
| DE | 102005043466 A1 | 3/2007 |
| DE | 102005043467 A1 | 3/2007 |
| DE | 102005043468 A1 | 3/2007 |
| DE | 102006035021 | 1/2008 |
| DE | 102006048947 A1 | 4/2008 |
| DE | 102008020838 A1 | 11/2008 |
| DE | 102008045436 A1 | 3/2010 |
| DE | 102006035021 B4 | 4/2010 |
| DE | 102009012253 A1 | 9/2010 |
| DE | 102010004920 A1 | 7/2011 |
| DE | 102010006323 A1 | 8/2011 |
| DE | 102008004158 B4 | 10/2011 |
| DE | 102008004159 B4 | 10/2011 |
| DE | 102008004160 B4 | 10/2011 |
| DE | 102010021052 A1 | 11/2011 |
| DE | 102011104256 A1 | 7/2012 |
| DE | 102011101990 B3 | 10/2012 |
| DE | 102012005707 A1 | 10/2012 |
| DE | 102011108440 A1 | 1/2013 |
| DE | 102011120814 A1 | 6/2013 |
| DE | 102012019234 A1 | 4/2014 |
| EP | 0418653 A1 | 3/1991 |
| EP | 0849144 A2 | 6/1998 |
| EP | 1245445 A2 | 10/2002 |
| EP | 1361543 A2 | 11/2003 |
| EP | 1442931 A2 | 8/2004 |
| EP | 1695888 A2 | 8/2006 |
| EP | 1593552 B1 | 3/2007 |
| EP | 2168815 A1 | 3/2010 |
| EP | 2199188 A2 | 6/2010 |
| EP | 2431225 A1 | 3/2012 |
| EP | 2452549 A1 | 5/2012 |
| EP | 2551132 A1 | 1/2013 |
| EP | 2644477 A1 | 10/2013 |
| EP | 1569073 B1 | 9/2014 |
| EP | 2803964 A2 | 11/2014 |
| FR | 2515379 A1 | 10/1981 |
| FR | 2606717 A1 | 5/1988 |
| FR | 2716145 A1 | 8/1995 |
| FR | 2786456 A1 | 6/2000 |
| FR | 2980750 A1 | 4/2013 |
| GB | 2265587 A | 10/1993 |
| GB | 2342630 A | 4/2000 |
| GB | 2398048 A | 8/2004 |
| GB | 2398049 A | 8/2004 |
| GB | 2398050 A | 8/2004 |
| JP | 63-085568 | 6/1988 |
| JP | 06-028598 A | 4/1994 |
| JP | 08289286 A | 11/1996 |
| JP | 2000267181 A | 9/2000 |
| JP | 2002012172 A | 1/2002 |
| JP | 2002068032 A | 3/2002 |
| JP | 2003148938 A | 5/2003 |
| JP | 2003175852 A | 6/2003 |
| JP | 2004114879 A | 4/2004 |
| JP | 3716722 B2 | 11/2005 |
| JP | 2008027138 A | 2/2008 |
| JP | 2008123028 A | 5/2008 |
| JP | 2009171122 A | 7/2009 |
| JP | 2012105158 A | 5/2012 |
| JP | 2012166647 A | 9/2012 |
| JP | 2014002056 A | 1/2014 |
| JP | 2014034289 A | 2/2014 |
| KR | 20060012710 A | 2/2006 |
| KR | 1020060012710 A | 2/2006 |
| KR | 20060133750 A | 12/2006 |
| KR | 1020070034729 A | 3/2007 |
| KR | 20110114897 A | 10/2011 |
| KR | 20140105199 A | 9/2014 |
| TW | 200930010 A | 7/2009 |
| WO | 8503263 A1 | 8/1985 |
| WO | 0044605 A1 | 8/2000 |
| WO | 2011117372 A1 | 9/2011 |
| WO | 2012103193 A1 | 8/2012 |
| WO | 2013048994 A1 | 4/2013 |
| WO | 2013070539 A1 | 5/2013 |
| WO | 2013081984 A1 | 6/2013 |
| WO | 2014006500 A2 | 1/2014 |
| WO | 2014019730 A1 | 2/2014 |
| WO | 2014037500 A1 | 3/2014 |
| WO | 2014123575 A1 | 8/2014 |
| WO | 2015074027 A1 | 5/2015 |

OTHER PUBLICATIONS

Kristopher Bunker, "2012 Guide to Towing", Trailer Life, 2012, pp. 1-42.

"iBall Wireless Trailer Hitch Camera", Product Listing, Amazon, Nov. 2, 2010, pp. 1-5.

M. Wagner, D. Zoebel, and A. Meroth, "An Adaptive Software and Systems Architecture for Driver Assistance Systems Based on Service Orientation" International Journal of Machine Learning and Computing, Oct. 2011, vol. 1, No. 4, pp. 359-365.

"Surround View System", ASL—Vision 360, 2010, pp. 1.

Jae Il Roh, Hyunsuk Lee, Woojin Chung, "Control of a Car with a Trailer Using the Driver Assistance System", IEEE, International Conference on Robotics and Biomimetics, Dec. 7-11, 2011; Phuket, Thailand, pp. 2890-2895.

Young Jin Lee, Sung Won Park, Hyeun Cheol Cho, Dong Seop Han, Geun Jo Han, and Kwon Soon Lee; "Development of Auto Alignment System Between Trailer and Freight Wagon Using Electronic Sensors for Intermodal Transportation" IEEE, 2010, pp. 1211-1215.

"Back-Up and Utility Light System", Back-Up Buddy Inc., Plainville, MA, pp. 1-2; date unknown.

Ford Motor Company, "09 F-150", Brochure, www.fordvehicles.com, pp. 1-30.

Michael Paine, "Heavy Vehicle Object Detection Systems", Vehicle Design and Research Pty Lmited for VicRoads, Jun. 2003, pp. 1-22.

A.M.C. Odhams; R.L. Roebuck; C. Cebon, "Implementation of Active Steering on a Multiple Trailer Long Combination Vehicle", Cambridge University, Engineering Department; Cambridge, United Kingdom, pp. 1-13; date unknown.

Douglas Newcomb, "Range Rover Evoque's Surround Camera System", Tech Feature Friday, Article, Jun. 15, 2012, pp. 1-2.

"Trailer Vision", Trailer Vision Ltd., Brochure, www.trailervision.co.uk, pp. 1-4; date unknown.

Micah Steele, R. Brent Gillespie, "Shared Control Between Human and Machine: Using a Haptic Steering Wheel to Aid in Land Vehicle Guidance", University of Michigan, pp. 1-5; date unknown.

Laszlo Palkovics, Pal Michelberger, Jozsef Bokor, Peter Gaspar, "Adaptive Identification for Heavy-Truck Stability Control", Vehicle Systems Dynamics Supplement, vol. 25, No. sup1, 1996, pp. 502-518.

David Hodo, John Hung, Bob Selfridge, Andrew Schwartz, "Robotic DGM Tow Vehicle Project Overview", Auburn University, US Army Corp of Engineers, pp. 1-9; date unknown.

"Convenience and Loadspace Features" Jaguar Land Rover Limited, 2012, pp. 1-15, http://www.landrover.com/us/en/lr/all-new-range-rover/explore/.

"Rearview Parking Assist Systems", Donmar Sunroofs & Accessories, Brochure, Aug. 2013, pp. 1-13.

"Alpine Electronics Introduces Two New Drive Assist Solutions", Alpine Electronics of America, Inc., Jan. 7, 2010, pp. 1-2.

(56) References Cited

OTHER PUBLICATIONS

"Delphi Lane Departure Warning", Delphi Corporation, Troy, Michigan pp. 1-2; date unknown.

Jesus Morales, Anthony Mandow, Jorge L. Martinez, and Alfonso Garcia-Cerezo, "Driver Assistance System for Backward Maneuvers in Passive Multi-trailer Vehicles", International Conference on Intelligent Robots and Systems (IROS), Oct. 7-12, 2012, pp. 4853-4858.

"The Vehicle Rear Lighting System for Safe Driving in Reverse", White Night Rear Lighting Systems, Cruiser Stainless Accessories, pp. 1-3; date unknown.

"Ford Super Duty: Truck Technology", Brochure, www.media.ford.com, Sep. 2011, pp. 1-2.

"Ford Guide to Towing", Trailer Life, Magazine, 2012, pp. 1-38.

"Dodge Dart: The Hot Compact Car", Brochure, www.dart-mouth.com/enginerring-development.html, pp. 1-6; date unknown.

M. Wagner, D. Zoebel, and A. Meroth, "Adaptive Software and Systems Architecture for Driver Assistance Systems" International Journal of Machine Learning and Computing, Oct. 2011, vol. 1, No. 4, pp. 359-365.

Christian Lundquist, Wolfgang Reinelt, Olof Enqvist, "Back Driving Assistant for Passenger Cars with Trailer", SAE Int'l, ZF Lenksysteme Gmbh, Schwaebisch Gmuend, Germany, 2006, pp. 1-8.

"Understanding Tractor-Trailer Performance", Caterpillar, 2006, pp. 1-28.

Divelbiss, A.W.; Wen, J.T.; "Trajectory Tracking Control of a Car-Trailer System", IEEE, Control Systems Technology, Aug. 6, 2002, vol. 5, No. 3, ISSN: 1063-6536, pp. 269-278.

Stahn, R.; Heiserich, G.; Stopp, A., "Laser Scanner-Based Navigation for Commercial Vehicles", IEEE, Intelligent Vehicles Symposium, Jun. 2007, pp. 969-974, print ISBN: 1931-0587.

Widrow, B.; Lamego, M.M., "Neurointerfaces: Applications", IEEE, Adaptive Systems for Signal Processing, Communications, and Control Symposium, Oct. 2000, pp. 441-444.

Dieter Zoebel, David Polock, Philipp Wojke, "Steering Assistance for Backing Up Articulated Vehicles", Systemics, Cybernetics and Informatics, Universitaet Koblenz-Landau, Germany, vol. 1, No. 5, pp. 101-106; date unknown.

Stephen K. Young, Carol A. Eberhard, Philip J. Moffa, "Development of Performance Specifications for Collision Avoidance Systems for Lane Change, Merging and Backing", TRW Space and Electronics Group, Feb. 1995, pp. 1-31.

Ford Motor Company, "09 F-150", Brochure, www.fordvehicles.com, pp. 1-30; date unknown.

Claudio Altafini, Alberto Speranzon, and Karl Henrik Johansson, "Hybrid Control of a Truck and Trailer Vehicle", Springer-Verlag Berlin Heidelberg, HSCC 2002, LNCS 2289; 2002, pp. 21-34.

"2012 Edge—Trailer Towing Selector", Brochure, Preliminary 2012 RV & Trailer Towing Guide Information, pp. 1-3.

"Meritor Wabco Reverse Detection Module for Trailers with 12-Volt Constant Power Systems", Technical Bulletin, TP-02172, Revised Oct. 2004, pp. 1-8.

Simonoff, Adam J., "USH0001469 Remotely Piloted Vehicle Control and Interface System", Aug. 1, 1995, pp. 1-7.

"Range Rover Evoque's Surround Camera System"; MSN Douglas Newcomb Jun. 15, 2012, pp. 1-2.

"Electronic Trailer Steering", VSE, Advanced Steering & Suspension Solutions, Brochure, 2009, The Netherlands, pp. 1-28.

"WABCO Electronic Braking System—New Generation", Vehicle Control Systems—An American Standard Company, www.wabco-auto.com, 2004, pp. 1-8.

T. Wang, "Reverse-A-Matic-Wheel Direction Sensor System Operation and Installation Manual", Dec. 15, 2005, pp. 1-9.

"Wireless-Enabled Microphone, Speaker and User Interface for a Vehicle", The IP.com, Aug. 26, 2004, pp. 1-5, IP.com disclosure No. IPCOM000030782D.

"RFID Read/Write Module", Grand Idea Studio, 2013, pp. 1-3, website, http://www.grandideastudio.com/portfolio/rfid-read-write-module/.

"Electric Power Steering", Toyota Hybrid System Diagnosis—Course 072, Section 7, pp. 1-10; date unknown.

"Telematics Past, Present, and Future," Automotive Service Association, www.ASAshop.org, May 2008, 20 pgs.

"Fully Automatic Trailer Tow Hitch With LIN Bus," https://webista.bmw.com/webista/show?id=1860575499&lang=engb&print=1, pp. 1-5; date unknown.

Jung-Hoon Hwang, Ronald C. Arkin, and Dong-Soo Kwon; "Mobile robots at your fingertip: Bezier curve on-line trajectory generation for supervisory control," IEEE/RSJ, International Conference on Intelligent Robots and Systems, Las Vegas, Nevada, Oct. 2003, 6 pages.

M. Khatib, H. Jaouni, R. Chatila, and J.P. Laumond; "Dynamic Path Modification for Car-Like Nonholonomic Mobile Robots," IEEE, International Conference on Robotics and Automation, Albuquerque, New Mexico, Apr. 1997, 6 pages.

Nüsser, René; Pelz, Rodolfo Mann, "Bluetooth-based Wireless Connectivity in an Automotive Environment", VTC, 2000, pp. 1935-1942.

Whitfield, Kermit, "A Hitchhiker's Guide to the Telematics Ecosystem", Automotive Design & Production, Oct. 1, 2003, 3 pgs.

Narasimhan, N.; Janssen, C.; Pearce, M.; Song, Y., "A Lightweight Remote Display Management Protocol for Mobile Devices", 2007, IEEE, pp. 711-715.

Microsoft, Navigation System, Sync Powered by Microsoft, Ford Motor Company, Jul. 2007, 164 pgs.

Microsoft, Supplemental Guide, Sync Powered by Microsoft, Ford Motor Company, Nov. 2007, 86 pgs.

Voelcker, J., "Top 10 Tech Cars: It's the Environment, Stupid", IEEE Spectrum, Apr. 2008, pp. 26-35.

Microsoft, Navigation System, Sync Powered by Microsoft, Ford Motor Company, Oct. 2008, 194 pgs.

Microsoft, Supplemental Guide, Sync Powered by Microsoft, Ford Motor Company, Oct. 2008, 83 pgs.

Chantry, Darryl, "Mapping Applications to the Cloud", Microsoft Corporation, Jan. 2009, 20 pgs.

Yarden, Raam; Surage Jr., Chris; Kim, Chong Il; Doboli, Alex; Voisan, Emil; Purcaru, Constantin, "TUKI: A Voice-Activated Information Browser", 2009, IEEE, pp. 1-5.

Gil-Castiñeira, Felipe; Chaves-Diéguez, David; González-Castaño, Francisco J., "Integration of Nomadic Devices with Automotive User Interfaces", IEEE Transactions on Consumer Electronics, Feb. 2009, vol. 55, Issue 1, pp. 34-41.

Microsoft, Navigation System, Sync Powered by Microsoft, Ford Motor Company, Jul. 2009, 196 pgs.

Microsoft, Supplemental Guide, Sync Powered by Microsoft, Ford Motor Company, Aug. 2009, 87 pgs.

Goodwin, Antuan, "Ford Unveils Open-Source Sync Developer Platform", The Car Tech Blog, Oct. 29, 2009, 5 pgs. [Retrieved from http://reviews.cnet.com/8301-13746_7-10385619-48.html on Feb. 15, 2011].

Lamberti, Ralf, "Full Circle: The Rise of Vehicle-Installed Telematics",Telematics Munich, Nov. 10, 2009, 12 pgs.

"Apple Files Patent Which Could Allow You to Control Your Computer Remotely Using iPhone", Dec. 18, 2009, 7 pgs [Retrieved from www.iphonehacks.com on Jun. 22, 2010].

Newmark, Zack, "Student develop in-car cloud computing apps; envision the future of in-car connectivity", May 4, 2010, 3 pgs [Retrieved from www.worldcarfans.com on Jun. 18, 2010].

"Service Discovery Protocol (SDP)", Palo Wireless Bluetooth Resource Center, 7 pgs [Retrieved from http://palowireless.com/infotooth/tutorial/sdp.asp on Aug. 3, 2010].

Sonnenberg, Jan, "Service and User Interface Transfer from Nomadic Devices to Car Infotainment Systems", Second International Conference on Automotive User Interfaces and Interactive Vehicular Applications (Automotive UI), Nov. 11-12, 2010, pp. 162-165.

"MobileSafer makes it easy to keep connected and safe", ZoomSafer Inc., 2010, 5 pgs. [Retrieved from http://zoomsafer.com/products/mobilesafer on Dec. 28, 2010].

"PhonEnforcer FAQs", Turnoffthecellphone.com, 3 pgs. [Retrieved from http://turnoffthecellphone.com/faq.html on Dec. 28, 2010].

(56) References Cited

OTHER PUBLICATIONS

"How PhonEnforcer Works", Turnoffthecellphone.com, 2 pgs. [Retrieved from http://turnoffthecellphone.com/howitworks.htm on Dec. 28, 2010].
European Patent Office, European Search Report for Application No. EP11151623, dated Feb. 15, 2011, 7 pgs.
Wikipedia, "X Window System", Wikipedia, The Free Encyclopedia, date unknown, 19 pgs. [Retrieved from http://en.wikipedia.org/w/index.php?title=X_Window_System&oldid=639253038].

* cited by examiner

TRAILER BACKUP ASSIST SYSTEM WITH WAYPOINT SELECTION

CROSS-REFERENCE TO RELATED APPLICATIONS

This patent application is continuation-in-part of U.S. patent application Ser. No. 14/257,384 which was filed on Apr. 21, 2014, entitled "TRAILER BACKUP ASSIST SYSTEM WITH TRAJECTORY PLANNER FOR MULTIPLE WAYPOINTS," now U.S. Pat. No. 9,238,483, which is a continuation-in-part of U.S. patent application Ser. No. 14/256,427, which was filed on Apr. 18, 2014, entitled "CONTROL FOR TRAILER BACKUP ASSIST SYSTEM," now U.S. Pat. No. 9,493,187, which is a continuation in part of U.S. patent application Ser. No. 14/249,781, which was filed on Apr. 10, 2014, entitled "SYSTEM AND METHOD FOR CALCULATING A HORIZONTAL CAMERA TO TARGET DISTANCE," now U.S. Pat. No. 9,374,562, which is a continuation-in-part of U.S. patent application Ser. No. 14/188,213, which was filed on Feb. 24, 2014, entitled "SENSOR SYSTEM AND METHOD FOR MONITORING TRAILER HITCH ANGLE," which is a continuation-in-part of U.S. patent application Ser. No. 13/847,508, which was filed on Mar. 20, 2013, entitled "HITCH ANGLE ESTIMATION." U.S. patent application Ser. No. 14/188,213 is also a continuation-in-part of U.S. patent application Ser. No. 14/068,387, which was filed on Oct. 31, 2013, entitled "TRAILER MONITORING SYSTEM AND METHOD," now U.S. Pat. No. 9,102,271, which is a continuation-in-part of U.S. patent application Ser. No. 14/059,835, which was filed on Oct. 22, 2013, entitled "TRAILER BACKUP ASSIST SYSTEM," now U.S. Pat. No. 9,248,858, which is a continuation-in-part of U.S. patent application Ser. No. 13/443,743 which was filed on Apr. 10, 2012, now U.S. Pat. No. 8,825,328 entitled "DETECTION OF AND COUNTERMEASURES FOR JACKKNIFE ENABLING CONDITIONS DURING TRAILER BACKUP ASSIST," which is a continuation-in-part of U.S. patent application Ser. No. 13/336,060, which was filed on Dec. 23, 2011, now U.S. Pat. No. 8,909,426, entitled "TRAILER PATH CURVATURE CONTROL FOR TRAILER BACKUP ASSIST," which claims benefit of U.S. Provisional Patent Application No. 61/477,132, which was filed on Apr. 19, 2011, entitled "TRAILER BACKUP ASSIST CURVATURE CONTROL." U.S. Pat. No. 9,374,562 is also a continuation-in-part of U.S. Pat. No. 9,346,396 which was filed Jan. 23, 2014, entitled "SUPPLEMENTAL VEHICLE LIGHTING SYSTEM FOR VISION BASED TARGET DETECTION," which is a continuation-in-part of U.S. patent application Ser. No. 14/059,835 which was filed on Oct. 22, 2013, entitled "TRAILER BACKUP ASSIST SYSTEM," now U.S. Pat. No. 9,248,858. Furthermore, U.S. Pat. No. 9,374,562 is a continuation-in-part of U.S. application Ser. No. 14/201,130 which was filed on Mar. 7, 2014, entitled "SYSTEM AND METHOD OF CALIBRATING A TRAILER BACKUP ASSIST SYSTEM," now U.S. Pat. No. 9,290,202 which is a continuation-in-part of U.S. patent application Ser. No. 14/068,387, which was filed on Oct. 31, 2013, entitled "TRAILER MONITORING SYSTEM AND METHOD." The aforementioned related applications are hereby incorporated by reference in their entirety.

FIELD OF THE INVENTION

The disclosure made herein relates generally to driver assist and active safety technologies in vehicles, and more particularly to a trailer backup assist system that has a trajectory planner configured with a controller to guide a trailer to a selected waypoint position.

BACKGROUND OF THE INVENTION

Reversing a vehicle while towing a trailer is very challenging for many drivers. This is particularly true for drivers that are unskilled at backing vehicles with attached trailers, which may include those that drive with a trailer on an infrequent basis (e.g., have rented a trailer, use a personal trailer on an infrequent basis, etc.). One reason for such difficulty is that backing a vehicle with an attached trailer requires steering inputs that are opposite to normal steering when backing the vehicle without a trailer attached and/or requires braking to stabilize the vehicle-trailer combination before a jackknife condition occurs. Another reason for such difficulty is that small errors in steering while backing a vehicle with an attached trailer are amplified thereby causing the trailer to depart from a desired path.

To assist the driver in steering a vehicle with a trailer attached, a trailer backup assist system needs to know the driver's intention. One common assumption with known trailer backup assist systems is that a driver of a vehicle with an attached trailer wants to backup straight and the system either implicitly or explicitly assumes a zero curvature path for the vehicle-trailer combination. Unfortunately most of the real-world use cases of backing a trailer involve a curved path and, thus, assuming a path of zero curvature would significantly limit usefulness of the system.

Another reason backing a trailer can prove to be difficult is the need to control the vehicle in a manner that limits the potential for a jackknife condition to occur. A trailer has attained a jackknife condition when a hitch angle cannot be reduced (i.e., made less acute) while continuously backing up a trailer by application of a maximum steering input for the vehicle such as, for example, by moving steered front wheels of the vehicle to a maximum steered angle at a maximum rate of steering angle change. In the case of the jackknife angle being achieved, the vehicle must be pulled forward to relieve the hitch angle in order to eliminate the jackknife condition and, thus, allow the hitch angle to be controlled via manipulation of the steered wheels of the vehicle. However, in addition to the jackknife condition creating the inconvenient situation where the vehicle must be pulled forward, it can also lead to damage to the vehicle and/or trailer if certain operating conditions of the vehicle relating to its speed, engine torque, acceleration, and the like are not detected and counteracted. For example, if the vehicle is travelling at a suitably high speed in reverse and/or subjected to a suitably high longitudinal acceleration when the jackknife condition is achieved, the relative movement of the vehicle with respect to the trailer can lead to contact between the vehicle and trailer thereby damaging the trailer and/or the vehicle.

SUMMARY OF THE INVENTION

According to one aspect of the present invention, a method of backing a trailer attached to a vehicle is provided. The method includes the steps of generating a plurality of waypoints on a display of the vehicle and selecting one of the plurality waypoints. The method also includes setting a trailer orientation for the selected waypoint and determining a backing path based on the selected waypoint and the set trailer orientation. The method further includes backing the trailer along the backing path.

According to another aspect of the present invention, a method of backing a trailer attached to a vehicle is provided. The method includes the steps of generating a plurality of waypoints on a display of the vehicle and selecting one of the plurality waypoints. The method also includes setting a trailer orientation for the selected waypoint and determining a backing path based on the selected waypoint and the set trailer orientation. The method further includes backing the trailer along the backing path and autonomously steering the vehicle while backing the trailer along the backing path.

According to a further aspect of the present invention, a method of backing a trailer attached to a vehicle is provided. The method includes the steps of generating a plurality of waypoints on a display of the vehicle and selecting one of the plurality waypoints. The method also includes setting a trailer orientation for the selected waypoint and determining a backing path based on the selected waypoint and the set trailer orientation. The method further includes backing the trailer along the backing path and modifying the backing path while backing the trailer along the backing path.

These and other features, advantages, and objects of the present invention will be further understood and appreciated by those skilled in the art by reference to the following specification, claims, and appended drawings.

DETAILED DESCRIPTION OF THE PREFERRED EMBODIMENTS

Figure 1:
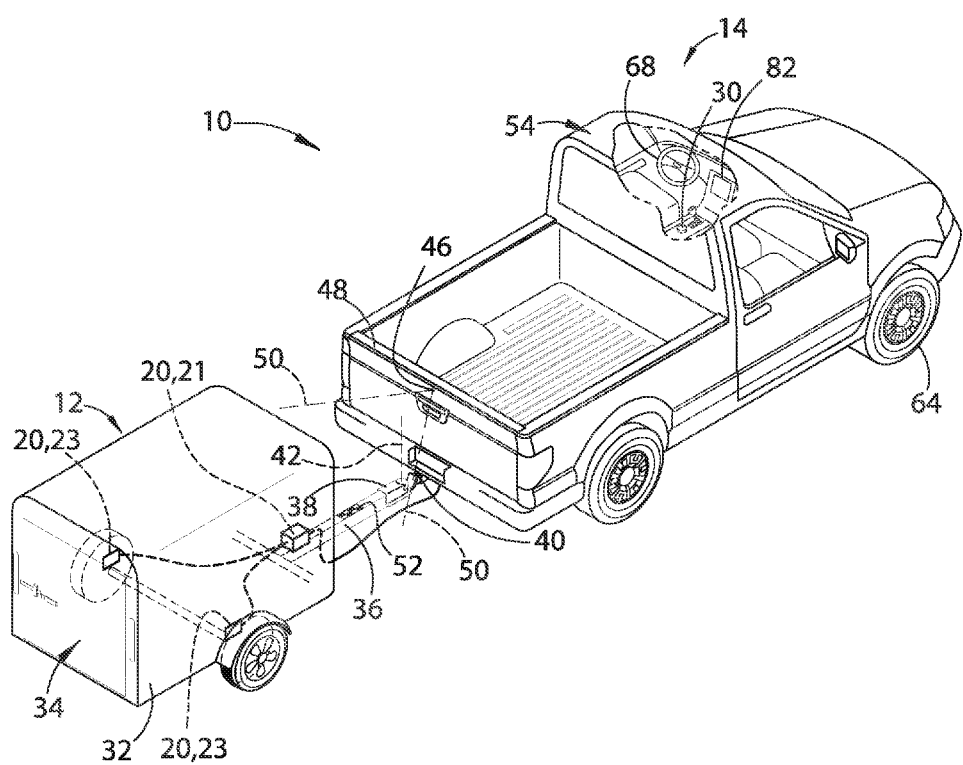
FIG. 1 is a top perspective view of a vehicle attached to a trailer with one embodiment of a hitch angle sensor for operating a trailer backup assist system.

For purposes of description herein, it is to be understood that the disclosed trailer backup assist system and the related methods may assume various alternative embodiments and orientations, except where expressly specified to the contrary. It is also to be understood that the specific devices and processes illustrated in the attached drawings, and described in the following specification, are simply exemplary embodiments of the inventive concepts defined in the appended claims. While various aspects of the trailer backup assist system and the related methods are described with reference to a particular illustrative embodiment, the disclosed invention is not limited to such embodiments, and additional modifications, applications, and embodiments may be implemented without departing from the disclosed invention. Hence, specific dimensions and other physical characteristics relating to the embodiments disclosed herein are not to be considered as limiting, unless the claims expressly state otherwise.

Referring to FIGS. 1-9, reference numeral 10 generally designates a trailer backup assist system for controlling a backing path of a trailer 12 attached to a vehicle 14 by allowing a driver of the vehicle 14 to specify a desired curvature 26 of the backing path of the trailer 12. In one embodiment, the trailer backup assist system 10 automatically steers the vehicle 14 to guide the trailer 12 on the desired curvature or backing path 26 as a driver uses the accelerator and brake pedals to control the reversing speed of the vehicle 14. To monitor the position of the trailer 12 relative to the vehicle 14, the trailer backup assist system 10 may include a sensor system 16 that senses or otherwise determines a hitch angle γ between the trailer 12 and the vehicle 14. In one embodiment, the sensor system 16 may include a sensor module 20 attached to the trailer 12 that monitors the dynamics of the trailer 12, such as yaw rate, and communicates with a controller 28 of the trailer backup assist system 10 to determine the instantaneous hitch angle γ. Accordingly, one embodiment of a sensor module 20 is adapted to attach to the trailer 12 and generate a trailer yaw rate $\omega_2$. The trailer backup assist system 10, according to such an embodiment, may also include a vehicle sensor system 17 that generates a vehicle yaw rate $\omega_1$ and a vehicle speed $v_1$. The controller 28 of the trailer backup assist system 10 may thereby estimate a hitch angle γ based on the trailer yaw rate $\omega_2$, the vehicle yaw rate $\omega_1$, and the vehicle speed $v_1$ in view of a kinematic relationship between the trailer 12 and the vehicle 14. In another embodiment, the sensor system 16 may additionally or alternatively include a hitch angle sensor 44, such as a vision-based system that employs a camera 46 on the vehicle 14 to monitor a target 52 on the trailer 12 to determine the hitch angle γ and in some embodiments further increase reliability of the overall estimated hitch angle γ.

With respect to the general operation of the trailer backup assist system 10, a steering input device 18 may be provided, such as a rotatable knob 30, for a driver to provide the desired curvature 26 of the trailer 12. As such, the steering input device 18 may be operable between a plurality of selections, such as successive rotated positions of a knob 30, that each provide an incremental change to the desired curvature 26 of the trailer 12. Upon inputting the desired curvature 26, the controller 28 may generate a steering command for the vehicle 14 to guide the trailer 12 on the desired curvature 26 based on the estimated hitch angle γ and a kinematic relationship between the trailer 12 and the vehicle 14. Therefore, the accuracy of the hitch angle estimation is critical to operating the trailer backup assist system 10. However, it is appreciated that such a system for instantaneously estimating hitch angle may be used in association with additional or alternative vehicle features, such as trailer sway monitoring.

With reference to the embodiment shown in FIG. 1, the vehicle 14 is a pickup truck embodiment that is equipped with one embodiment of the trailer backup assist system 10 for controlling the backing path of the trailer 12 that is attached to the vehicle 14. Specifically, the vehicle 14 is pivotally attached to one embodiment of the trailer 12 that has a box frame 32 with an enclosed cargo area 34, a single axle having a right wheel assembly and a left wheel assembly, and a tongue 36 longitudinally extending forward from the enclosed cargo area 34. The illustrated trailer 12 also has a trailer hitch connector in the form of a coupler assembly 38 that is connected to a vehicle hitch connector in the form of a hitch ball 40. The coupler assembly 38 latches onto the hitch ball 40 to provide a pivoting ball joint connection 42 that allows for articulation of the hitch angle γ. It should be appreciated that additional embodiments of the trailer 12 may alternatively couple with the vehicle 14 to provide a pivoting connection, such as by connecting with a fifth wheel connector. It is also contemplated that additional embodiments of the trailer may include more than one axle and may have various shapes and sizes configured for different loads and items, such as a boat trailer or a flatbed trailer.

Still referring to FIG. 1, the sensor system 16 in the illustrated embodiment includes both a sensor module 20 and a vision-based hitch angle sensor 44 for estimating the hitch angle γ between the vehicle 14 and the trailer 12. The illustrated hitch angle sensor 44 employs a camera 46 (e.g., video imaging camera) that may be located proximate an upper region of the vehicle tailgate 48 at the rear of the vehicle 14, as shown, such that the camera 46 may be elevated relative to the tongue 36 of the trailer 12. The illustrated camera 46 has an imaging field of view 50 located and oriented to capture one or more images of the trailer 12, including a region containing one or more desired target placement zones for at least one target 52 to be secured. Although it is contemplated that the camera 46 may capture images of the trailer 12 without a target 52 to determine the hitch angle γ, in the illustrated embodiment, the trailer backup assist system 10 includes a target 52 placed on the trailer 12 to allow the trailer backup assist system 10 to utilize information acquired via image acquisition and processing of the target 52. For instance, the illustrated camera 46 may include a video imaging camera that repeatedly captures successive images of the trailer 12 that may be processed to identify the target 52 and its location on the trailer 12 for determining movement of the target 52 and the trailer 12 relative to the vehicle 14 and the corresponding hitch angle γ. It should also be appreciated that the camera 46 may include one or more video imaging cameras and may be located at other locations on the vehicle 14 to acquire images of the trailer 12 and the desired target placement zone, such as on a passenger cab 54 of the vehicle 14 to capture images of a gooseneck trailer. Furthermore, it is contemplated that additional embodiments of the hitch angle sensor 44 and the sensor system 16 for providing the hitch angle γ may include one or a combination of a potentiometer, a magnetic-based sensor, an optical sensor, a proximity sensor, a rotational sensor, a capacitive sensor, an inductive sensor, or a mechanical based sensor, such as a mechanical sensor assembly mounted to the pivoting ball joint connection 42, energy transducers of a reverse aid system, a blind spot system, and/or a cross traffic alert system, and other conceivable sensors or indicators of the hitch angle γ to supplement or be used in place of the vision-based hitch angle sensor 44.

The embodiment of the sensor module 20 illustrated in FIG. 1 includes a housed sensor cluster 21 mounted on the tongue 36 of the trailer 12 proximate the enclosed cargo area 34 and includes left and right wheel speed sensors 23 on laterally opposing wheels of the trailer 12. It is conceivable that the wheel speed sensors 23 may be bi-directional wheel speed sensors for monitoring both forward and reverse speeds. Also, it is contemplated that the sensor cluster 21, in additional embodiments, may be mounted on alternative portions of the trailer 12.

The sensor module 20 generates a plurality of signals indicative of various dynamics of the trailer 12. The signals may include a yaw rate signal, a lateral acceleration signal, and wheel speed signals generated respectively by a yaw rate sensor 25, an accelerometer 27, and the wheel speed sensors 23. Accordingly, in the illustrated embodiment, the yaw rate sensor 25 and the accelerometer 27 are contained within the housed sensor cluster 21, although other configurations are conceivable. It is conceivable that the accelerometer 27, in some embodiments, may be two or more separate sensors and may be arranged at an offset angle, such as two sensors arranged at plus and minus forty-five degrees from the longitudinal direction of the trailer or arranged parallel with the longitudinal and lateral directions of the trailer, to generate a more robust acceleration signal. It is also contemplated that these sensor signals could be compensated and filtered to remove offsets or drifts, and smooth out noise. Further, the controller 28 may utilize processed signals received outside of the sensor system 16, including standard signals from the brake control system 72 and the power assist steering system 62, such as vehicle yaw rate $\omega_1$, vehicle speed $v_1$, and steering angle $\delta$, to estimate the trailer hitch angle $\gamma$, trailer speed, and related trailer parameters. As described in more detail below, the controller 28 may estimate the hitch angle $\gamma$ based on the trailer yaw rate $\omega_2$, the vehicle yaw rate $\omega_1$, and the vehicle speed $v_1$ in view of a kinematic relationship between the trailer 12 and the vehicle 14. The controller 28 of the trailer backup assist system 10 may also utilize the estimated trailer variables and trailer parameters to control the steering system 62, brake control system 72, and the powertrain control system 74, such as to assist backing the vehicle-trailer combination or to mitigate a trailer sway condition.

Figure 2:
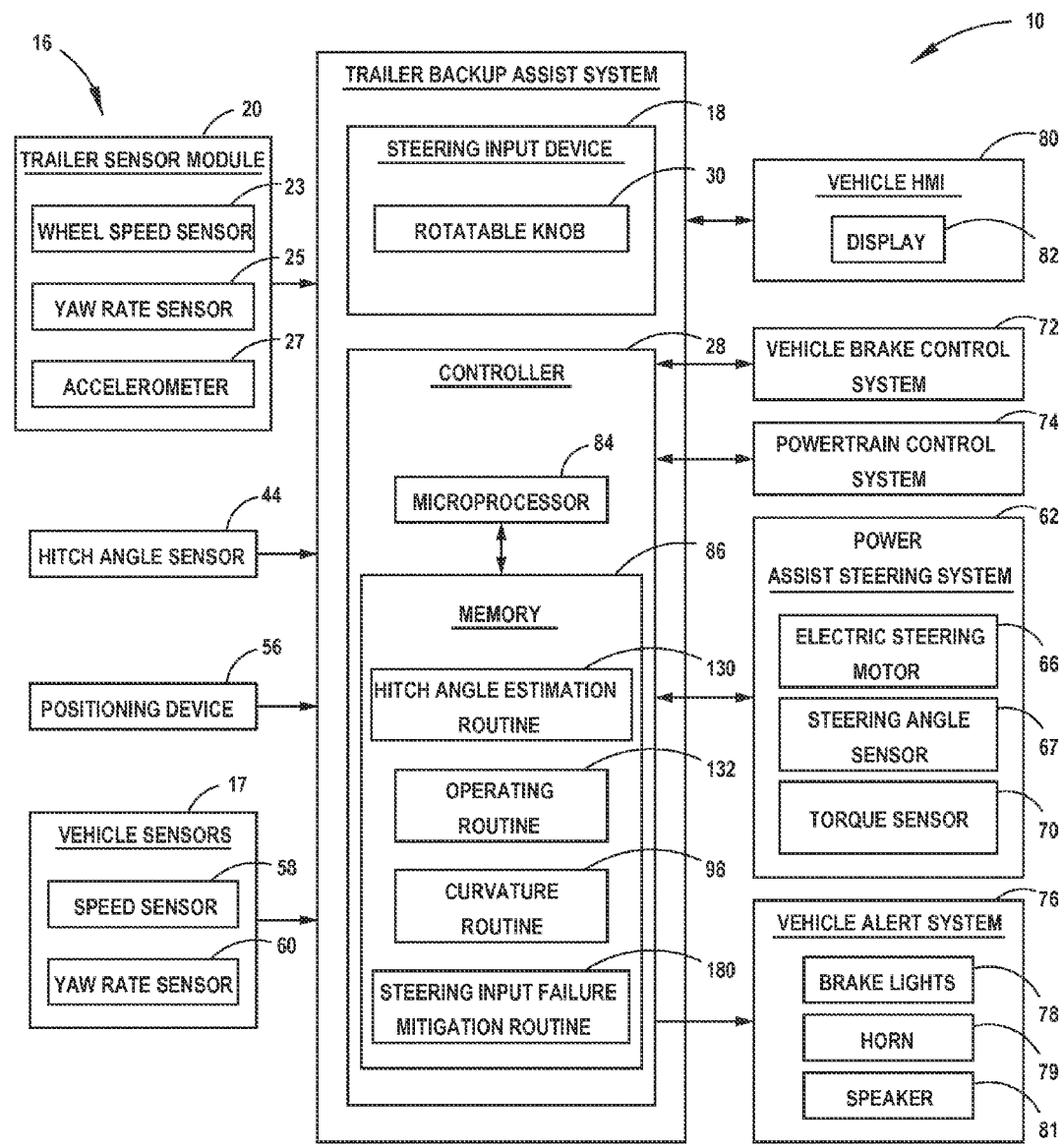
FIG. 2 is a block diagram illustrating one embodiment of the trailer backup assist system having a steering input device, a curvature controller, and a trailer braking system.

With reference to the embodiment of the trailer backup assist system 10 shown in FIG. 2, the trailer backup assist system 10 may receive vehicle and trailer status-related information from additional sensors and devices. The additional sensors and devices may be used in lieu of the hitch angle sensor 44 or the sensor module 20 in the event that one or more sensors (e.g., hitch angle sensor 44) used for determining the hitch angle $\gamma$ fail. This trailer status-related information includes positioning information from a positioning device 56, which may include a global positioning system (GPS) on the vehicle 14 or a hand held device, to determine a coordinate location of the vehicle 14 and the trailer 12 based on the location of the positioning device 56 with respect to the trailer 12 and/or the vehicle 14 and based on the estimated hitch angle $\gamma$. The positioning device 56 may additionally or alternatively include a dead reckoning system for determining the coordinate location of the vehicle 14 and the trailer 12 within a localized coordinate system based at least on vehicle speed, steering angle, and hitch angle $\gamma$. Other vehicle information received by the trailer backup assist system 10 may include a speed of the vehicle 14 from a speed sensor 58 and a yaw rate of the vehicle 14 from a vehicle yaw rate sensor 60. It is contemplated that in additional embodiments, the hitch angle sensor 44 and other vehicle sensors and devices may provide sensor signals or other information, such as proximity sensor signals or successive images of the trailer 12, that the controller of the trailer backup assist system 10 may process with various routines to determine an indicator of the hitch angle $\gamma$, such as a range of hitch angles.

As further shown in FIG. 2, one embodiment of the trailer backup assist system 10 is in communication with a power assist steering system 62 of the vehicle 14 to operate the steered wheels 64 (FIG. 1) of the vehicle 14 for moving the vehicle 14 in such a manner that the trailer 12 reacts in accordance with the desired curvature 26 of the trailer 12. In the illustrated embodiment, the power assist steering system 62 is an electric power-assisted steering (EPAS) system that includes an electric steering motor 66 for turning the steered wheels 64 to a steering angle based on a steering command, whereby the steering angle may be sensed by a steering angle sensor 67 of the power assist steering system 62. The steering command may be provided by the trailer backup assist system 10 for autonomously steering during a backup maneuver and may alternatively be provided manually via a rotational position (e.g., steering wheel angle) of a steering wheel 68 (FIG. 1). However, in the illustrated embodiment, the steering wheel 68 of the vehicle 14 is mechanically coupled with the steered wheels 64 of the vehicle 14, such that the steering wheel 68 moves in concert with steered wheels 64 via an internal torque, preventing manual intervention with the steering wheel 68 during autonomous steering. More specifically, a torque sensor 70 is provided on the power assist steering system 62 that senses torque (e.g., gripping and/or turning) on the steering wheel 68 that is not expected from autonomous control of the steering wheel 68 and therefore indicative of manual intervention by the driver. In some embodiments, external torque applied to the steering wheel 68 may serve as a signal to the controller 28 that the driver has taken manual control and for the vehicle 14 to discontinue steering maneuvers and/or alerts.

In alternative embodiments, some vehicles have a power assist steering system 62 that allows a steering wheel 68 to be partially decoupled from movement of the steered wheels 64 of such a vehicle. Accordingly, the steering wheel 68 can be rotated independent of the manner in which the power assist steering system 62 of the vehicle controls the steered wheels 64 (e.g., autonomous steering as commanded by the trailer backup assist system 10). As such, in these types of vehicles where the steering wheel 68 can be selectively decoupled from the steered wheels 64 to allow independent operation thereof, the steering wheel 68 may be used as a steering input device 18 for the trailer backup assist system 10, as disclosed in greater detail herein.

Referring again to the embodiment illustrated in FIG. 2, the power assist steering system 62 provides the controller 28 of the trailer backup assist system 10 with information relating to a rotational position of steered wheels 64 of the vehicle 14, including a steering angle. The controller 28 in the illustrated embodiment processes the current steering angle, in addition to other vehicle 14 and trailer 12 conditions, to guide the trailer 12 along the desired curvature 26. It is conceivable that the trailer backup assist system 10, in additional embodiments, may be an integrated component of the power assist steering system 62. For example, the power assist steering system 62 may include a trailer backup assist algorithm for generating vehicle steering information and commands as a function of all or a portion of information received from the steering input device 18, the hitch angle sensor 44, the power assist steering system 62, a vehicle brake control system 72, a powertrain control system 74, and other vehicle sensors and devices.

As also illustrated in FIG. 2, the vehicle brake control system 72 may also communicate with the controller 28 to provide the trailer backup assist system 10 with braking information, such as vehicle wheel speed, and to receive braking commands from the controller 28. For instance, vehicle speed information can be determined from individual wheel speeds as monitored by the brake control system 72. Vehicle speed may also be determined from the powertrain control system 74, the speed sensor 58, and the positioning device 56, among other conceivable means. In some embodiments, individual wheel speeds can also be used to determine a vehicle yaw rate, which can be provided to the trailer backup assist system 10 in the alternative, or in addition to, the vehicle yaw rate sensor 60. In certain embodiments, the trailer backup assist system 10 can provide vehicle braking information to the brake control system 72 for allowing the trailer backup assist system 10 to control braking of the vehicle 14 during backing of the trailer 12. For example, the trailer backup assist system 10, in some embodiments, may regulate speed of the vehicle 14 during backing of the trailer 12, which can reduce the potential for unacceptable trailer backup conditions. Examples of unacceptable trailer backup conditions include, but are not limited to, a vehicle 14 over-speed condition, a high hitch angle rate, trailer angle dynamic instability, a calculated theoretical trailer jackknife condition (defined by a maximum vehicle steering angle, drawbar length, tow vehicle wheelbase, and an effective trailer length), or physical contact jackknife limitation (defined by an angular displacement limit relative to the vehicle 14 and the trailer 12), and the like. Unacceptable trailer backup conditions may result from the failure of one or more sensors (e.g., hitch angle sensor 44) and/or inputs (e.g., steering input device 18) on the vehicle 14 and/or trailer 12 to provide information to the controller 28 of the trailer backup assist system 10. In such events, the driver may be unaware of the failure until the unacceptable trailer backup condition is imminent or already happening. Therefore, it is disclosed herein that the trailer backup assist system 10 can generate an alert signal corresponding to a notification of an actual, impending, and/or anticipated unacceptable trailer backup condition, and prior to driver intervention, generate a counter measure to prevent such an unacceptable trailer backup condition, as further described herein.

The powertrain control system 74, as shown in the embodiment illustrated in FIG. 2, may also interact with the trailer backup assist system 10 for regulating speed and acceleration of the vehicle 14 during backing of the trailer 12. As mentioned above, regulation of the speed of the vehicle 14 may be necessary to limit the potential for unacceptable trailer backup conditions such as, for example, jackknifing and trailer angle dynamic instability, or when the failure of a sensor and/or an input device is detected. Similar to high-speed considerations as they relate to unacceptable trailer backup conditions, high acceleration and high dynamic driver curvature requests can also lead to such unacceptable trailer backup conditions.

With continued reference to FIG. 2, the trailer backup assist system 10 in the illustrated embodiment may communicate with one or more devices, including a vehicle alert system 76, which may prompt visual, auditory, and tactile warnings. For instance, vehicle brake lights 78 and vehicle emergency flashers may provide a visual alert and a vehicle horn 79 and/or speaker 81 may provide an audible alert. Additionally, the trailer backup assist system 10 and/or vehicle alert system 76 may communicate with a human machine interface (HMI) 80 for the vehicle 14. The HMI 25 may include a vehicle display 82, such as a center-stack mounted navigation or entertainment display (FIG. 1) capable of displaying images indicating the alert. Such an embodiment may be desirable to notify the driver of the vehicle 14 that a sensor and/or input device used by the backup assist system 10 had failed. Further, the trailer backup assist system 10 may communicate via wireless communication with another embodiment of the HMI 25, such as with one or more handheld or portable devices, including one or more smartphones. The portable device may also include the display 82 for displaying one or more images and other information to a user. For instance, the portable device may display an image indicating the sensor and/or input device that has failed. In addition, the portable device may provide feedback information, such as visual, audible, and tactile alerts.

As further illustrated in FIG. 2, the trailer backup assist system 10 includes the steering input device 18 that is connected to the controller 28 for allowing communication of information therebetween. It is disclosed herein that the steering input device 18 can be coupled to the controller 28 in a wired or wireless manner. The steering input device 18 provides the trailer backup assist system 10 with information defining the desired backing path of travel of the trailer 12 for the controller 28 to process and generate steering commands. More specifically, the steering input device 18 may provide a selection or positional information that correlates with a desired curvature 26 of the desired backing path of travel of the trailer 12. Also, the trailer steering commands provided by the steering input device 18 can include information relating to a commanded change in the path of travel, such as an incremental change in the desired curvature 26, and information relating to an indication that the trailer 12 is to travel along a path defined by a longitudinal centerline axis of the trailer 12, such as a desired curvature value of zero that defines a substantially straight path of travel for the trailer. Given the importance of the steering input device 18 in controlling the vehicle 14 and trailer 12 while in motion, safety systems directed toward mitigating a failure of the steering input device 18 by generating a countermeasure may be a desirable feature in the trailer backup assist system 10. Accordingly, the controller 28 of the trailer backup assist system 10 may detect failure of the steering input device 18 and engage a countermeasure when the steering input device 18 fails, until the driver regains operational control of the vehicle 14.

As will be discussed below in more detail, the steering input device 18, according to one embodiment may include a movable control input device for allowing a driver of the vehicle 14 to command desired trailer steering actions or otherwise select and alter a desired curvature. For instance, the moveable control input device may be a rotatable knob 30, which can be rotatable about a rotational axis extending through a top surface or face of the knob 30. In other embodiments, the rotatable knob 30 may be rotatable about a rotational axis extending substantially parallel to a top surface or face of the rotatable knob 30. Furthermore, the steering input device 18, according to additional embodiments, may include alternative devices for providing a desired curvature 26 or other information defining a desired backing path, such as a joystick, a keypad, a series of depressible buttons or switches, a sliding input device, various user interfaces on a touch-screen display, a vision based system for receiving gestures, a control interface on a portable device, and other conceivable input devices as generally understood by one having ordinary skill in the art. It is contemplated that the steering input device 18 may also function as an input device for other features, such as providing inputs for other vehicle features or systems.

Still referring to the embodiment shown in FIG. 2, the controller 28 is configured with a microprocessor 84 to process logic and routines stored in memory 86 that receive information from the sensor system 16, including the trailer sensor module 20, the hitch angle sensor 44, the steering input device 18, the power assist steering system 62, the vehicle brake control system 72, the trailer braking system, the powertrain control system 74, and other vehicle sensors and devices. The controller 28 may generate vehicle steering information and commands as a function of all, or a portion of, the information received. Thereafter, the vehicle steering information and commands may be provided to the power assist steering system 62 for affecting steering of the vehicle 14 to achieve a commanded path of travel for the trailer 12. The controller 28 may include the microprocessor 84 and/or other analog and/or digital circuitry for processing one or more routines. Also, the controller 28 may include the memory 86 for storing one or more routines, including a hitch angle estimation routine 130, an operating routine 132, and a curvature routine 98. It should be appreciated that the controller 28 may be a stand-alone dedicated controller or may be a shared controller integrated with other control functions, such as integrated with the sensor system 16, the power assist steering system 62, and other conceivable onboard or off-board vehicle control systems.

Figure 3:
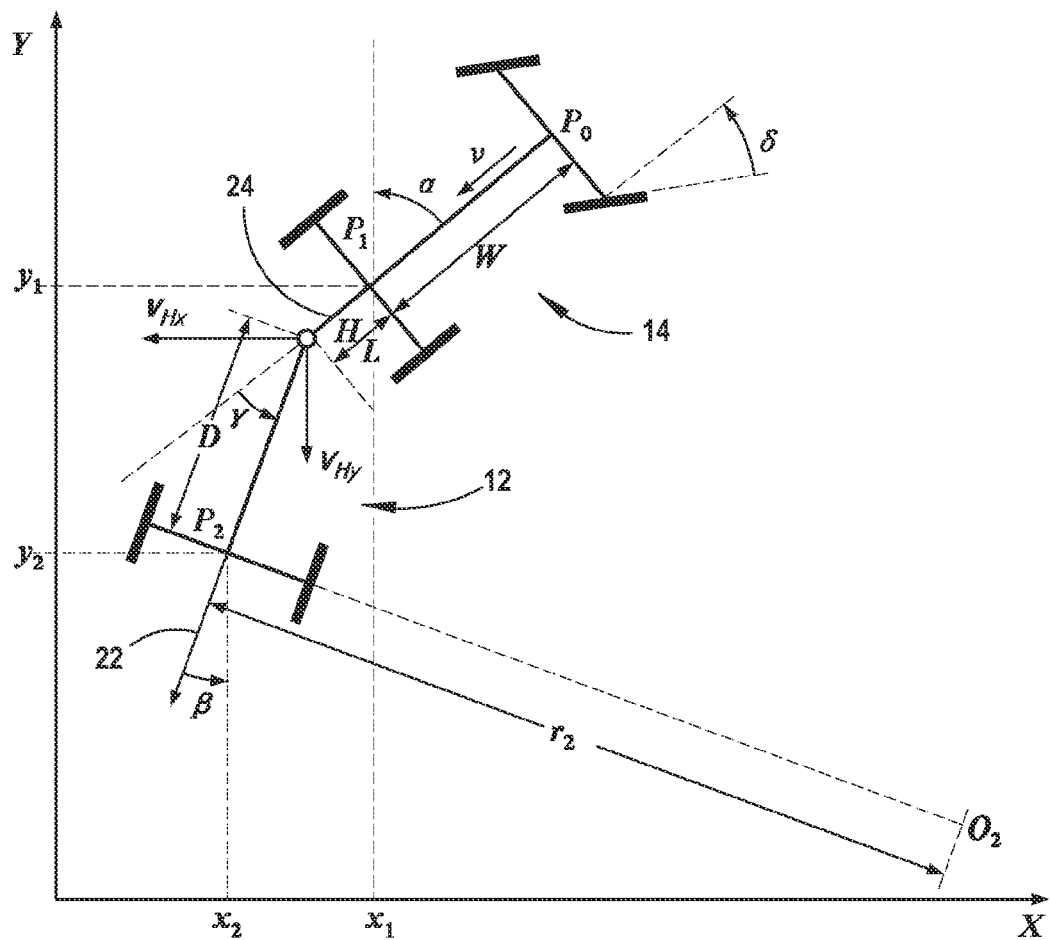
FIG. 3 is a schematic diagram that illustrates the geometry of a vehicle and a trailer overlaid with a two-dimensional x-y coordinate system, identifying variables used to determine a kinematic relationship of the vehicle and the trailer for the trailer backup assist system, according to one embodiment.

With reference to FIG. 3, we now turn to a discussion of vehicle and trailer information and parameters used to calculate a kinematic relationship between a curvature of a path of travel of the trailer 12 and the steering angle of the vehicle 14 towing the trailer 12, which can be desirable for a trailer backup assist system 10 configured in accordance with some embodiments, including for use by a curvature routine 98 of the controller 28 in one embodiment. To achieve such a kinematic relationship, certain assumptions may be made with regard to parameters associated with the vehicle/trailer system. Examples of such assumptions include, but are not limited to, the trailer 12 being backed by the vehicle 14 at a relatively low speed, wheels of the vehicle 14 and the trailer 12 having negligible (e.g., no) slip, tires of the vehicle 14 having negligible (e.g., no) lateral compliance, tires of the vehicle 14 and the trailer 12 having negligible (e.g., no) deformation, actuator dynamics of the vehicle 14 being negligible, and the vehicle 14 and the trailer 12 exhibiting negligible (e.g., no) roll or pitch motions, among other conceivable factors with the potential to have an effect on controlling the trailer 12 with the vehicle 14.

As shown in FIG. 3, for a system defined by a vehicle 14 and a trailer 12, the kinematic relationship is based on various parameters associated with the vehicle 14 and the trailer 12. These parameters include:
   $\delta$: steering angle at steered front wheels of the vehicle;
   $\alpha$: yaw angle of the vehicle;
   $\beta$: yaw angle of the trailer;
   $\gamma$: hitch angle ($\gamma=\beta-\alpha$);
   W: wheel base of the vehicle;
   L: drawbar length between hitch point and rear axle of the vehicle;
   D: distance (trailer length) between hitch point and axle of the trailer or effective axle for a multiple axle trailer; and
   $r_2$: curvature radius for the trailer.

One embodiment of a kinematic relationship between trailer path radius of curvature $r_2$ at the midpoint of an axle of the trailer 12, steering angle $\delta$ of the steered wheels 64 of the vehicle 14, and the hitch angle $\gamma$ can be expressed in the equation provided below. As such, if the hitch angle $\gamma$ is provided, the trailer path curvature $\kappa_2$ can be controlled based on regulating the steering angle $\delta$ (where $\dot\beta$ is trailer yaw rate and $\dot\eta$ is trailer velocity).

$$\kappa_2 = \frac{1}{r_2} = \frac{\dot\beta}{\dot\eta} = \frac{\left(W + \frac{KV^2}{g}\right)\sin\gamma + L\cos\gamma\tan\delta}{D\left(\left(W + \frac{KV^2}{g}\right)\cos\gamma - L\sin\gamma\tan\delta\right)}$$

This relationship can be expressed to provide the steering angle $\delta$ as a function of trailer path curvature $\kappa_2$ and hitch angle $\gamma$.

$$\delta = \tan^{-1}\left(\frac{\left(W + \frac{KV^2}{g}\right)[\kappa_2 D\cos\gamma - \sin\gamma]}{DL\kappa_2\sin\gamma + L\cos\gamma}\right) = F(\gamma, \kappa_2, K)$$

Accordingly, for a particular vehicle and trailer combination, certain parameters (e.g., D, W and L) of the kinematic relationship are constant and assumed known. V is the vehicle longitudinal speed and g is the acceleration due to gravity. K is a speed dependent parameter which when set to zero makes the calculation of steering angle independent of vehicle speed. For example, vehicle-specific parameters of the kinematic relationship can be predefined in an electronic control system of the vehicle 14 and trailer-specific parameters of the kinematic relationship can be inputted by a driver of the vehicle 14, determined from sensed trailer behavior in response to vehicle steering commands, or otherwise determined from signals provided by the trailer 12. Trailer path curvature $\kappa_2$ can be determined from the driver input via the steering input device 18. Through the use of the equation for providing steering angle, a corresponding steering command can be generated by the curvature routine 98 for controlling the power assist steering system 62 of the vehicle 14.

In an additional embodiment, an assumption may be made by the curvature routine 98 that a longitudinal distance L between the pivoting connection and the rear axle of the vehicle 14 is equal to zero for purposes of operating the trailer backup assist system 10 when a gooseneck trailer or other similar trailer is connected with a hitch ball or a fifth wheel connector located over a rear axle of the vehicle 14. The assumption essentially assumes that the pivoting connection with the trailer 12 is substantially vertically aligned with the rear axle of the vehicle 14. When such an assumption is made, the controller 28 may generate the steering angle command for the vehicle 14 as a function independent of the longitudinal distance L between the pivoting connection and the rear axle of the vehicle 14. It is appreciated that the gooseneck trailer mentioned generally refers to the tongue configuration being elevated to attach with the vehicle 14 at an elevated location over the rear axle, such as within a bed of a truck, whereby embodiments of the gooseneck trailer may include flatbed cargo areas, enclosed cargo areas, campers, cattle trailers, horse trailers, lowboy trailers, and other conceivable trailers with such a tongue configuration.

Figure 4:
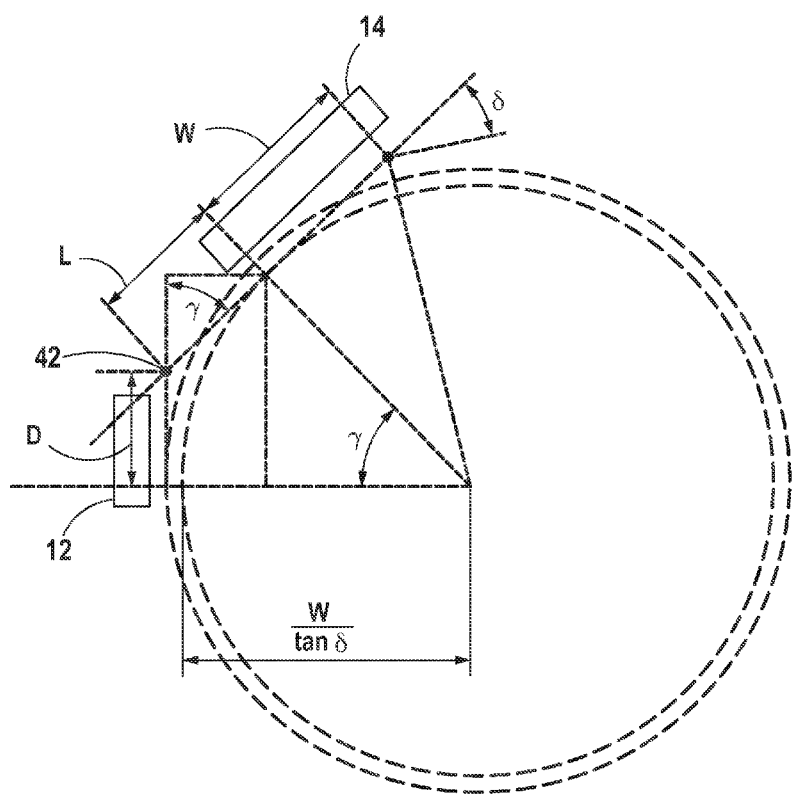
FIG. 4 is a schematic diagram showing a relationship between a hitch angle and a steering angle of the vehicle as it relates to curvature of the trailer and a jackknife angle.

Referring now to FIG. 4, in the illustrated embodiments of the disclosed subject matter, it may be desirable to limit the potential for the vehicle 14 and the trailer 12 to attain a jackknife angle (i.e., the vehicle/trailer system achieving a jackknife condition). A jackknife angle $\gamma(j)$ refers to a hitch angle $\gamma$ that while backing cannot be overcome by the maximum steering input for a vehicle such as, for example, the steered front wheels of the vehicle 14 being moved to a maximum steered angle $\delta$ at a maximum rate of steering angle change. The jackknife angle $\gamma(j)$ is a function of a maximum wheel angle for the steered wheels of the vehicle 14, the wheel base W of the vehicle 14, the distance L between hitch point and the rear axle of the vehicle 14, and the trailer length D between the hitch point and the axle of the trailer 12 or the effective axle when the trailer 12 has multiple axles. When the hitch angle $\gamma$ for the vehicle 14 and the trailer 12 achieves or exceeds the jackknife angle γ(j), the vehicle 14 may be pulled forward to reduce the hitch angle γ. Thus, for limiting the potential for a vehicle/trailer system attaining a jackknife angle, it is preferable to control the yaw angle of the trailer 12 while keeping the hitch angle γ of the vehicle/trailer system relatively small.

A kinematic model representation of the vehicle 14 and the trailer 12 can also be used to determine a jackknife angle for the vehicle-trailer combination. Accordingly, with reference to FIGS. 3 and 4, a steering angle limit for the steered front wheels requires that the hitch angle γ cannot exceed the jackknife angle γ(j), which is also referred to as a critical hitch angle γ. Thus, under the limitation that the hitch angle γ cannot exceed the jackknife angle γ(j), the jackknife angle γ(j) is the hitch angle γ that maintains a circular motion for the vehicle/trailer system when the steered wheels 64 are at a maximum steering angle δ(max). The steering angle for circular motion with hitch angle γ is defined by the following equation.

$$\tan\delta_{max} = \frac{W \sin\gamma_{max}}{D + L\cos\gamma_{max}}$$

Solving the above equation for hitch angle γ allows jackknife angle γ(j) to be determined. This solution, which is shown in the following equation, can be used in implementing trailer backup assist functionality in accordance with the disclosed subject matter for monitoring hitch angle γ in relation to jackknife angle.

$$\cos\overline{\gamma} = \frac{-b \pm \sqrt{b^2 - 4ac}}{2a}$$

where,
$a = L^2 \tan^2 \delta(max) + W^2$;
$b = 2 LD \tan^2 \delta(max)$; and
$c = D^2 \tan^2 \delta(max) - W^2$.

In certain instances of backing the trailer 12, a jackknife enabling condition can arise based on current operating parameters of the vehicle 14 in combination with a corresponding hitch angle γ. This condition can be indicated when one or more specified vehicle operating thresholds are met while a particular hitch angle γ is present. For example, although the particular hitch angle γ is not currently at the jackknife angle for the vehicle 14 and attached trailer 12, certain vehicle operating parameters can lead to a rapid (e.g., uncontrolled) transition of the hitch angle γ to the jackknife angle for a current commanded trailer curvature and/or can reduce an ability to steer the trailer 12 away from the jackknife angle. One reason for a jackknife enabling condition is that trailer curvature control mechanisms (e.g., those in accordance with the disclosed subject matter) generally calculate steering commands at an instantaneous point in time during backing of a trailer 12. However, these calculations will typically not account for lag in the steering control system of the vehicle 14 (e.g., lag in a steering EPAS controller). Another reason for the jackknife enabling condition is that trailer curvature control mechanisms generally exhibit reduced steering sensitivity and/or effectiveness when the vehicle 14 is at relatively high speeds and/or when undergoing relatively high acceleration.

Jackknife determining information may be received by the controller 28, according to one embodiment, to process and characterize a jackknife enabling condition of the vehicle-trailer combination at a particular point in time (e.g., at the point in time when the jackknife determining information was sampled). Examples of the jackknife determining information include, but are not limited to, information characterizing an estimated hitch angle γ, information characterizing a vehicle accelerator pedal transient state, information characterizing a speed of the vehicle 14, information characterizing longitudinal acceleration of the vehicle 14, information characterizing a brake torque being applied by a brake system of the vehicle 14, information characterizing a powertrain torque being applied to driven wheels of the vehicle 14, and information characterizing the magnitude and rate of driver requested trailer curvature. In this regard, jackknife determining information would be continually monitored, such as by an electronic control unit (ECU) that carries out trailer backup assist (TBA) functionality. After receiving the jackknife determining information, a routine may process the jackknife determining information for determining if the vehicle-trailer combination attained the jackknife enabling condition at the particular point in time. The objective of the operation for assessing the jackknife determining information is determining if a jackknife enabling condition has been attained at the point in time defined by the jackknife determining information. If it is determined that a jackknife enabling condition is present at the particular point in time, a routine may also determine an applicable countermeasure or countermeasures to implement. Accordingly, in some embodiments, an applicable countermeasure will be selected dependent upon a parameter identified as being a key influencer of the jackknife enabling condition. However, in other embodiments, an applicable countermeasure will be selected as being most able to readily alleviate the jackknife enabling condition. In still another embodiment, a predefined countermeasure or predefined set of countermeasures may be the applicable countermeasure(s).

As previously disclosed with reference to the illustrated embodiments, during operation of the trailer backup assist system 10, a driver of the vehicle 14 may be limited in the manner in which steering inputs may be made with the steering wheel 68 of the vehicle 14 due to the power assist steering system 62 being directly coupled to the steering wheel 68. Accordingly, the steering input device 18 of the trailer backup assist system 10 may be used for inputting a desired curvature 26 of the trailer 12, thereby decoupling such commands from being made at the steering wheel 68 of the vehicle 14. However, additional embodiments of the trailer backup assist system 10 may have the capability to selectively decouple the steering wheel 68 from movement of steerable wheels of the vehicle 14, thereby allowing the steering wheel 68 to be used for commanding changes in the desired curvature 26 of a trailer 12 or otherwise selecting a desired backing path during such trailer backup assist.

Figure 5:
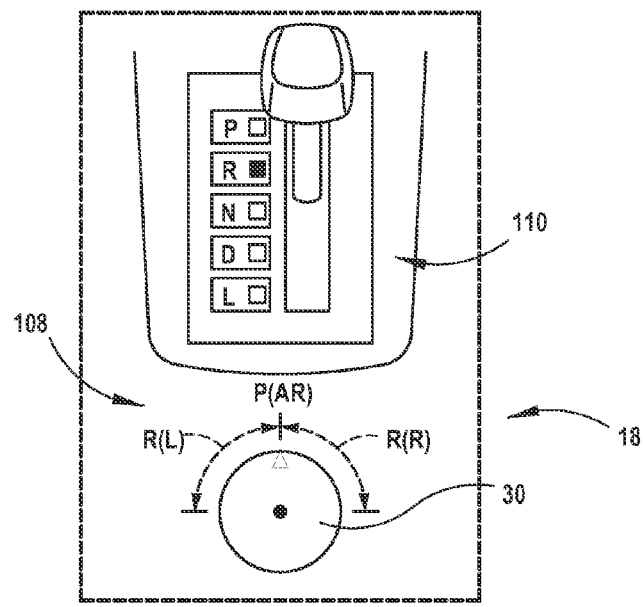
FIG. 5 is a plan view of a steering input device having a rotatable knob for operating the trailer backup assist system, according to one embodiment.

Referring now to FIG. 5, one embodiment of the steering input device 18 is illustrated disposed on a center console 108 of the vehicle 14 proximate a shifter 110. In this embodiment, the steering input device 18 includes the rotatable knob 30 for providing the controller 28 with the desired backing path of the trailer 12. More specifically, the angular position of the rotatable knob 30 may correlate with a desired curvature, such that rotation of the knob to a different angular position provides a different desired curvature with an incremental change based on the amount of rotation and, in some embodiments, a normalized rate, as described in greater detail herein.

Figure 6:
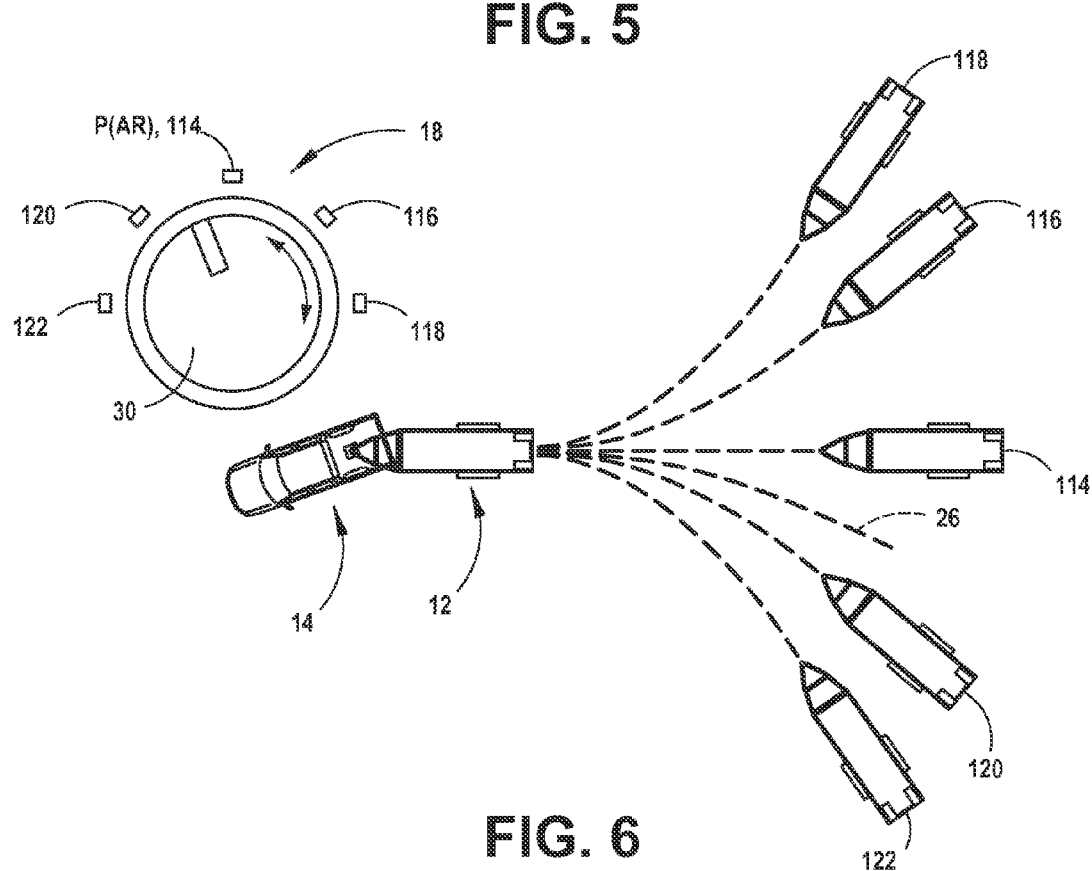
FIG. 6 is a plan view of another embodiment of a rotatable knob for selecting a desired curvature of a trailer and a corresponding schematic diagram illustrating a vehicle and a trailer with various trailer curvature paths correlating with desired curvatures that may be selected.

The rotatable knob 30, as illustrated in FIGS. 5-6, may be biased (e.g., by a spring return) to a center or at-rest position P(AR) 114 between opposing rotational ranges of motion R(R), R(L). In the illustrated embodiment, a first one of the opposing rotational ranges of motion R(R) is substantially equal to a second one of the opposing rotational ranges of motion R(L), R(R). To provide a tactile indication of an amount of rotation of the rotatable knob 30, a force that biases the knob toward the at-rest position P(AR) 114 can increase (e.g., non-linearly) as a function of the amount of rotation of the rotatable knob 30 with respect to the at-rest position P(AR) 114. Additionally, the rotatable knob 30 can be configured with position indicating detents such that the driver can positively feel the at-rest position P(AR) 114 and feel the ends of the opposing rotational ranges of motion R(L), R(R) approaching (e.g., soft end stops). The rotatable knob 30 may generate a desired curvature value as function of an amount of rotation of the rotatable knob 30 with respect to the at-rest position P(AR) 114 and a direction of movement of the rotatable knob 30 with respect to the at-rest position P(AR) 114. It is also contemplated that the rate of rotation of the rotatable knob 30 may also be used to determine the desired curvature output to the controller 28. The at-rest position P(AR) 114 of the knob corresponds to a signal indicating that the vehicle 14 should be steered such that the trailer 12 is backed along a substantially straight backing path (zero trailer curvature request from the driver), as defined by the longitudinal direction 22 of the trailer 12 when the knob was returned to the at-rest position P(AR). A maximum clockwise and anti-clockwise position of the knob (i.e., limits of the opposing rotational ranges of motion R(R), R(L)) may each correspond to a respective signal indicating a tightest radius of curvature (i.e., most acute trajectory or smallest radius of curvature) of a path of travel of the trailer 12 that is possible without the corresponding vehicle steering information causing a jackknife condition.

As shown in FIG. 6, a driver can turn the rotatable knob 30 to provide a desired curvature 26 while the driver of the vehicle 14 backs the trailer 12. In the illustrated embodiment, the rotatable knob 30 rotates about a central axis between a center or middle position 114 corresponding to a substantially straight backing path 26 of travel, as defined by the longitudinal direction 22 of the trailer 12, and various rotated positions 116, 118, 120, 122 on opposing sides of the middle position 114, commanding a desired curvature 26 corresponding to a radius of the desired backing path of travel for the trailer 12 at the commanded rotated position. It is contemplated that the rotatable knob 30 may be configured in accordance with embodiments of the disclosed subject matter and omit a means for being biased to an at-rest position P(AR) between opposing rotational ranges of motion. Lack of such biasing may allow a current rotational position of the rotatable knob 30 to be maintained until the rotational control input device is manually moved to a different position. It is also conceivable that the steering input device 18 may include a non-rotational control device that may be configured to selectively provide a desired curvature 26 and to override or supplement an existing curvature value. Examples of such a non-rotational control input device include, but are not limited to, a plurality of depressible buttons (e.g., curve left, curve right, and travel straight), a touch screen on which a driver traces or otherwise inputs a curvature for path of travel commands, a button that is translatable along an axis for allowing a driver to input backing path commands, or a joystick type input and the like.

Figure 7:
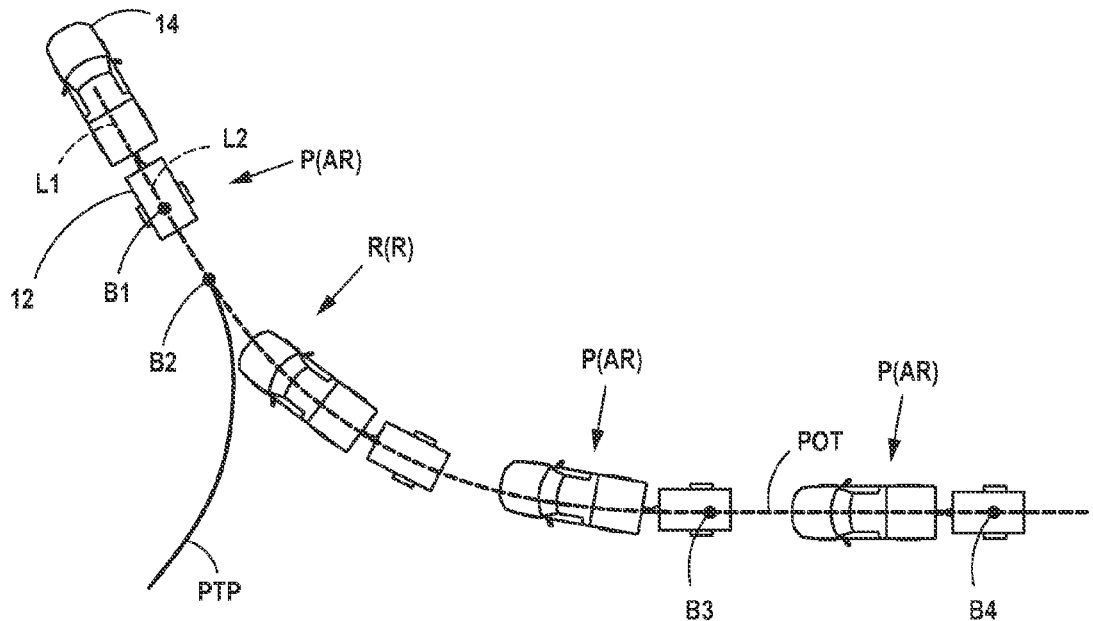
FIG. 7 is a schematic diagram showing a backup sequence of a vehicle and a trailer implementing various curvature selections with the trailer backup assist system, according to one embodiment.

Referring to FIG. 7, an example of using the steering input device 18 for dictating a curvature of a desired backing path of travel (POT) of the trailer 12 while backing up the trailer 12 with the vehicle 14 is shown. In preparation of backing the trailer 12, the driver of the vehicle 14 may drive the vehicle 14 forward along a pull-thru path (PTP) to position the vehicle 14 and trailer 12 at a first backup position B1. In the first backup position B1, the vehicle 14 and trailer 12 are longitudinally aligned with each other such that a longitudinal centerline axis L1 of the vehicle 14 is aligned with (e.g., parallel with or coincidental with) a longitudinal centerline axis L2 of the trailer 12. It is disclosed herein that such alignment of the longitudinal axis L1, L2 at the onset of an instance of trailer backup functionality is not a requirement for operability of a trailer backup assist system 10, but may be done for calibration.

After activating the trailer backup assist system 10 (e.g., before, after, or during the pull-thru sequence), the driver begins to back the trailer 12 by reversing the vehicle 14 from the first backup position B1. So long as the rotatable knob 30 of the trailer backup steering input device 18 remains in the at-rest position P(AR) and no other steering input devices 18 are activated, the trailer backup assist system 10 will steer the vehicle 14 as necessary for causing the trailer 12 to be backed along a substantially straight path of travel, as defined by the longitudinal direction 22 of the trailer 12, specifically the centerline axis L2 of the trailer 12, at the time when backing of the trailer 12 began. When the trailer 12 reaches the second backup position B2, the driver rotates the rotatable knob 30 to command the trailer 12 to be steered to the right (i.e., a knob position R(R) clockwise rotation). Accordingly, the trailer backup assist system 10 will steer the vehicle 14 causing the trailer 12 to be steered to the right as a function of an amount of rotation of the rotatable knob 30 with respect to the at-rest position P(AR), a rate movement of the knob, and/or a direction of movement of the knob with respect to the at-rest position P(AR). Similarly, the trailer 12 can be commanded to steer to the left by rotating the rotatable knob 30 to the left. When the trailer 12 reaches backup position B3, the driver allows the rotatable knob 30 to return to the at-rest position P(AR) thereby causing the trailer backup assist system 10 to steer the vehicle 14 as necessary for causing the trailer 12 to be backed along a substantially straight path of travel as defined by the longitudinal centerline axis L2 of the trailer 12 at the time when the rotatable knob 30 was returned to the at-rest position P(AR). Thereafter, the trailer backup assist system 10 steers the vehicle 14 as necessary for causing the trailer 12 to be backed along this substantially straight path to the fourth backup position B4. In this regard, arcuate portions of a path of travel POT of the trailer 12 are dictated by rotation of the rotatable knob 30 and straight portions of the path of travel POT are dictated by an orientation of the centerline longitudinal axis L2 of the trailer 12 when the knob 30 is in/returned to the at-rest position P(AR).

In the embodiment illustrated in FIG. 7, in order to activate the trailer backup assist system 10, the driver interacts with the trailer backup assist system 10 which automatically steers as the driver reverses the vehicle 14. As discussed above, the driver may command the trailer backing path by using a steering input device 18 and the controller 28 may determine the vehicle steering angle to achieve the desired curvature 26, whereby the driver controls the throttle and brake while the trailer backup assist system 10 controls the steering.

Figure 8:
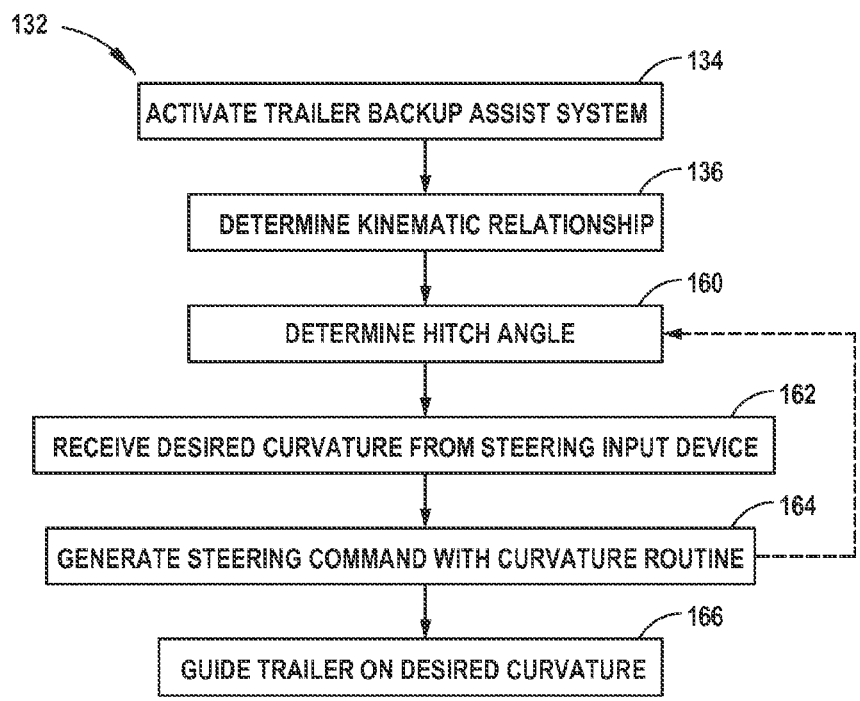
FIG. 8 is a flow diagram illustrating a method of operating a trailer backup assist system using an operating routine for steering a vehicle reversing a trailer with normalized control of the desired curvature, according to one embodiment.

With reference to FIG. 8, a method of operating one embodiment of the trailer backup assist system 10 is illustrated, shown as one embodiment of the operating routine 132 (FIG. 2). At step 134, the method is initiated by the trailer backup assist system 10 being activated. It is contemplated that this may be done in a variety of ways, such as making a selection on the display 82 of the vehicle HMI 25. The next step 136 then determines the kinematic relationship between the attached trailer 12 and the vehicle 14. To determine the kinematic relationship, various parameters of the vehicle 14 and the trailer 12 must be sensed, input by the driver, or otherwise determined for the trailer backup assist system 10 to generate steering commands to the power assist steering system 62 in accordance with the desired curvature or backing path 26 of the trailer 12. As disclosed with reference to FIGS. 3 and 4, the kinematic parameters to define the kinematic relationship include a length of the trailer 12, a wheel base of the vehicle 14, a distance from a hitch connection to a rear axle of the vehicle 14, and a hitch angle γ between the vehicle 14 and the trailer 12, among other variables and parameters as previously described. Accordingly, after the kinematic relationship is determined, the trailer backup assist system 10 may proceed at step 160 to determine the current hitch angle by processing the hitch angle estimation routine 130.

Figure 9:
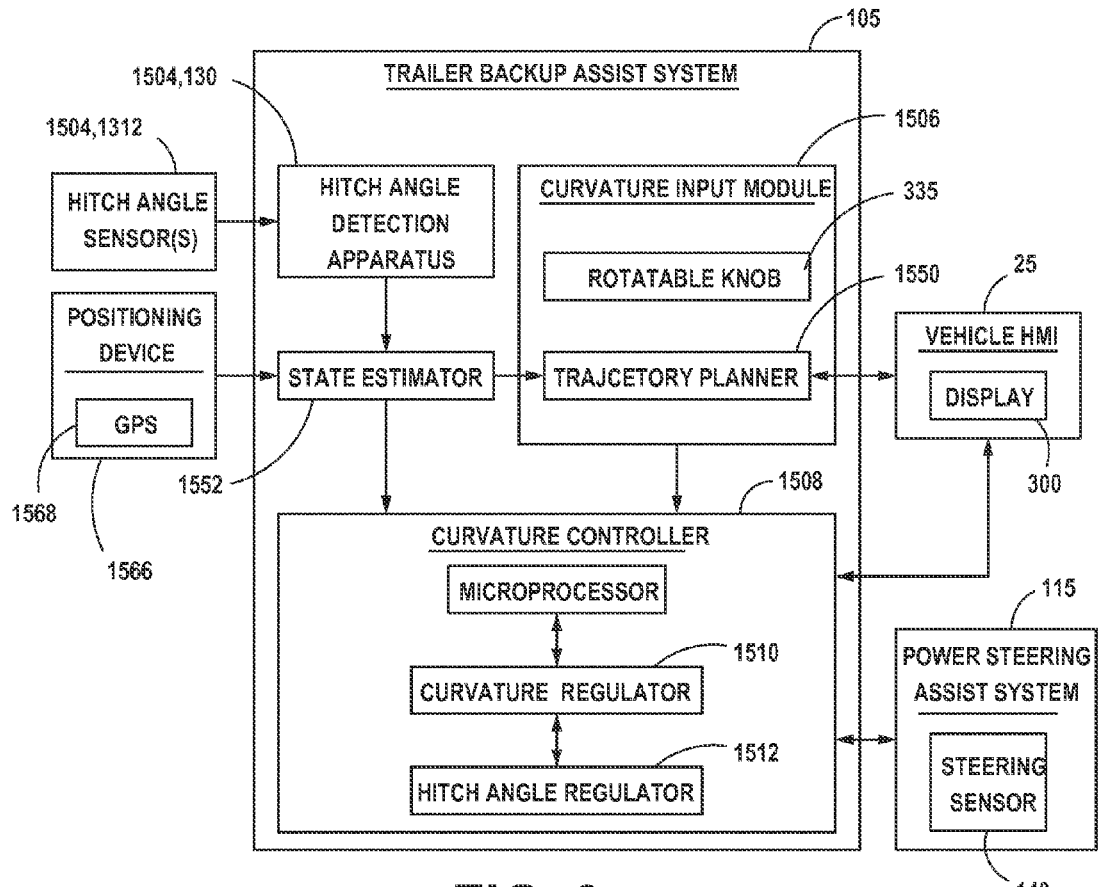
FIG. 9 is a block diagram illustrating one embodiment of the trailer backup assist system having a trajectory planner providing a desired curvature to a curvature controller.

Referring to FIG. 9, a trailer backup assist system 105 may be implemented with a curvature input module 1506 to control the curvature of the trailer 110 when executing a backup maneuver with a vehicle 100 attached to the trailer 110. In several of the previously described embodiments, the curvature input module 1506 may include a manually operable knob to provide the desired curvature $\kappa_2$ to a controller in substantially real time. In an additional embodiment, as disclosed in greater detail below, a trajectory planner 1550 is provided for the curvature input module 1506 to similarly provide the desired curvature $\kappa_2$ to the controller in substantially real time for operating the vehicle 100. Although in one embodiment it is contemplated that the trajectory planner 1550 may be the exclusive source of providing the desired curvature $\kappa_2$, it is understood that in additional embodiments a rotatable knob 335 or other human-machine interface may be used in conjunction with the trajectory planner 1550 to manually adjust or override the desired curvature $\kappa_2$ provided by the trajectory planner 1550.

As previously referenced, kinematic information (FIG. 3) of the attached vehicle 100 and trailer 110 may be used to calculate a relationship between the trailer's curvature and the steering angle δ of the vehicle 100 for determining a steering angle command of the vehicle 100 that will achieve the desired curvature $\kappa_2$ received from the curvature input module 1506. More specifically, when certain assumptions are made, including the variables D and W being greater than zero and the velocity of the vehicle 100 being greater than zero, the trailer angle kinematics in one embodiment can be expressed as follows:

$$\dot{\gamma} = \frac{v}{D}\sin(\gamma) + \left(1 + \frac{L}{D}\cos(\gamma)\right)\frac{v}{W}\tan(\delta).$$

Also, the velocity of the trailer's center of mass may be given by the following equation:

$$v_T = v\cos(\gamma) - \frac{vL}{W}\sin(\gamma)\tan(\delta).$$

Combining these equations, the curvature $\kappa_2$ of the trailer trajectory, corresponding to $1/r_2$, can be calculated as the ratio between the angular velocity of the trailer 110 and trailer velocity, which provides the following curvature $\kappa_2$ algorithm:

$$\kappa_2 = \frac{\dot{\theta}}{v_T} = -\frac{W\sin(\gamma) + L\cos(\gamma)\tan(\delta)}{D(W\cos(\gamma) - L\sin(\gamma)\tan(\delta))}.$$

According to one embodiment of the trailer backup assist system 105, the curvature input module 1506 provides the desired curvature $\kappa_2$ of the trailer 110 to a curvature controller 1508 for generating the steering angle command for the vehicle 100 based on a current steering angle δ of the vehicle and a measured hitch angle γ(m) between the vehicle 100 and the trailer 110. As such, one embodiment of the curvature controller 1508 may operate with the following control system, where $\kappa_2$ represents the curvature input signal:

$$\dot{\gamma}(t) = \frac{v(t)}{D}\sin(\gamma(t)) + \left(1 + \frac{L}{D}\cos(\gamma(t))\right)\frac{v(t)}{W}\bar{\delta};$$

$$\tan(\delta) = \bar{\delta} = \frac{W}{v(t)\left(1 + \frac{L}{D}\cos(\gamma(t))\right)}\left(K_P(p(\kappa_2, \delta) - \gamma(t)) - \frac{v(t)}{D}\sin(\gamma(t))\right);$$

$$\text{and } p(\kappa_2, \delta) = \tan^{-1}\left(\frac{\kappa_2 DW + L\tan(\delta)}{\kappa_2 DL\tan(\delta) - W}\right).$$

Referring to FIGS. 9-19B, reference numeral 1550 generally designates a trajectory planner for a trailer backup assist system 105. According to one embodiment, the trailer backup assist system 105 includes a state estimator 1552 that determines a current position of the trailer 110 relative to a waypoint position. The trajectory planner 1550 generates first and second circular trajectories 1554, 1556 tangent to one another spanning between the current position and the waypoint position. A curvature controller 1508 reverses the trailer 110 to the waypoint position along the first and second circular trajectories 1554, 1556, which are dynamically regenerated as the trailer 110 reverses along the first circular trajectory 1554.

According to a further embodiment, the trajectory planner 1550 for reversing a trailer 110 with a trailer backup assist system 105 may include a first operating mode 1558 dynamically generating the first and second circular trajectories 1554, 1556 tangent to one another that connect between the current position of the trailer 110 and the waypoint position as the trailer 110 reverses along the first circular trajectory 1554. The trajectory planner 1550 may also include a second operating mode 1560 dynamically generating the second circular trajectory 1556 to the waypoint position as the trailer 110 reverses along the second circular trajectory 1556. It is also contemplated that a third operating mode 1562 may be included that switches to the first operating mode when the trailer 110 reaches the waypoint for guidance to a subsequent waypoint of a plurality of waypoints. These and other potential planner modes 1564 will be described in greater detail below, as they refer to guiding the trailer 110 to a single waypoint or a plurality of waypoints.

Referring now to FIG. 9, the trailer backup assist system 105 of the illustrated embodiment includes a hitch angle detection apparatus 130, which may operate in conjunction with at least one hitch angle sensor 1312 to provide information relating to a hitch angle γ between the vehicle 100 and the trailer 110. As previously described, the hitch angle detection apparatus 130 may include various systems that incorporate one or more physical sensors on the vehicle 100 and/or the trailer 110 in combination with computing other vehicle and trailer dimensions and characteristics (i.e. kinematic information) to otherwise determine a measured hitch angle γ(m) between the vehicle 100 and the trailer 110. Similarly, the hitch angle sensor 1312 may include various types of sensors, including a vision based sensor system, a magnetic sensor system, a capacitive sensor system, an inductive sensor system, and other conceivable sensors and combinations thereof. Further, the hitch sensor 1504 of the embodiment of the trailer backup assist system 105 may include the hitch angle detection apparatus 130 for providing the measured hitch angle γ(m) to the state estimator 1552 of the illustrated embodiment of the trailer backup assist system 105. Also, the trailer backup assist system 105 may include the power steering assist system 115 with a steering sensor 140 for sensing a steering angle δ of the steered wheels 1302 (FIG. 36) of the vehicle 100. The power steering assist system 115 may also receive the steering angle command generated by the controller 1508 for autonomously steering the vehicle 100 or otherwise altering the steering angle δ of the vehicle 100.

As also shown in the embodiment illustrated in FIG. 9, the state estimator 1552 receives positioning information from a positioning device 1566 as well as hitch angle information from the hitch sensor 1504 to determine the current position of the trailer 110. Accordingly, it is understood that the current and waypoint positions each include a coordinate location and an angular orientation (i.e. a tuple). Accordingly, the state estimator 1552 may determine the current position of the trailer 110 based on the hitch angle γ(m) sensed between the trailer 110 and the vehicle 100 and a coordinate position of the vehicle 100. As such, the coordinate position of the vehicle 100 provided by the positioning device 1566 in the illustrated embodiment may be generated from a localized coordinate system generated proximate the waypoint position, whereby steering information and velocity of the vehicle 100 may be used to track the coordinate position, including the coordinate location and angular orientation, of the vehicle 100 relative to the localized coordinate system. In another embodiment, the positioning device 1566 may additionally or alternatively include a global positioning system (GPS) receiver 1568 that provides a coordinate position of the vehicle 100, which may be identifiable relative to the waypoint position, if also configured with a GPS-based coordinate position. In an alternative embodiment, the state estimator 1552 may simply determine the current position of the trailer 110 based on a coordinate position of the trailer 110, if such information available, for example via a GPS receiver located directly on the trailer 110.

With further reference to FIG. 9, it is shown that in addition to supplying the curvature controller 1508 with the current position of the trailer, the state estimator 1552 also provides the trajectory planner 1550 of the curvature input module 1506 with the current position of the trailer 110. As previously mentioned, the trajectory planner 1550 may provide a desired curvature $\kappa_2$ signal to the curvature controller 1508 that is indicative of a curvature $\kappa_2$ corresponding to a path between the current position of the trailer 110 and a waypoint position.

Figure 10:
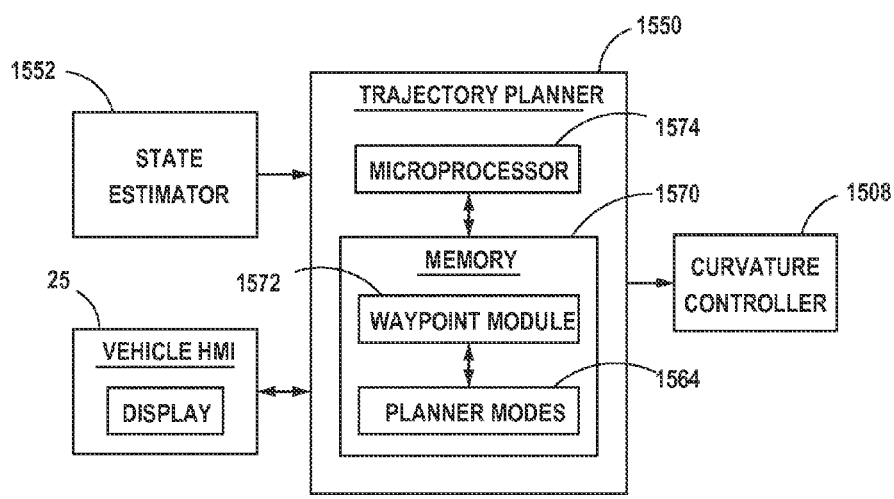
FIG. 10 is a block diagram illustrating one embodiment of the trajectory planner having a memory with a waypoint module and planner modes.

As shown in more detail in FIG. 10, one embodiment of the trajectory planner 1550 is shown in a controller layout, whereby the trajectory planner 1550 receives the current position from the state estimator 1552. In addition, the trajectory planner 1550 receives information from communicating with a vehicle human-machine interface (HMI) 25. It should be appreciated that the trajectory planner 1550 may be a standalone dedicated controller or may be a shared controller integrated with other control functions, such as integrated with the curvature controller 1508 or another controller of the trailer backup assist system 105. It is contemplated that the vehicle HMI 25 may transmit a desired waypoint position or a plurality of waypoint positions to the trajectory planner 1550. For instance, the vehicle HMI 25 may include a center stack mounted display, such as a touch screen display 300, that allows a user to input a waypoint position relative to the current position of the vehicle 100. It also is contemplated that the waypoint positions or one or more of the plurality of waypoint positions may be generated by the trajectory planner 1550 or a separate controller. Accordingly, the waypoint positions received by the trajectory planner 1550 may thereby be stored in memory 1570 of the trajectory planner 1550, such as within a waypoint module 1572, for processing with a microprocessor 1574 of the trajectory planner 1550 in conjunction with the planner modes 1564 to provide the desired curvature $\kappa_2$ to the curvature controller 1508.

Figure 11:
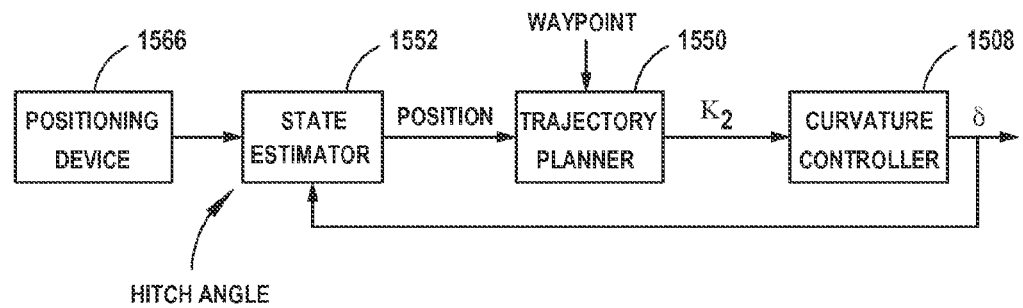
FIG. 11 is a schematic block diagram of the control system of FIG. 9, showing the feedback architecture and signal flow, according to one embodiment.

Referring to FIG. 11, the trajectory planner 1550 is schematically shown in a control system layout, according to one embodiment, whereby the curvature controller 1508 outputs a steering angle δ, or a necessary change in the steering angle δ, that is provided as feedback to the state estimator 1552 for resolving errors in operation of the trailer backup assist system 105, according to this embodiment. In addition to the steering angle δ, the curvature controller 1508 may also output a hitch angle γ, as described with reference to FIG. 58. As also shown in FIG. 11, the waypoint position information may be provided to the trajectory planner 1550 and stored in the waypoint module 1572 for processing with the planner modes 1564 (FIG. 10).

Figure 12:
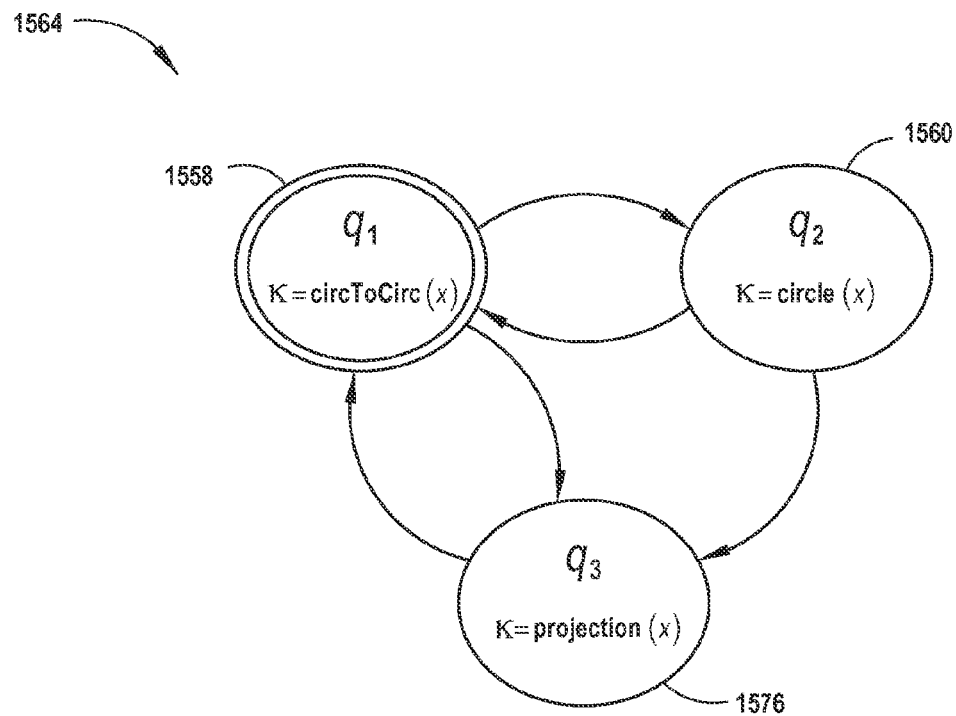
FIG. 12 is a flow diagram of planner modes, according to one embodiment.
Figure 13:
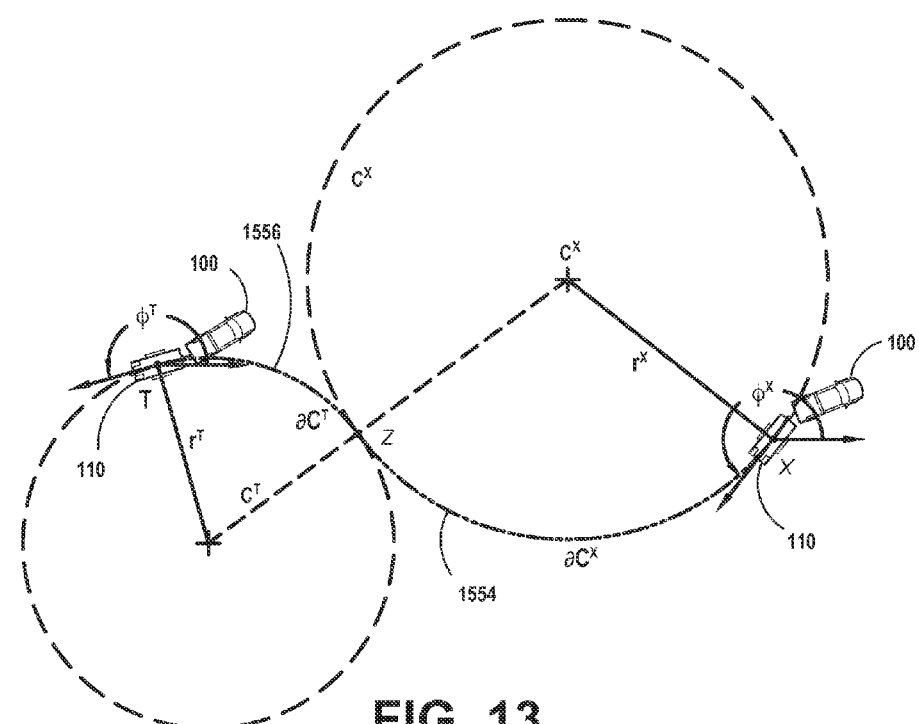
FIG. 13 is a schematic top plan view of first and second circular trajectories generated with the trajectory planner, according to one embodiment.

When a single waypoint position in the waypoint module 1572 is processed by the trajectory planner 1550, an embodiment of the planner modes 1564 may be used to provide a curvature $\kappa_2$ output for executing a backup maneuver to the single waypoint position, as illustrated in FIG. 12. More specifically, once the waypoint position is identified, a first operating mode 1558 generates first and second circular trajectories 1554, 1556 tangent to one another that connect between the current position of the trailer 110 and the waypoint position, as depicted in FIG. 13. With respect to notation for the first operating mode 1558, the current position of the trailer 110 is represented as the current coordinate location $x=(x_1, x_2)$, longitude and latitude, respectively, with the current angular orientation $\varphi^x$; while the waypoint position is represented as a coordinate location of $T=(T_1, T_2)$ with an angular orientation $\varphi^T$. The radii of the first and second circular trajectories 1554, 1556 are represented by $r^x$ and $r^T$, respectively, and the corresponding curvatures of the first and second circular trajectories 1554, 1556 can thereby be represented as $\kappa^x=1/r^x \epsilon [-\kappa_{min}, \kappa_{max}]$ and $\kappa^T=1/r^T \epsilon [-\kappa_{min}, \kappa_{max}]$, respectively. The referenced curvature constraints may be calculated based on the kinematic information of the particular vehicle 100 and trailer 110 combination to avoid a jackknife hitch angle. Given the current position $(x, \varphi^x)$ and the waypoint position $(T, \varphi^T)$, the corresponding circles $C^x$ and $C^T$ with center points $c^x$ and $c^T$ can be defined as:

$$c^x = x + r^x(-\sin(\varphi^x), \cos(\varphi^x));$$

$$C^x = \{z \epsilon R^2 \mid \|z - c^x\| = r^x\};$$

$$c^T = T + r^T(-\sin(\varphi^T), \cos(\varphi^T)); \text{ and}$$

$$C^T = \{z \in R^2 \mid \|z - c^T\| = r^T\},$$

where, arc segments of the path of travel on the first and second circular trajectories 1554, 1556 are identified as $\partial C^x$ and $\partial C^T$, respectively.

With further reference to FIGS. 12-13, the first operating mode 1558 generates the first and second circular trajectories 1554, 1556 tangent to one another connecting between the current and waypoint positions, such that the first and second circular trajectories 1554, 1556 are tangent to the angular orientation at the respective current position and waypoint position. The first and second circular trajectories 1554, 1556 are generated tangent to one another to define a tangent position, $z \in R^2$, between the first and second circular trajectories 1554, 1556. To generate the first and second circular trajectories 1554, 1556 with these curvatures constraints, a solution set can be represented as follows:

$$R((x,\varphi^x),(T,\varphi^T)) = \{(\kappa^x, \kappa^T) \in [\kappa_{min}, \kappa_{max}]^2 \mid C^x \cap C^T = z \in R^2\}.$$

Figure 14A:
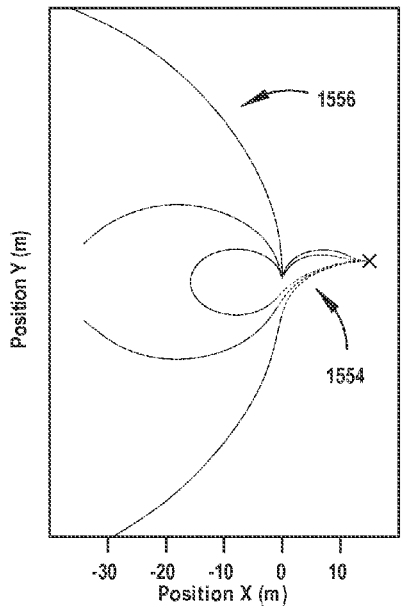
FIGS. 14A-B are graphs of a coordinate system with various first and second circular trajectories plotted between different embodiments of a current position and a waypoint position.
Figure 14B:
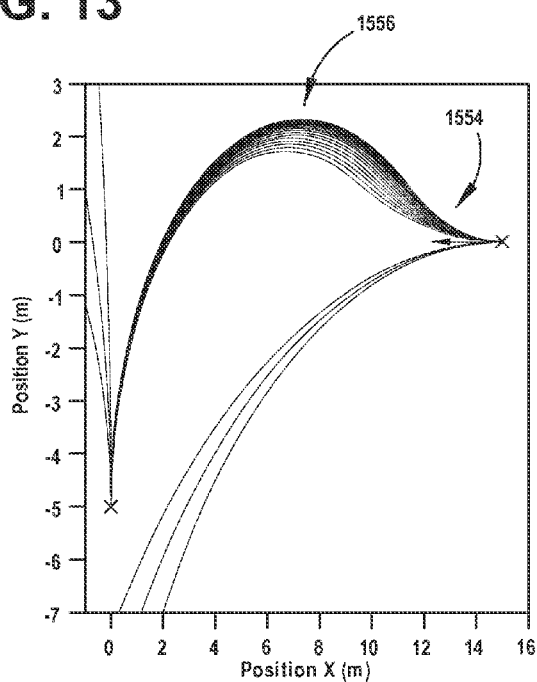

As shown in FIGS. 14A-B, in instances where the limitations of $\kappa_{min}$, $\kappa_{max}$ do not prohibit a solution, the solution set of $R((x,\varphi^x),(T,\varphi^T))$ theoretically has an infinite number of first and second circular trajectories 1554, 1556 tangent to one another connecting between the current position and the waypoint position, including those that have arc segments of the path of travel that may bypass the waypoint position and/or encompass the majority of the circular circumference of a circular trajectory. Accordingly, the first operating mode 1558 includes a cost function to identify a single path of the solution set, defining the first and second circular trajectories 1554, 1556 for purposes of operation. In one embodiment, the cost function will penalize the size of the curvatures $\kappa^x$ and $\kappa^T$, the arc lengths $\partial C^x$ and $\partial C^T$, and the difference between the curvatures $\kappa^x$ and $\kappa^T$. As such, the cost function will seek to identify the single path of the solution set that has both a relatively short distance and has a relatively small amount of curvature. However, it is contemplated that a cost function in additional embodiments may be constructed to penalize the curvature and arc length variables alternatively or constructed to penalize more or fewer variables in identifying a single path. To implement a cost function, the identified single path will be defined as the solution to the following algorithm:

$$(\hat{\kappa}^x, \hat{\kappa}^T) = \arg\inf_{\kappa^x, \kappa^T) \in R((x,\varphi^x),(T,\varphi^T))} L(\kappa^x, \kappa^T).$$

First, computing the plurality of potential pairs of tangent circular trajectories between the current and waypoint positions, as defined by $R((x,\varphi^x),(T,\varphi^T))$ may be done by identifying the geometric relationship of the first and second circular trajectories 1554, 1556, as shown in FIG. 13, which shows a dashed line connecting the circle center points $c^x$ and $c^T$. This geometric relationship may be exploited to solve for $r^T$ based on angles $\alpha$ and $\beta$, as shown in FIG. 36. In view of the solution for $r^T$, the cost function, according to one embodiment, can have a weighing vector $k = [k_1, k_2, k_3, k_4, k_5]$, which is then recited as follows:

$$L(\kappa^x, \kappa^T) = k_1|\kappa^x| + k_2|\kappa^T| + k_3\partial C^x + k_4\partial C^T + k_5|\kappa^x - \kappa^T|.$$

To reiterate, the first operating mode 1558 of the trajectory planner 1550 provides the desired curvature $\kappa_2$ to the curvature controller 1508, which in consideration of the cost function, may be expressed as the following function:

$$\kappa_2 = \hat{\kappa}^x = \text{CircToCirc}(x, T, \varphi^x, \varphi^T)$$

As the vehicle 100 guides the trailer 110 on the first circular trajectory 1554, the first and second circular trajectories 1554, 1556 are continuously and therefore dynamically regenerated to account for changes in the current position of the trailer 110 outside of the previously generated first circular trajectory 1554.

Referring again to FIG. 12, the trajectory planner 1550 processes the first operating mode 1558 until the trailer 110 reaches the tangent position z (FIG. 13), at which point the trajectory planner 1550 switches from guiding the trailer 110 along the first circular trajectory 1554 to guiding the trailer 110 along the second circular trajectory 1556 to the waypoint position. Accordingly, when the trailer 110 reaches the tangent position z, the trajectory planner 1550 switches from the first operating mode 1558 to the second operating mode 1560 for guiding the trailer along the second circular trajectory 1556. The trajectory planner 1550 processes a switching routine to make the determination when to stop processing the first operating mode 1558 and start processing the second operating mode 1560. Therefore, in one embodiment, it is contemplated that the switching routine may be part of the first operating mode 1558. The switching routine, according to one embodiment, computes the distance between the current position and the center point $c^T$ of the second circular trajectory 1556 and switches to the second operating mode 1560 when the distance is equal to, substantially equal to, or less than the radius of the second circular trajectory 1556. This switching routine may also be expressed as the following equation:

onCircleTwo$(x,T,\varphi^x,\varphi^T) = \|C^T - x\| \leq \epsilon$, where $\epsilon$ may be configurable to equal or substantially equal the radius of second circular trajectory 1556.

Figure 15:
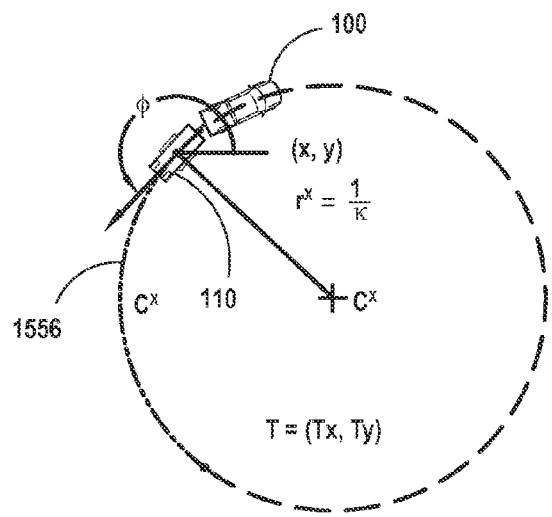
FIG. 15 is schematic top plan view of the second circular trajectory generated with the trajectory planner, according to one embodiment.

Once it is determined that the trailer 110 has reached the tangent position and the trajectory planner 1550 switches to the second operating mode 1560, the second operating mode 1560 is processed to guide the trailer 110 to the waypoint position. Given the tangent orientation of the tangent position relative to the second circular trajectory 1556, as shown in FIG. 15, the second operating mode 1560, according to one embodiment, may guiding the trailer 110 to the waypoint position without considering the angular orientation of the waypoint position. Specifically, the trailer's orientation at the tangent position will be inherently tangent to the second circular trajectory 1556. Therefore, the second operating mode 1560 may continue to guide the trailer in tangent orientation to the second circular trajectory 1556 along the arc length $\partial C^T$ to reach the coordinate location of the waypoint position in the substantially correct angular orientation of the waypoint position, irrespective of processing the angular orientation of the waypoint position. This simplified process of the second operating mode 1560 compared with the first operating mode 1558 may be done with less processing requirements and other conceivable benefits. However, it is understood that the second operating mode 1560, in an additional embodiment, may also guide the trailer 110 to the waypoint position considering the angular orientation, like the first operating mode 1558.

With further reference to FIG. 15, the second operating mode 1560 assumes the path will be circular and have a tangent that is collinear with the trailer orientation. Accordingly, the center point of the circle can be found with computing the following equation:

$$c^x = (c_1^x, c_2^x) = \left(x_1 - \frac{\sin(\phi^x)}{\kappa^x}, x_2 + \frac{\cos(\phi^x)}{\kappa^x}\right).$$

Upon derivation, the desired curvature $\kappa_2$ provided by the second operating mode 1560 of the trajectory planner 1550 may be provided as follows:

$$\text{circle}(x, T, \phi^x) = 2\frac{(T_1 - x_1)\sin(\phi^x) - (T_2 - x_2)\cos(\phi^x)}{(T_1 - x_1)^2 + (T_2 - x_2)^2}.$$

Referring again to FIG. 12, the trajectory planner 1550, according to one embodiment, may include an additional operating mode, such as a projection mode 1576, that is configured to guide the trailer 110 substantially straight to the waypoint position if the trailer 110 becomes generally collinear with the waypoint position at any point during the first or second operating modes 1558, 1560. Stated differently, the projection mode 1576 may provide curvature $\kappa_2$ outputs when the waypoint position is generally straight behind and nearly in the same angular orientation as the trailer 110 in the current position. As such, the projection mode 1576 may be provided to prevent unnecessary curvature $\kappa_2$ outputs when simply guiding the trailer 110 straight rearward would reach the waypoint position.

The trajectory planner 1550 may begin to process the projection mode 1576, in one embodiment, from both the first and second operating modes 1558, 1560, such that the projection mode 1576 may include a projection-switch routine to either be processed separate from and contemporaneously with the first and second operating modes 1558, 1560, or integrally processed as part of each operating mode. In one embodiment, the projection-switch routine may become true when the waypoint position falls within a cone threshold of the trailer 110, along with the angles lining up, which may be mathematically expressed as:

$$\text{ProjectionSwitch}(x, T, \phi^x, \phi^T) = \left\|\tan^{-1}\left(\frac{T_2 - x_2}{T_1 - x_1}\right) - \phi^x\right\| < \varepsilon_1 \wedge \|\phi^x - \phi^T\| < \varepsilon_2.$$

To establish the distance and orientation of the waypoint position relative to the current position of the trailer 110, an offset vector may be defined as $\psi = T - x$. In addition, a rotation matrix from the coordinate system of the state estimator 1552 to the frame of the trailer 110 may be expressed as follows:

$$\text{rot}(\phi^x) := \begin{bmatrix} \cos(\phi^x) & -\sin(\phi^x) \\ \sin(\phi^x) & \cos(\phi^x) \end{bmatrix}.$$

Accordingly, the offset vector in the trailer reference frame may be expressed as follows:

$\psi^T = \text{rot}(\phi^x)\psi$, which represents where the trailer 110 is relative to the orientation of the trailer 110. A scale factor $k^P$ may be provided for tuning, which thereby defines the curvature $\kappa_2$ output provided by the projection mode 1576 of the trajectory planner 1550 as follows:

projection$(x, T, \phi^x, \phi^T) := k^{P*}\psi_2^T$.

The input provided may also be interpreted as the scaled lateral offset of the waypoint position with respect to the trailer heading.

Figure 16:
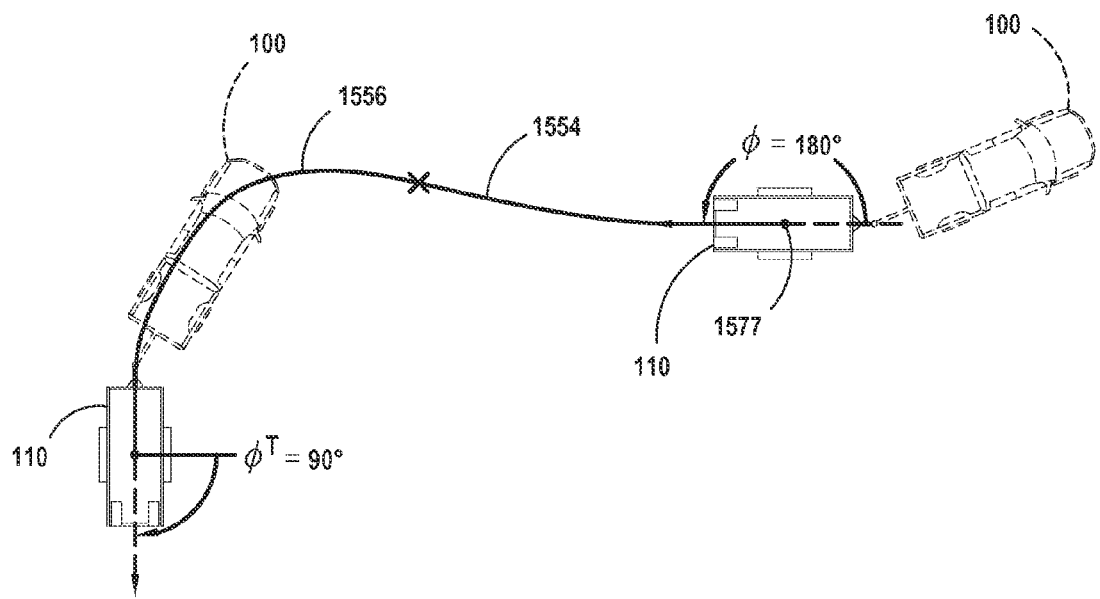
FIG. 16 is a schematic top plan view of one embodiment of a path traveled by a trailer with a vehicle using the trailer back assist system of FIG. 9.

In operation, as shown in FIG. 16, the trajectory planner 1550 provides the desired curvature $\kappa_2$ to the curvature controller 1508 for the vehicle 100 to guide the trailer 110 from the current position to the waypoint position. In the illustrated simulation, the current position has an angular orientation ninety degrees offset from the waypoint position. As such, the trajectory planner 1550 processed the first operating mode 1558 with the cost function to generate the first and second circular trajectories 1554, 1556 generally depicted, whereby the first circular trajectory 1554 has a substantially smaller curvature than the second circular trajectory 1556. Once the trailer 110 reached the tangent position, X, the trajectory planner 1550 switched to the second operating mode 1560 and guided the trailer 110 along a substantially constant curvature to the location of the waypoint position. As can be seen in operation, the trailer 110 may not exactly follow the first and second circular trajectories 1554, 1556 that are initially calculated at a starting point 1577, which could look more similar to those shown in FIG. 13. This is due to the trajectory planner 1550 dynamically regenerating the first and second circular trajectories 1554, 1556 to account for the trailer's actual path of travel deviating from the path initially generated at the starting point 1577. This may result in a path of travel having a curved shaped that does not correlate with two distinct circular trajectories. This characteristic is also shown in the potential paths generated in FIGS. 14A-14B.

Figure 17:
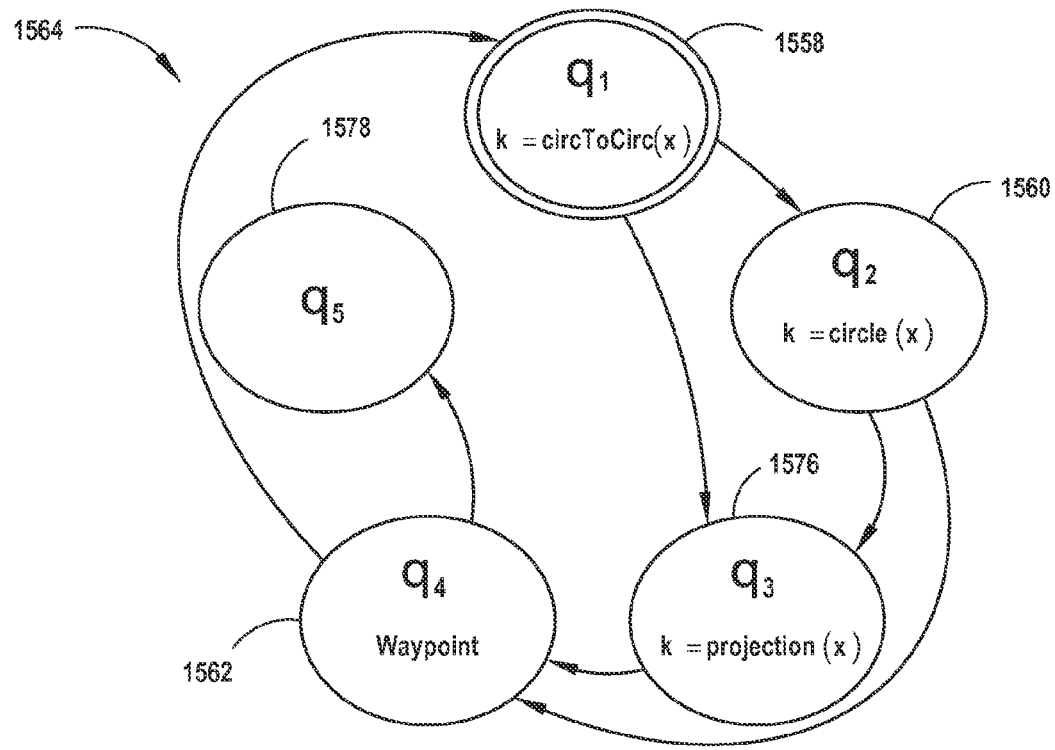
FIG. 17 is a flow diagram of planner modes, according to an additional embodiment.

Referring now to FIG. 17, the planner modes of an additional embodiment of the trajectory planner 1550 are illustrated in a flow diagram to account for a waypoint module 1572 (FIG. 10) that includes a plurality of waypoints, which also each include a coordinate location and an angular orientation. Similar to the planner modes 1564 shown in FIG. 12, a first operating mode 1558 is included to generate the first and second circular trajectories 1554, 1556 tangent to one another connecting between the current position and a waypoint of the plurality of waypoints. Again, the first mode 1558 dynamically regenerates the first and second circular trajectories 1554, 1556 as the trailer 110 reverses on the first circular trajectory 1554 to a tangent position between the first and second circular trajectories 1554, 1556. Also, a second operating mode 1560 dynamically regenerates the second circular trajectory 1556 as the trailer 110 is guided to the waypoint position along the second circular trajectory 1556. As with the other features described with reference to the planner modes 1564 shown in FIG. 12, the second operating mode 1560 of the planner modes 1564 shown in FIG. 17 may generate the second circular trajectory 1556 independent of the angular orientation at the waypoint. The embodiment shown in FIG. 17 also includes a projection mode 1576 that may operate with the first and second operating modes 1558, 1560 as described above.

As also shown in FIG. 17, a third operating mode 1562 may be included that switches to the first operating mode 1558 when the trailer 110 reaches the waypoint for guidance to a subsequent waypoint of the plurality of waypoints. This may occur when either the second operating mode 1560 guides the trailer 110 to the waypoint or the projection mode 1576 guides the trailer 110 to the waypoint. It is contemplated that the plurality of waypoints may be ordered, such that the third operating mode 1562 determines the subsequent waypoint as the next sequential waypoint provided in a list of waypoints. However, it is also conceivable that the third operating mode 1562 may determine the subsequent waypoint based on the proximity of the plurality of waypoints relative to the current position of the trailer 110 when reaching the waypoint guided by the second operating mode 1560 or the projection mode 1576.

Still referring to the embodiment illustrated in FIG. 17, a fourth operating mode 1578 is depicted that that is configured to stop the vehicle 100 and the trailer 110 when the trailer 110 reaches or substantially reaches a final waypoint of the plurality of waypoints. Again, in one embodiment, the final waypoint may be the last waypoint sequentially in a list of waypoints. As such, the fourth operating mode 1578 determines when the trailer 110 substantially reaches the final waypoint, such as overcoming a threshold distance between the current position and the final waypoint, whereby the threshold distance may be adjusted based on the degree of accuracy desired for the system. When the fourth operating mode 1578 determines that the final waypoint has been reached by the trailer 110, the trajectory planner 1550 may communicate directly or via the curvature controller (FIG. 9) to the vehicle 100 to effective stop the trailer 110, such as by reducing the throttle of the vehicle's engine, braking with the vehicle brake system or the trailer brake system, engine braking, or otherwise reducing the velocity of the trailer 110 and vehicle 100 to stop the backing maneuver of the trailer 110.

Figure 18:
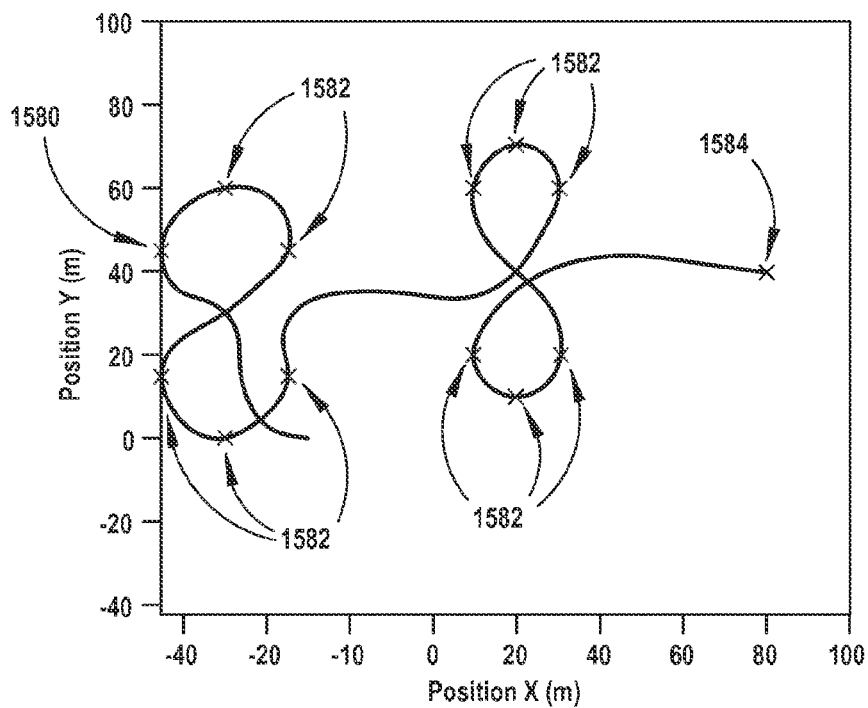
FIG. 18 is a graph of a coordinate system with a simulated path of a trailer traveled between various waypoints using the trailer backup assist system, according to one embodiment.

As illustrated in FIG. 18, a simulated path of the trailer 110 is defined for one embodiment of the trajectory planner 1550 having the operating modes illustrated in FIG. 17. In the illustrated embodiment, the plurality of waypoints included thirteen waypoints sequentially ordered with an initial waypoint 1580, intermediate waypoints 1582, and a final waypoint 1584. In one embodiment, the plurality of waypoints may be provided to generate a path that would otherwise not be generated if only a single (final) waypoint was provided. Accordingly, it is contemplated that the path generated between the plurality of waypoints may be configured to avoid an obstacle between an initial waypoint and the final waypoint. Such an obstacle may include a navigating around a sharp corner or a building or may also include navigating along a narrow roadway or through a bottleneck region of a path or a congested parking lot.

Figure 19A:
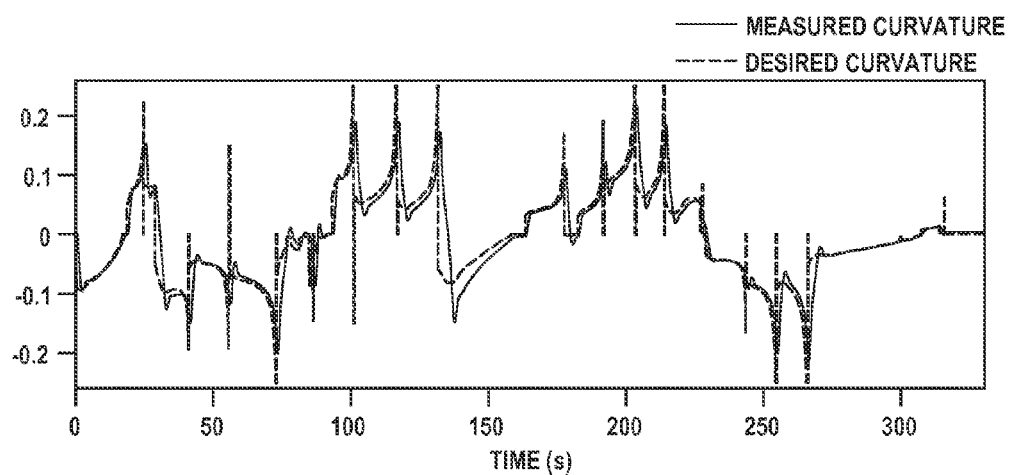
FIG. 19A is a plotted graph of desired curvature and measured curvature in simulating operation of the trailer backup assist system of FIG. 18.
Figure 19B:
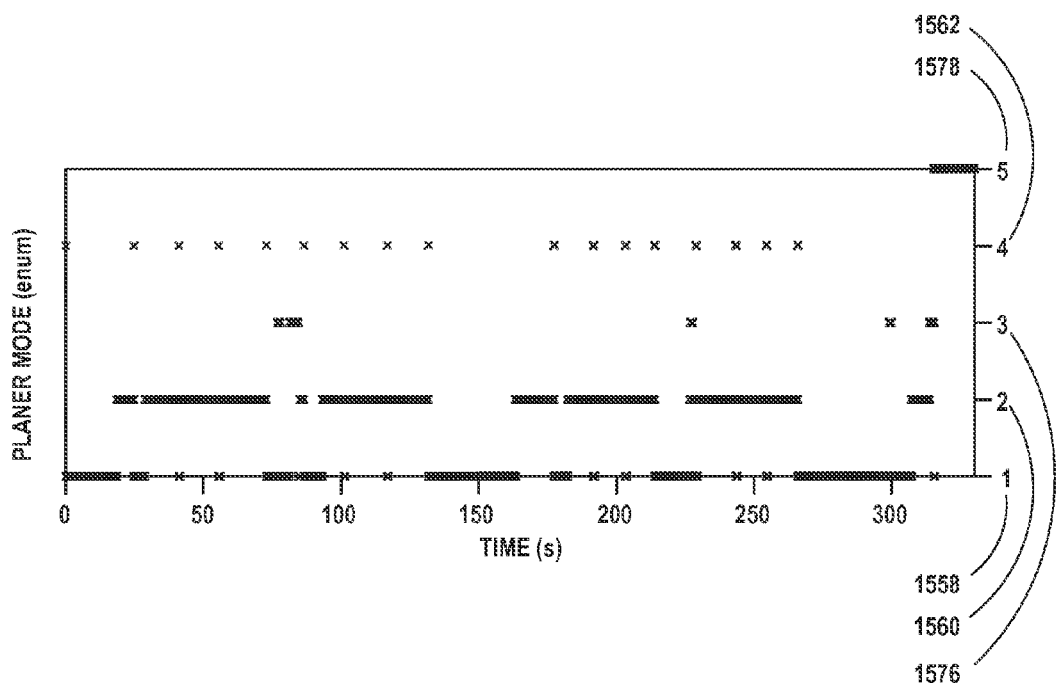
FIG. 19B is a plotted graph of the planner modes used in simulating operation of the trailer backup assist system of FIG. 18.

To provide the guidance of the trailer, as shown in FIG. 18, between the plurality of waypoints, the trajectory planner 1550 provided a desired curvature $\kappa_2$ to the curvature controller (FIG. 9) based on the curvature $\kappa_2$ of the projected trajectory that the trailer 110 was traveling over. For instance, when the trailer 110 was on a first circular trajectory 1554 as projected by the first operating mode 1558, the radius of the first circular trajectory 1554 is used to provide the desired curvature $\kappa_2$ to the curvature controller 1508, and likewise, when the trailer 110 was on a second circular trajectory 1556, as projected by the second operating mode 1560, the radius of the second circular trajectory 1556 is used to provide the desired curvature $\kappa_2$ to the curvature controller 1508. To offer additional explanation, FIGS. 19A-19B are provided to show the desired and measured curvatures as well as the planner mode that were used when operating the trajectory planner 1550 for reversing the trailer along the simulated path shown in FIG. 18. As such, the time interval is identical between FIGS. 19A-19B, so it can be observed how the change in desired curvature $\kappa_2$ correlates with the change in planner modes.

Figure 20:
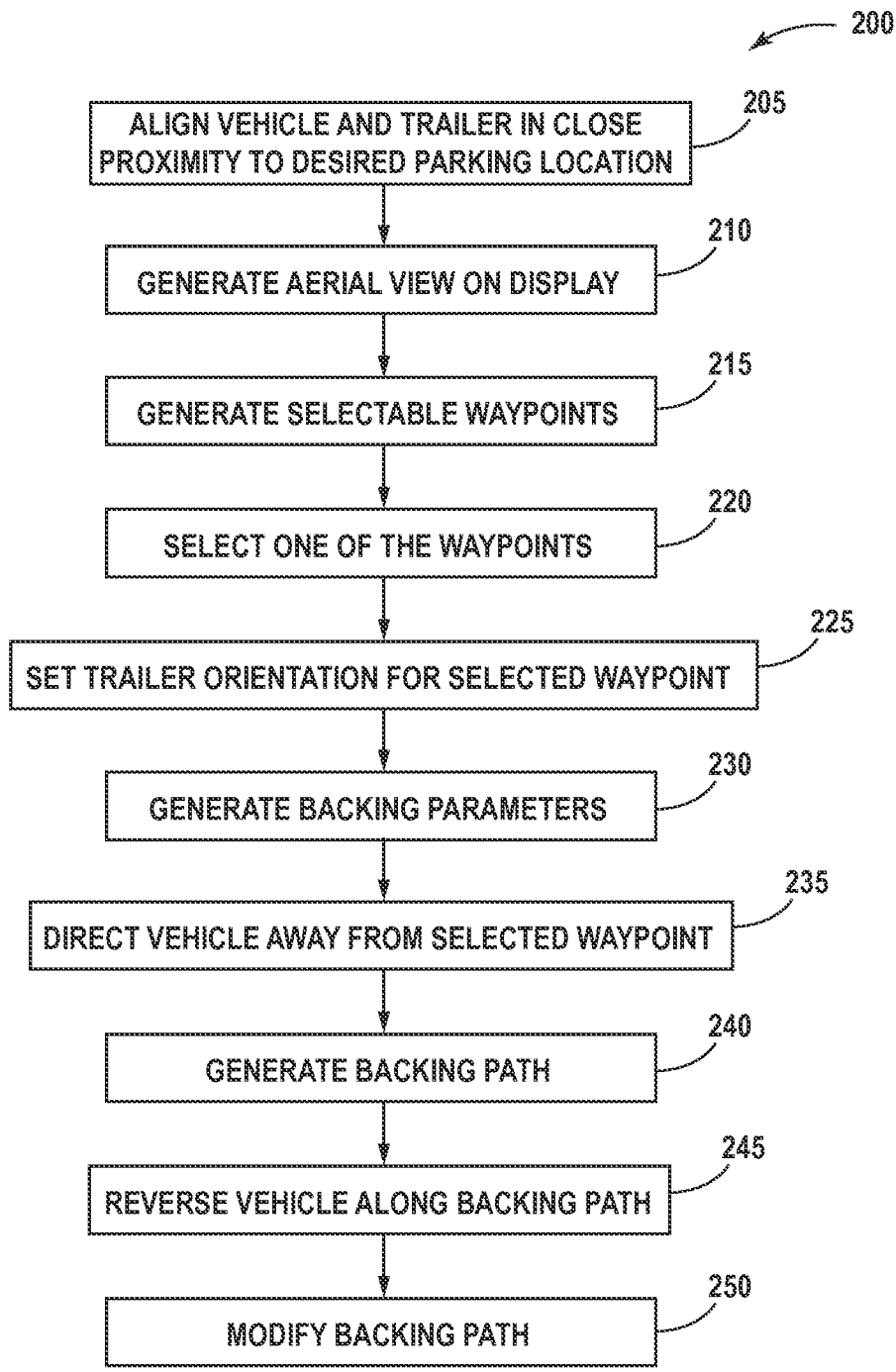
FIG. 20 is a flow chart illustrating a method for backing a trailer, according to one embodiment.

Referring to FIG. 20, a flow chart illustrating a method 200 for backing a trailer 110 is shown according to one embodiment and is exemplarily described below as being implemented by the trailer backup assist system 105 shown in FIG. 9. The method 200 is particularly beneficial in assisting an operator in backing a trailer 110 to a parking location that is in relative proximity to a vehicle 100 towing the trailer 110. Exemplary backing maneuvers may include parallel parking, 45 degree parking, and 90 degree parking.

Figure 21:
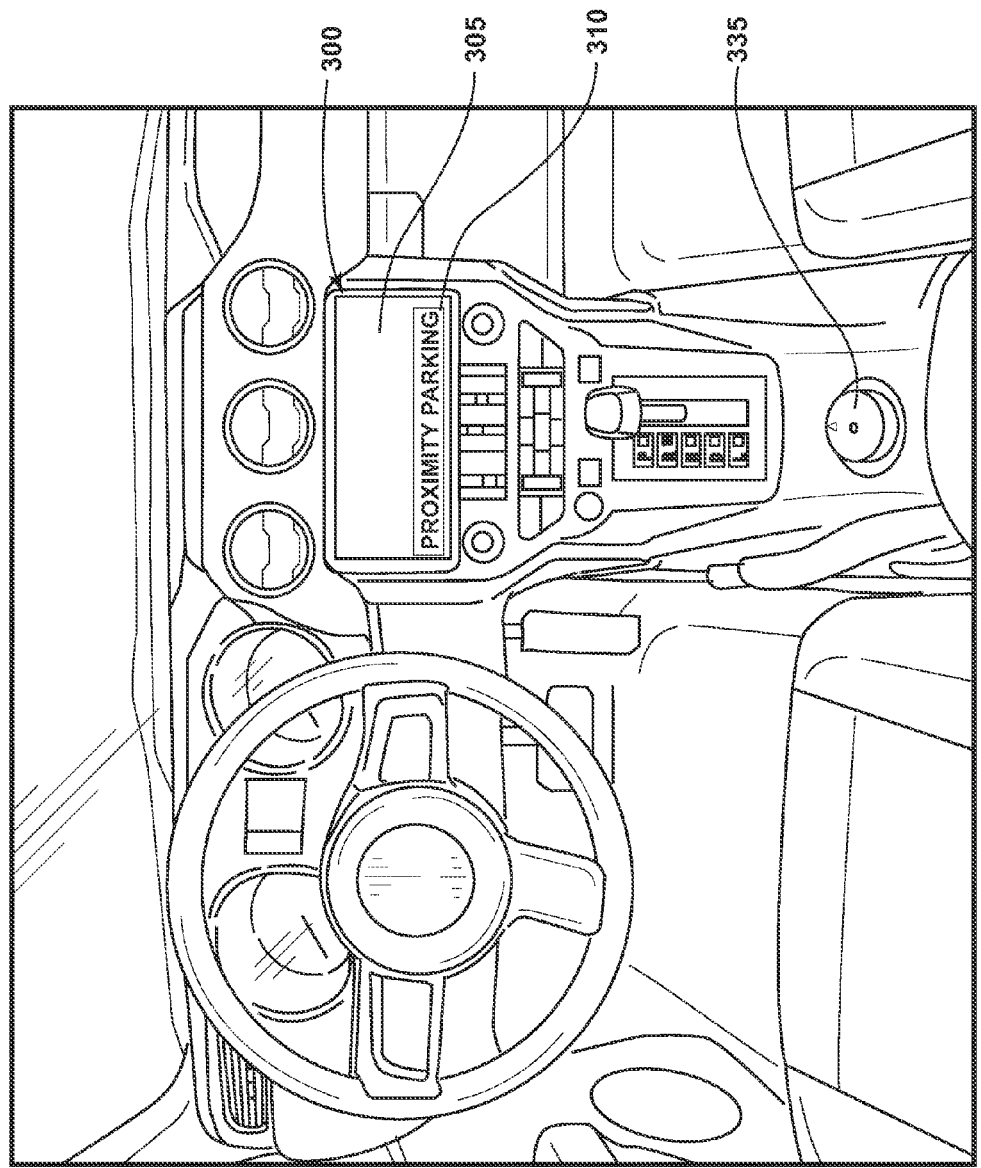
FIG. 21 illustrates a proximity parking feature being shown on a display of a vehicle.

Beginning at step 205, an operator of a vehicle 100 that is towing a trailer 110 aligns the vehicle 100 and the trailer 110 in close proximity (e.g., adjacent) to a desired parking location. Once the vehicle 100 is placed in park, the operator may be given the option of selecting a parking assist feature from the display 300 of the vehicle 14. As exemplarily shown in FIG. 21, the display 300 may be configured as a center stack mounted display and may include a screen 305 configured to register touch events to allow the operator to input a variety of touch commands that are communicated to the trailer backup assist system 105. The screen 305 may be configured as a touchscreen of any type such as, but not limited to, a resistive type, capacitive type, surface acoustic type, infrared type, and optical type. The display 300 may show a proximity parking feature 310 that is available for selection. For purposes of simplicity, other selectable features have been omitted.

Figure 22:
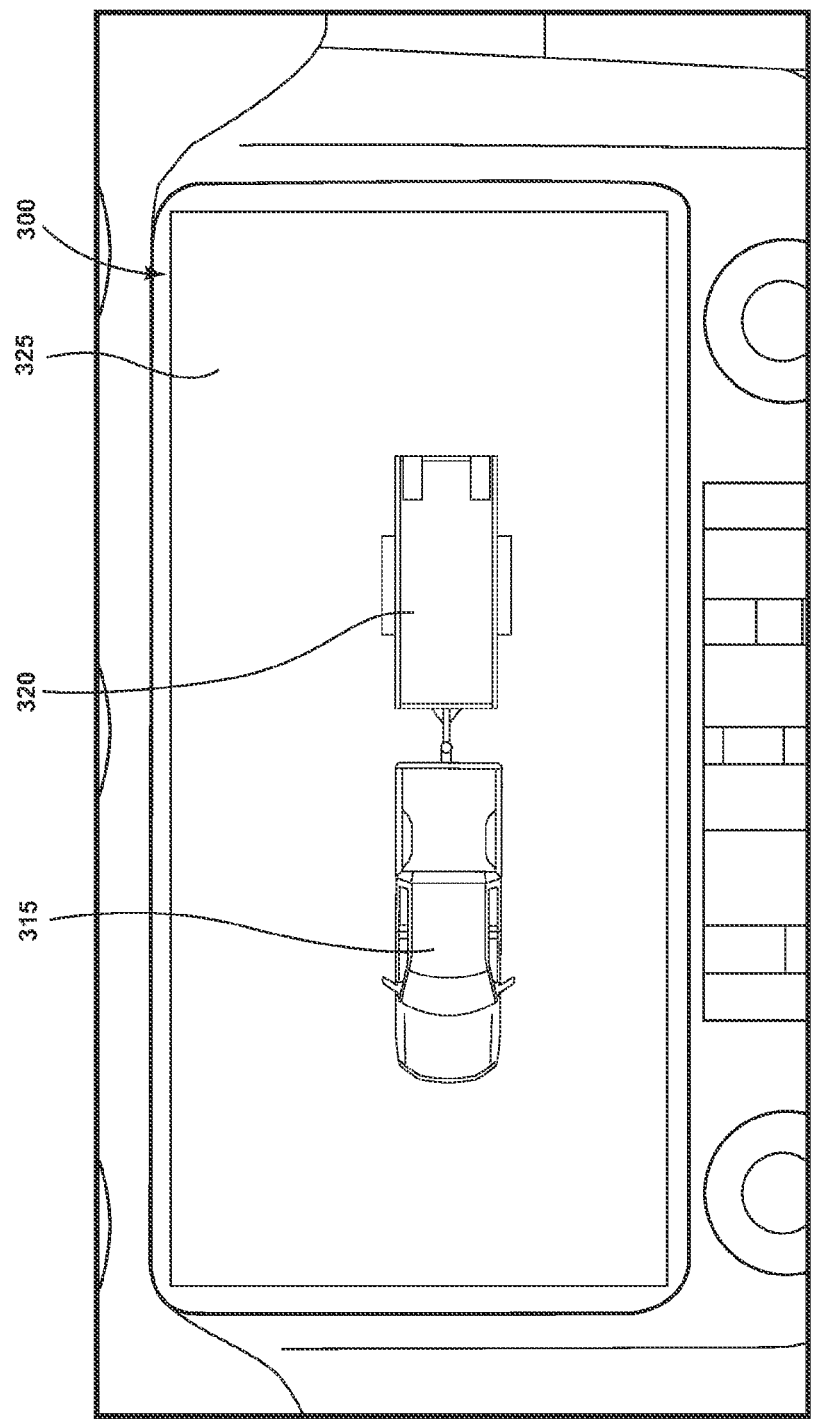
FIG. 22 illustrates the display showing an aerial view of a vehicle and a trailer.

Once the operator selects the proximity parking feature 310, an aerial view of the vehicle 100 and the trailer 110 is shown on the display 300 at step 210. As exemplarily shown in FIG. 22, the vehicle 100 and the trailer 110 may be represented on the display 300 as vehicle model 315 and trailer model 320, respectively. Vehicle model 315 and trailer model 320 may both be generated by the trajectory planner 1550 or a separate controller and incorporated into the aerial view as sample image data and/or rendered graphics. The sampled image data may include stock images of the vehicle 100 and a library of trailer images that may be incorporated into the aerial view to demonstrate the proportions and position of the vehicle 100 relative to the trailer 110 and the operating environment 325. In one embodiment, the vehicle model 315 and the trailer model 320 may be generated based on user supplied vehicle and/or trailer related information. Such information may be provided via the HMI 25 and may include vehicle dimensions and/or trailer dimensions. Additionally the trajectory planner 1550 or separate controller may utilize hitch angle information provided from the hitch angle detection apparatus 1504, 130 to display the position of the vehicle model 315 relative to the trailer model 320 at the corresponding hitch angle.

Figure 23:
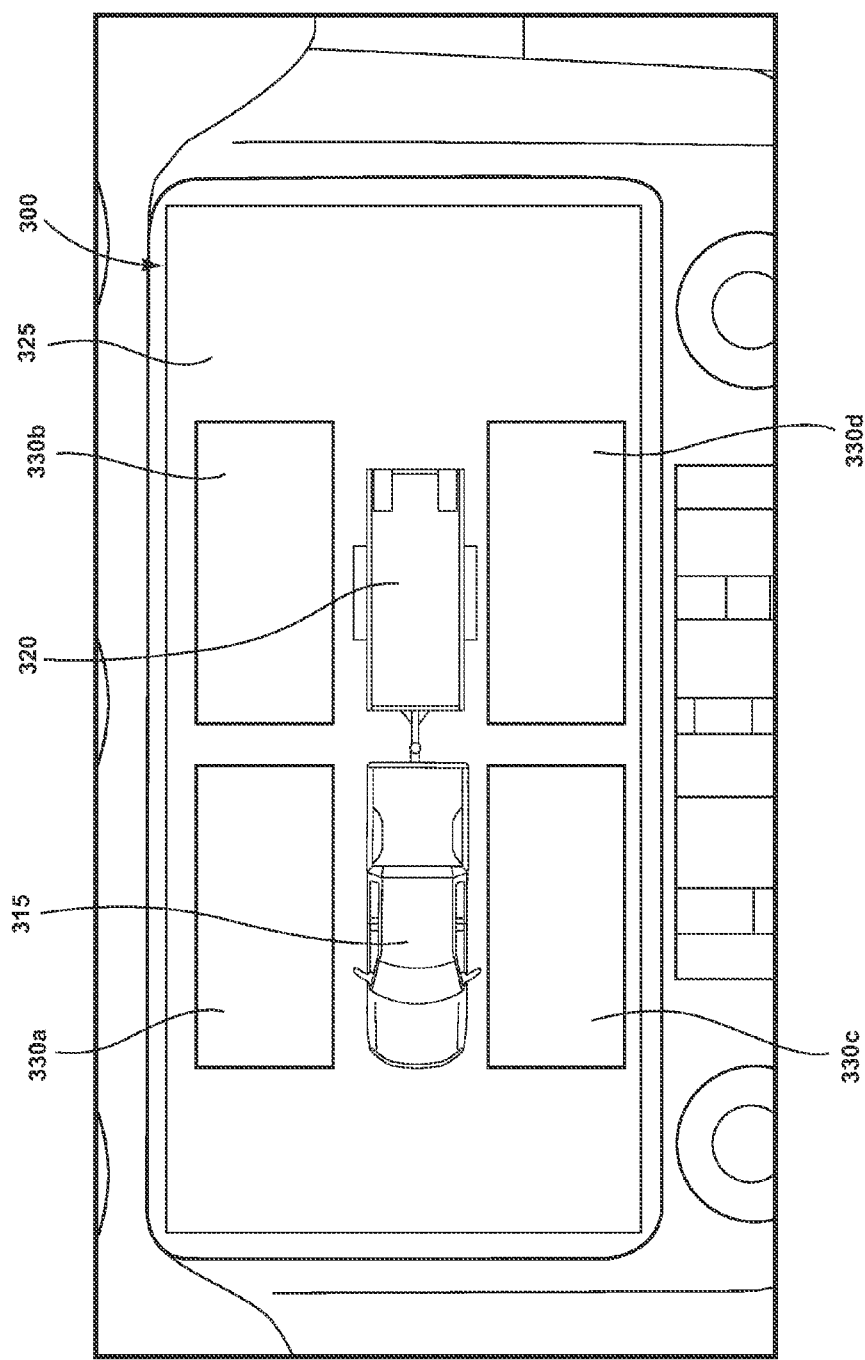
FIG. 23 illustrates a plurality of selectable waypoints shown on the display.

At step 215, one or more selectable waypoints 330a-330d may be generated on the display 300 as exemplarily shown in FIG. 23. Each waypoint 300a-300d may be generated by the trajectory planner 1550 or a separate controller. Each waypoint 300a-300d is shown on the display 300 relative to a current position of the vehicle 100 and the trailer 110. With respect to the illustrated embodiment of FIG. 23, each waypoint 330a-330d is configured as a box located adjacent the vehicle model 315 and/or the trailer model 320. More specifically, each waypoint 330a-330d is located off to a side of the vehicle model 315 and/or the trailer 320 and indicates a possible final parking location for the trailer 12. By providing multiple waypoints 330a-330d on both sides of the vehicle 100 and trailer 110, the operator may conveniently select the waypoint 330a-330d that best matches the desired parking location and/or general parking direction.

Figure 24:
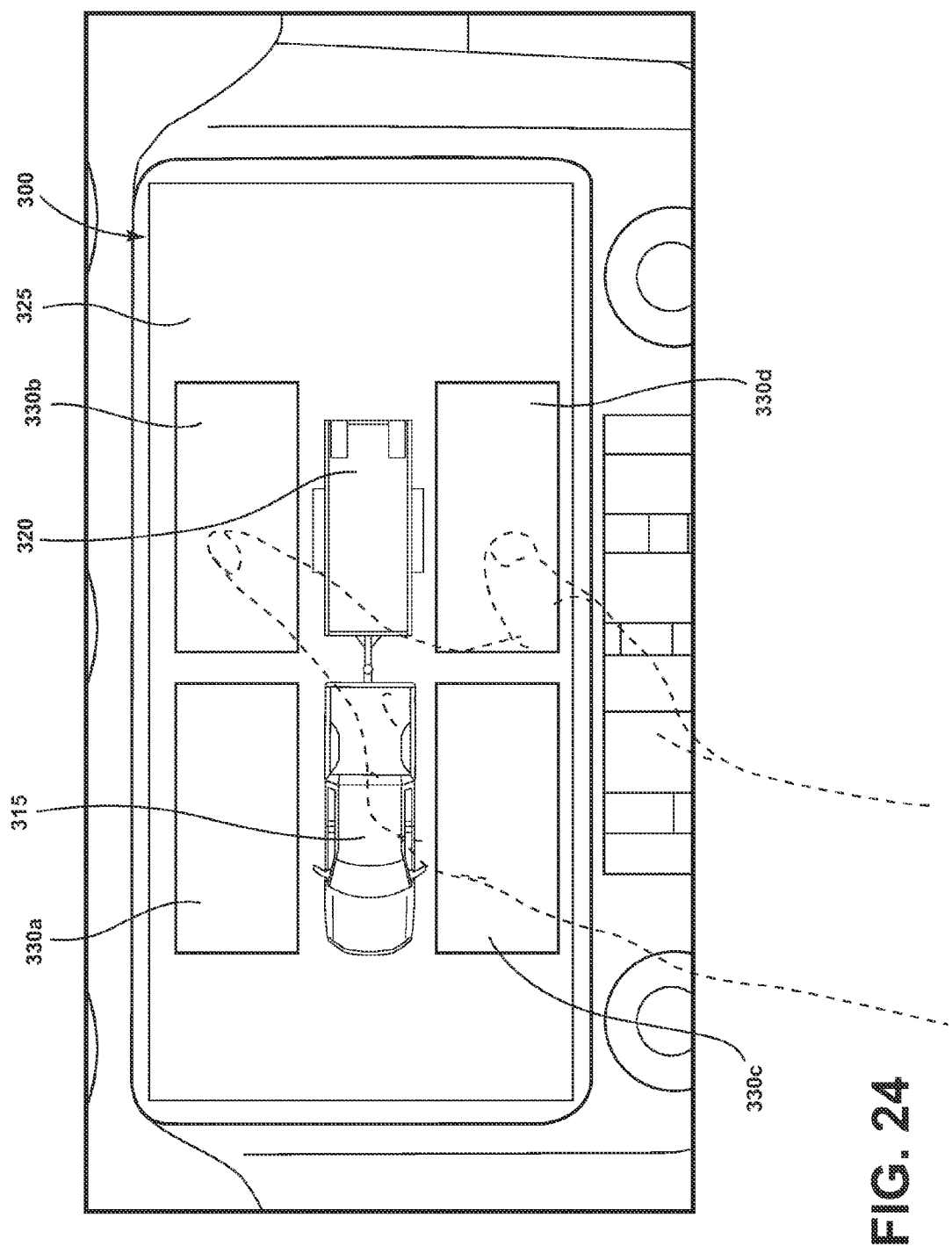
FIG. 24 illustrates a touch event being performed to select one of the waypoints.

At step 220, the operator selects one of the waypoints 330a-330d as the desired parking location of the trailer 110. For purposes of illustration, the process of waypoint selection will be described below using waypoint 330b as the desired waypoint. It should be understood that the other waypoints 330a, 330c, 330d may be selected in a manner similar to those described below. In one embodiment, as shown in FIG. 24, the operator may select the desired waypoint 330b, by touching the screen 305 where the corresponding box is shown. The touch event is registered by the screen 305 and the selected waypoint 330*b* is communicated to the trajectory planner 1550 for processing.

Figure 25:
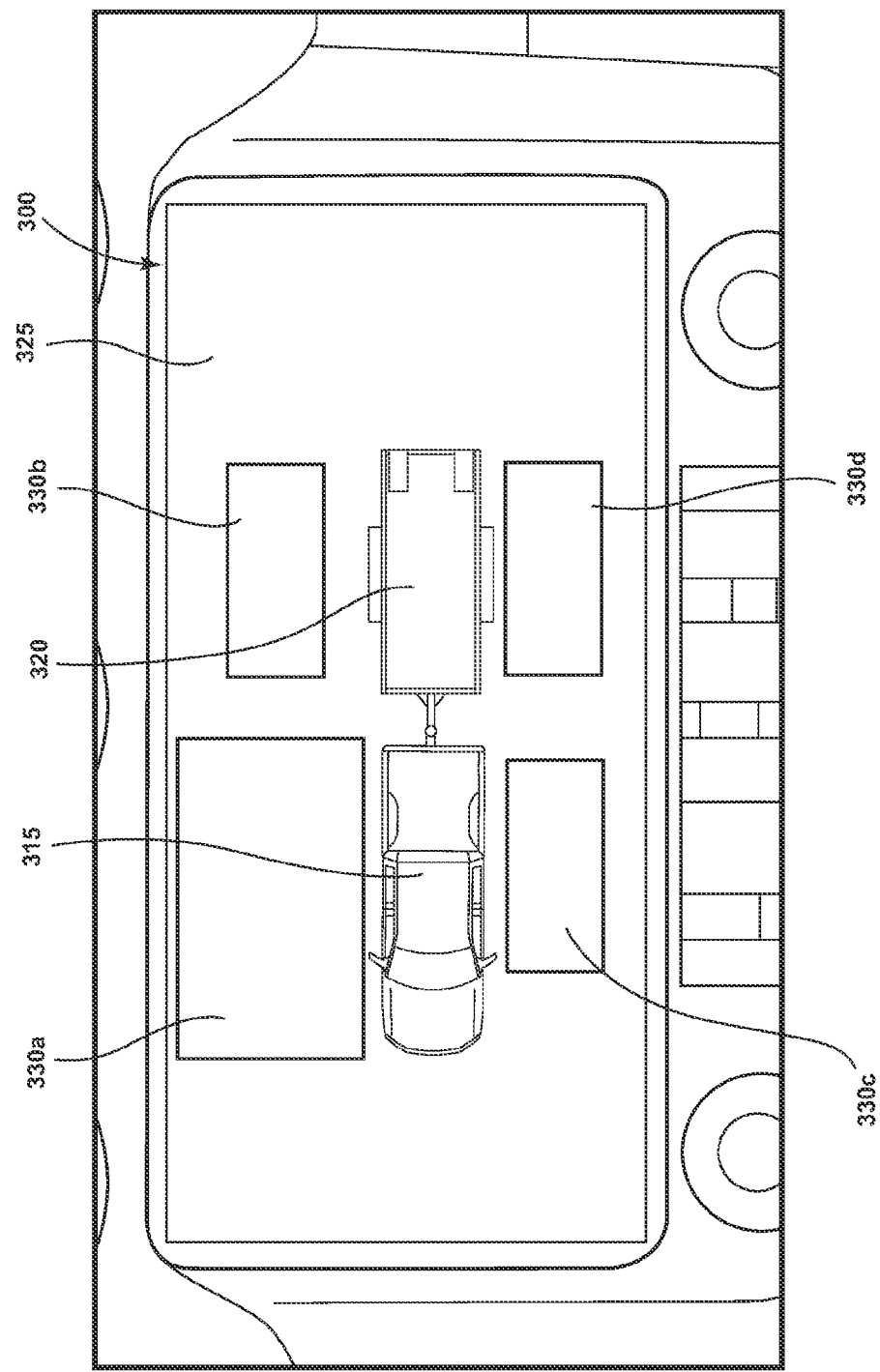
FIG. 25 illustrates the assignment of a waypoint as an initial toggle position, according to one embodiment.

Alternatively, the operator may select the desired waypoint 330*b* using the rotatable knob 335 of the curvature input module 1506. According to one embodiment, the rotatable knob 335 is operable to toggle between the waypoints 330*a*-330*d*. The direction in which toggling occurs may depend on the direction in which the rotatable knob 335 is turned. For example, turning the rotatable knob 335 in a clockwise direction toggles between the waypoints 330*a*-330*d* in a clockwise direction and turning the rotatable knob 335 in a counterclockwise direction toggles between the waypoints 330*a*-330*d* in a counterclockwise direction. For example, as shown in FIG. 25, the initial toggle position may be assigned to waypoint 330*a* by default. In one embodiment, the waypoint 330*a* to which the toggle position is currently assigned may have a larger border to allow it to be visually distinguished from the other waypoints 330*b*-330*d*. Additionally or alternatively, the waypoint 330*a* may be shown in a different color, blink, or otherwise be represented in such a manner that it can be easily identified by the operator. If desiring to select waypoint 330*b*, the operator may turn the rotatable knob 335 clockwise to toggle from waypoint 330*a* to waypoint 330*b* so that waypoint 330*b* is assigned as the current toggle position. The operator may select waypoint 330*b* by depressing the rotatable knob 335 or otherwise indicating its selection via a touch event or other means, thereby communicating the selection of waypoint 330*b* to the trajectory planner 1550 for processing.

Figure 26:
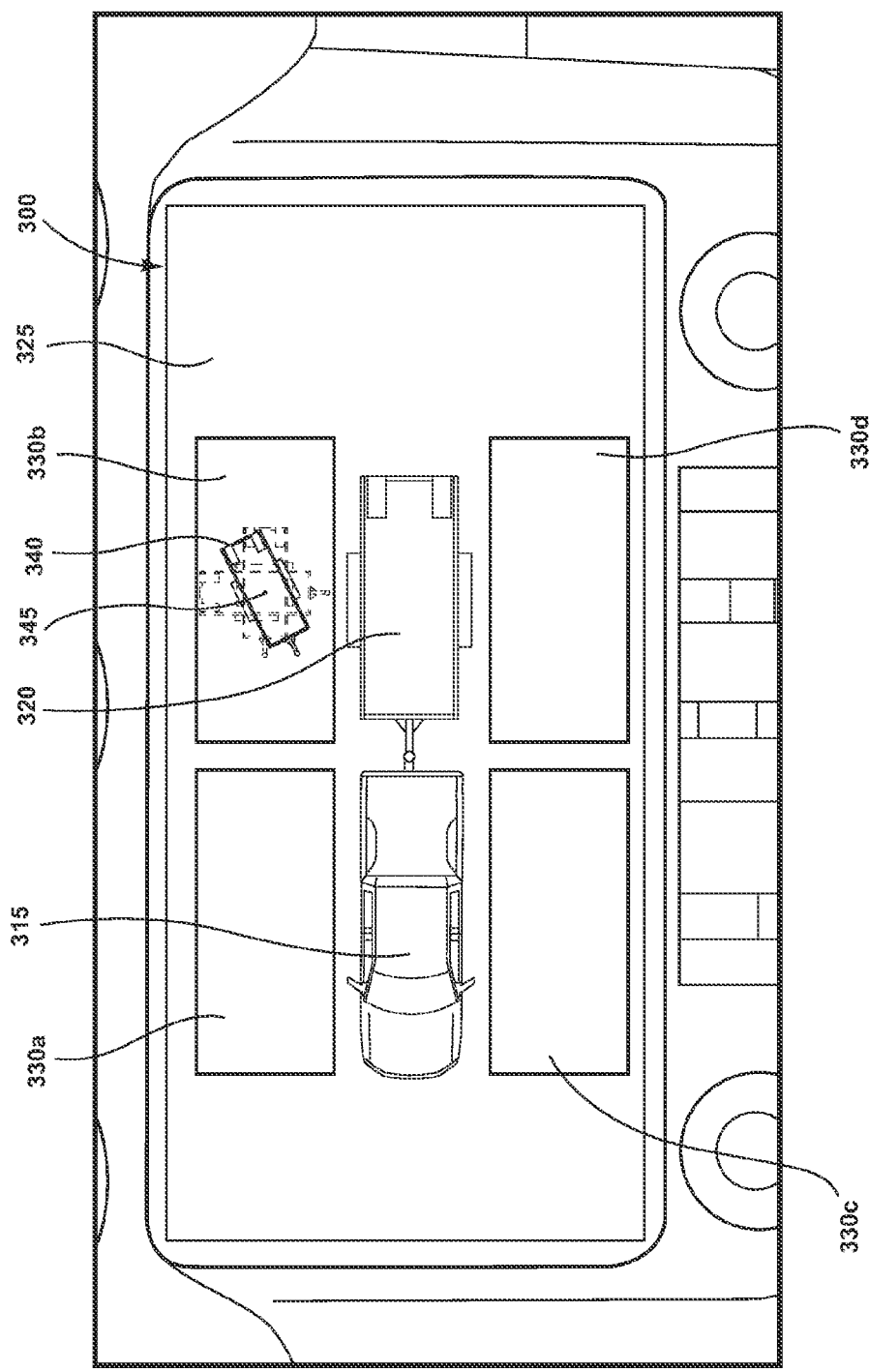
FIG. 26 illustrates common trailer orientations for a selected waypoint.

Next, at step 225, the operator is prompted to set an orientation of the trailer 12 for the selected waypoint 330*b*. According to one embodiment, exemplarily shown in FIG. 26, another trailer model 340 may be generated inside the box belonging to the selected waypoint 330*b*. The trailer model 340 may be generated by the trajectory planner 1550 or other controller and may share similar dimensions to trailer model 320 to visually relate the final position of the trailer 110 to the current position of the trailer 110. The trailer model 340 may be centered in the box of the selected waypoint 330*b* by default and rotated about a center point 345. For purposes of illustration, the trailer model 340 is shown by solid lines in a current trailer orientation, wherein the trailer model 340 is oriented at approximately 45 degrees with respect to trailer model 320. The trailer model 340 is also shown in phantom lines oriented at 90 degrees and in parallel with respect to trailer model 320 to illustrate other common trailer orientations. For a given trailer orientation, the trailer model 340 may include an arrow or other indicator pointing to the front of the trailer model 340 to assist the operator in properly setting the trailer heading.

An operator may select a trailer orientation using the rotatable knob 335. For example, turning the rotatable knob 335 in either a clockwise or counterclockwise direction may cause the trailer model 340 to rotate about the center point 345 in like fashion. Once the trailer model 340 is in a desired trailer orientation, the operator may set the trailer orientation by depressing the rotatable knob 335 or otherwise indicating its selection via a touch event or other means, thereby communicating the selected trailer orientation to the trajectory planner 1550 or other controller for processing. Additionally or alternatively, the operator may be presented with shortcuts to common trailer orientations and/or prior selected trailer orientations for the same waypoint location. Thus, it should be appreciated that a selected trailer orientation for a given waypoint location may be saved (e.g., to memory 1574, FIG. 10) and displayed on the display 300 as a selectable option for when an operator wishes to perform a backing maneuver at that particular waypoint location at a later time. To select a shortcut, the operator may touch the box associated therewith. In response, the screen 305 registers the touch event and communicates the trailer orientation associated with the selected shortcut to the trajectory planner 1550 or other controller for processing.

Figure 27:
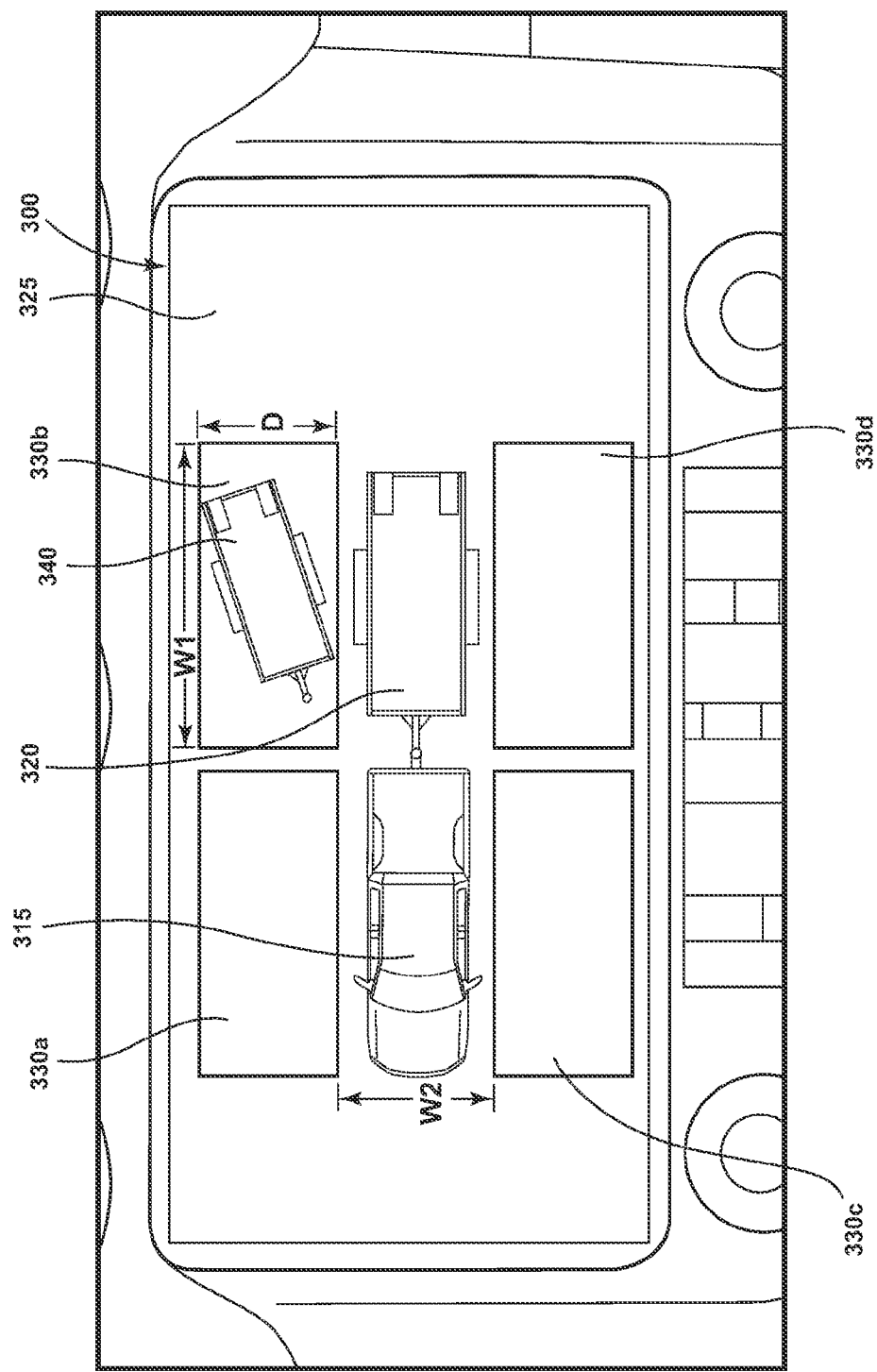
FIG. 27 illustrates backing parameters used for generating a backing path.

Once the trailer orientation has been set, the trajectory planner 1550 or other controller generates backing parameters at step 330. According to one embodiment, the parameters are related to a depth D of the selected waypoint 330*b*, a width W1 of the selected waypoint 330*b*, and a width W2 of the path on which the vehicle 100 and trailer 110 are currently located as exemplarily shown in FIG. 27. The depth D at which the trailer 110 is to be parked may be set to a predetermined depth. For example, the depth D may be set to twice the length of the trailer 110 added to the vehicle wheelbase and the hitch ball offset. Alternatively, the depth D may be set by the operator via the HMI 25. Similarly, the width W1 of the selected waypoint 330*b* may be set to a predetermined value or inputted by the operator. For example, the width W1 may be set to twice the width of the trailer 110. The width W2 of the current path may also be set to a predetermined value or inputted by the operator. For example, the width W2 of the initial backing path may be set to 1.5 lanes wide, as provided by a map database or other data collection source. Additionally or alternatively, one or more of the above mentioned backing parameters may be set using sensing devices such as, but not limited to, cameras, radar, lidar, the like, or a combination thereof.

Figure 28:
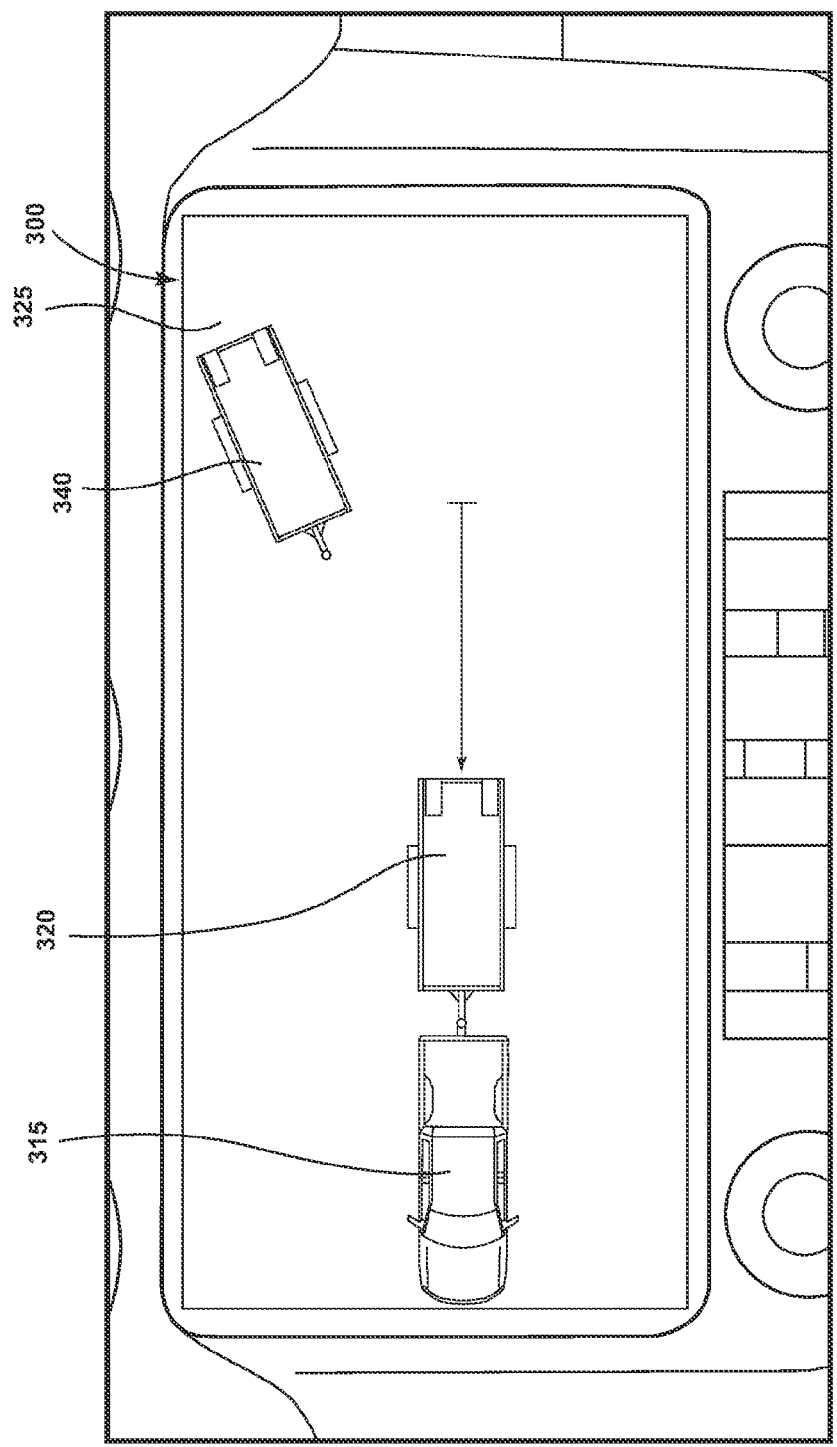
FIG. 28 illustrates the display showing the vehicle being directed in a forward direction.
Figure 29:
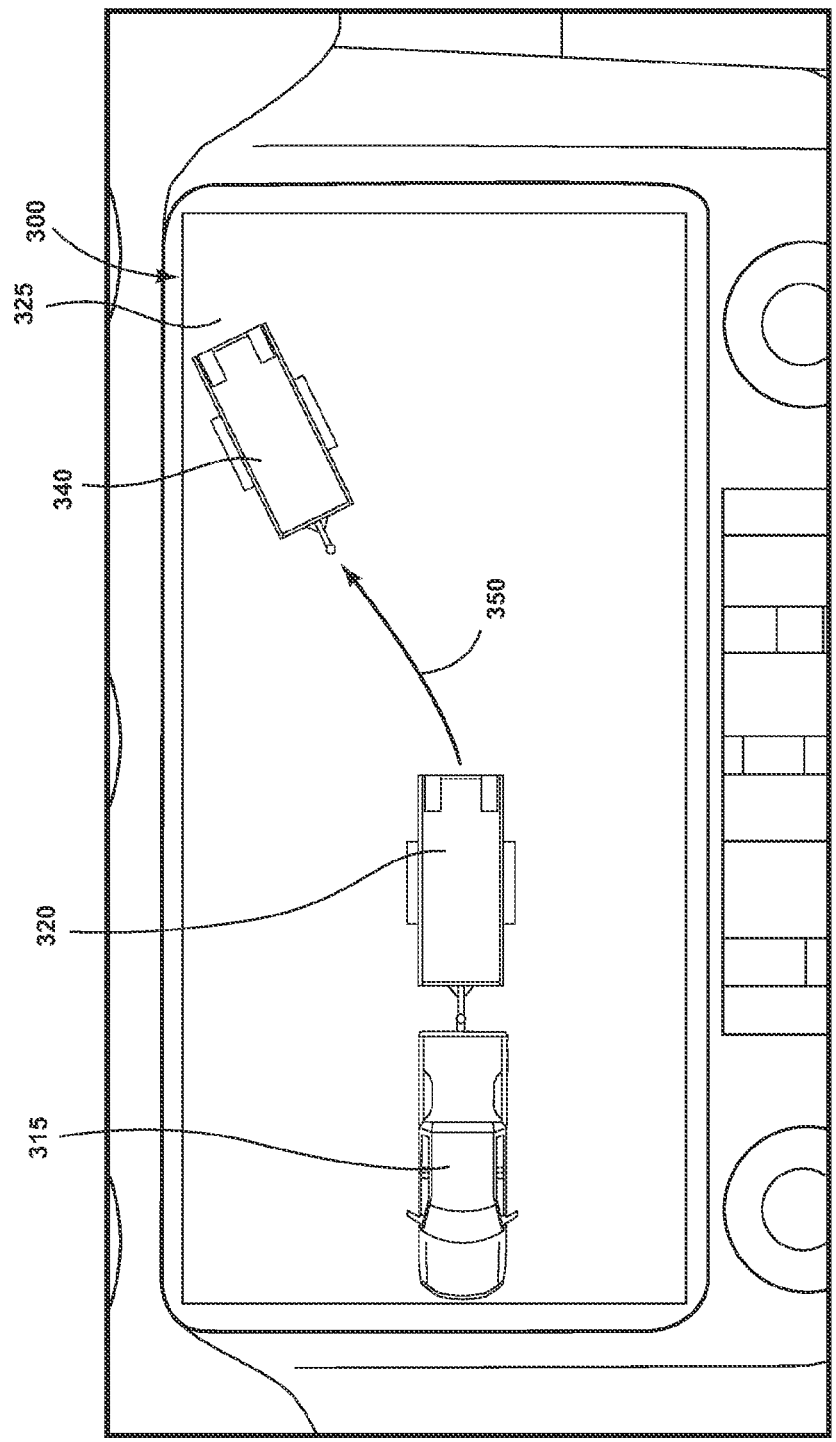
FIG. 29 illustrates a backing path being shown on the display.

At the conclusion of step 230, the operator is prompted to direct the vehicle 100 away from the selected waypoint 330*b* at step 235. Alternatively, the vehicle 100 may be guided away from the selected waypoint 330*b* by the trailer backup assist system 105 in an autonomous manner. According to one embodiment, the vehicle 100 is operated in a forward direction along the current path. The forward progress of the vehicle 100 and the trailer 110 may be displayed on the screen 305 as exemplarily shown in FIG. 28. While the vehicle 100 is pulling forward, the trajectory planner 1550 or other controller generates a backing path at step 240 once the vehicle 100 and trailer 110 have moved far enough forward such that a backing maneuver can be successfully performed. The backing path may be generated using the methods described previously herein while taking into account the selected waypoint 330*b*, trailer orientation, and backing parameters. Once a suitable backing path has been generated, a warning is issued to the operator prompting the operator to stop the vehicle 100 and reverse the vehicle 100 at step 245. Additionally, the backing path, exemplarily shown in FIG. 29 as backing path 350, may be shown on the display 300. Once in reverse, the trailer backup assist system 105 may take over the steering of the vehicle 100 while the operator controls the throttle and the brakes. In alternative embodiments, the throttle and/or brakes may be controlled by the trailer backup assist system 105.

Figure 30:
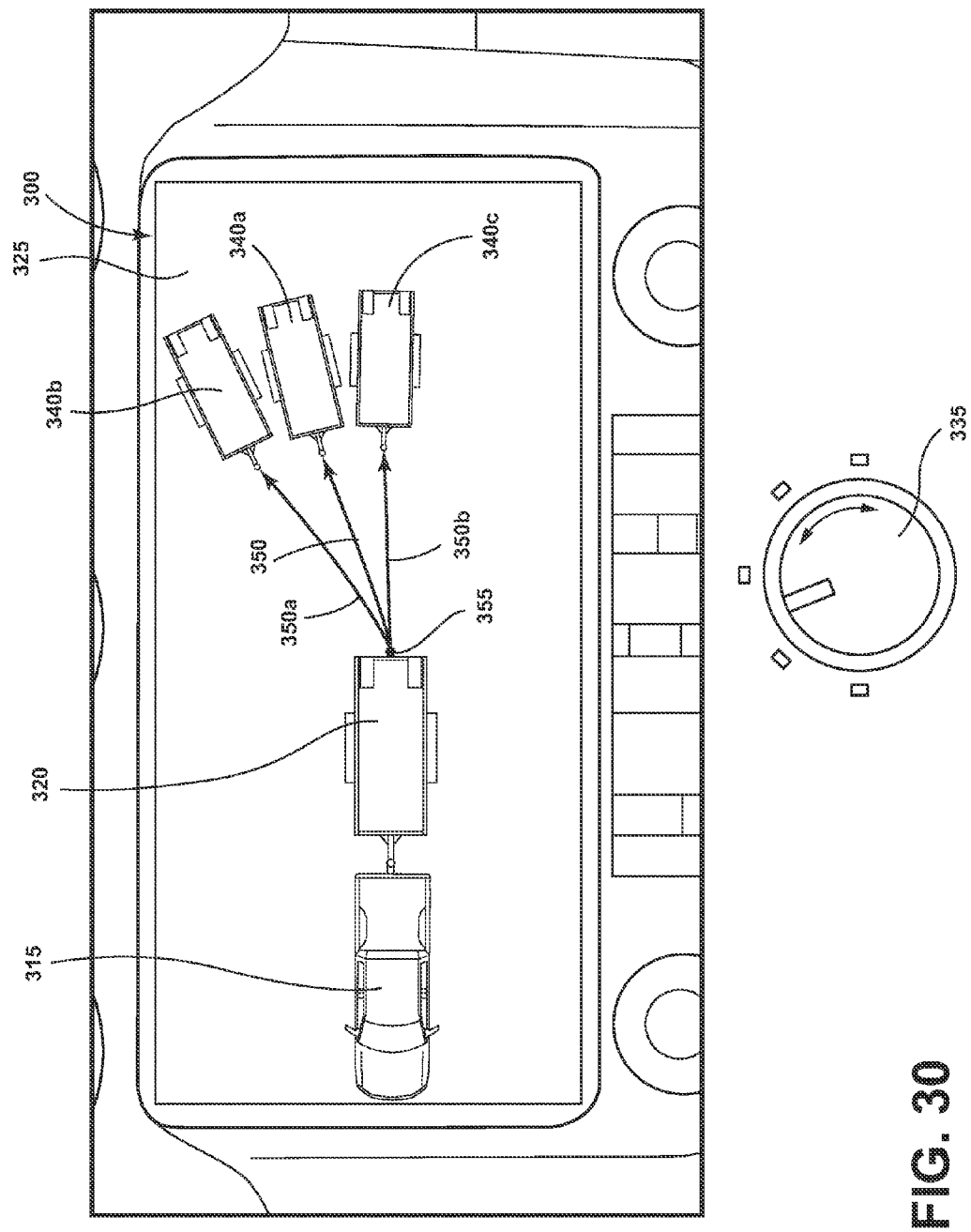
FIG. 30 illustrates modifications to the curvature of the backing path using a rotatable knob.

While the trailer 110 is being backed along the backing path 350, the operator may perform modifications to the curvature of the backing path at step 250. According to one embodiment, the curvature of the backing path is modified using the rotatable knob 335. For example, turning the rotatable knob 335 in either a clockwise direction or counterclockwise direction causes the backing path 350 to be rotated in a like manner about an intermediate waypoint along the backing path 350 that is located between the current position of the trailer 110 and the final parking position of the trailer 110. Examples of modifications to a backing path 350 are shown in FIG. 30. As shown, the backing path 350 and modifications made thereto may be displayed on the display 300 to enable the operator to visualize the change in trailer positioning and orientation resulting from the modification. For example, the backing path 350 may be rotated in a counterclockwise direction about an intermediate waypoint 355 located directly behind the current position of the trailer model 320 to yield modified backing path 350a or a clockwise direction to yield modified backing path 350b. In addition, the display 300 may show a new trailer model 340a, 340b for the corresponding modified backing path 350a, 350 to enable the operator to visualize the new trailer position and orientation should the modified backing path 350a, 350b be selected. The amount in which the backing path 350 is rotated in the clockwise or counterclockwise directions may depend on the degree in which the rotatable knob 335 is rotated in the corresponding direction. By modifying the backing path 350, the operator may make minor or major adjustments to the backing path 350 in real time. Additionally or alternatively, the operator may override the trailer backup assist system 105 by turning the steering wheel of the vehicle or otherwise indicating that autonomous steering of the vehicle 100 is no longer desired. Once the selected waypoint 330b has been reached, rearward progress of the vehicle 100 may be stopped automatically by the trailer backup assist system 105. Alternatively, a warning notifying the operator to apply the brakes may be provided. Once the vehicle 100 has come to a stop, the backup maneuver is complete.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

The invention claimed is:

1. A trailer backup method comprising the steps of:
generating an aerial view on a display showing a vehicle attached to a trailer, and a plurality of parking locations positioned to the sides of the vehicle and the trailer, each parking location represented by a box;
selecting one of the parking locations, wherein the box associated with a selected parking location has an enlarged border so as to be visually distinguishable from the boxes associated with unselected parking locations;
displaying a trailer-shaped model inside the selected parking location;
setting a trailer orientation by manipulating the trailer-shaped model;
determining a backing path for achieving the set trailer orientation at the selected parking location; and
backing a trailer along the backing path.

2. The method of claim 1, wherein the one of the parking locations is selected using one of a rotatable knob and a touch event registered on a touchscreen of the display.

3. The method of claim 1, further comprising the step of driving a vehicle in a forward direction until the backing path has been determined.

4. The method of claim 1, wherein the step of determining a backing path is based on backing parameters comprising a predetermined depth of the selected parking location, a width of the selected parking location, and a width of an initial path on which the trailer is currently located.

5. The method of claim 1, further comprising the step of autonomously steering the vehicle while backing the trailer along the backing path.

6. The method of claim 1, further comprising the step of modifying the backing path while backing the trailer along the backing path.

7. The method of claim 6, wherein the step of modifying comprises providing a rotatable knob for adjusting a curvature of the backing path.

8. The method of claim 1, wherein the box associated with the selected parking location is displayed in a different color than the boxes associated with unselected parking locations or made to blink.

9. A trailer backup method comprising the steps of:
displaying an aerial representation of a vehicle and a trailer;

generating a plurality of parking locations, each parking location represented by a box adjacent to one of the vehicle and the trailer;

selecting one of the parking locations, wherein the box associated with a selected parking location has an enlarged border so as to be visually distinguishable from the boxes associated with unselected parking locations;

displaying a trailer-shaped model inside the selected parking location, the trailer-shaped model having an indicator pointing to the front of the trailer-shaped model;

setting a trailer orientation by rotating the trailer-shaped model;

determining a backing path terminating at the selected parking location and resulting in the set trailer orientation; and backing the trailer along the backing path.

10. The method of claim 9, wherein the one of the parking locations is selected using one of a rotatable knob and a touch event registered on a touchscreen.

11. The method of claim 9, further comprising the step of driving the vehicle in a forward direction until the backing path has been determined.

12. The method of claim 9, wherein the step of determining a backing path is based on backing parameters comprising a predetermined depth of the selected parking location, a width of the selected parking location, and a width of an initial path on which the trailer is currently located.

13. The method of claim 9, further comprising the step of modifying the backing path while backing the trailer along the backing path.

14. The method of claim 13, wherein the step of modifying comprises providing a rotatable knob for adjusting a curvature of the backing path.

15. A trailer backup method comprising the steps of:

displaying an aerial representation of a vehicle and a trailer;

generating a plurality of parking locations, each parking location represented by a box;

selecting one of the parking locations, wherein the box associated with a selected parking location has an enlarged border so as to be visually distinguishable from the boxes associated with unselected parking locations;

displaying a trailer-shaped model inside the selected parking location;

setting a trailer orientation by rotating the trailer-shaped model about a central point;

determining a backing path for achieving the set trailer orientation at the selected parking location; and backing the trailer along the backing path.

16. The method of claim 15, wherein the one of the parking locations is selected using one of a rotatable knob and a touch event registered on a touchscreen.

17. The method of claim 15, further comprising the step of driving the vehicle in a forward direction until the backing path has been determined.

18. The method of claim 15, wherein the step of determining a backing path is based on backing parameters comprising a predetermined depth of the selected parking location, a width of the selected parking location, and a width of an initial path on which the trailer is currently located.

19. The method of claim 15, further comprising the step of autonomously steering the vehicle while backing the trailer along the backing path.

20. The method of claim 15, further comprising the step of modifying for the backup path by using a rotatable knob to adjust a curvature of the backing path.

* * * * *